US012558912B2

(12) United States Patent

Yoshii et al.

(10) Patent No.: US 12,558,912 B2

(45) Date of Patent: Feb. 24, 2026

(54) CONTAINER AND CONTENT CONTAINING BODY, AND METHOD FOR PRODUCING CONTAINER AND CONTAINER PRODUCING APPARATUS

(71) Applicants: Masako Yoshii, Kanagawa (JP); Keiichi Serizawa, Kanagawa (JP); Makoto Hino, Kanagawa (JP); Kazuhiro Akatsu, Kanagawa (JP); Takeshi Ueda, Tokyo (JP); Takayuki Nakamura, Kanagawa (JP); Yumiko Kishi, Kanagawa (JP)

(72) Inventors: Masako Yoshii, Kanagawa (JP); Keiichi Serizawa, Kanagawa (JP); Makoto Hino, Kanagawa (JP); Kazuhiro Akatsu, Kanagawa (JP); Takeshi Ueda, Tokyo (JP); Takayuki Nakamura, Kanagawa (JP); Yumiko Kishi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 955 days.

(21) Appl. No.: 17/744,734

(22) Filed: May 16, 2022

(65) Prior Publication Data

US 2022/0388324 A1 Dec. 8, 2022

(30) Foreign Application Priority Data

Jun. 8, 2021 (JP) ................................ 2021-095556
Dec. 10, 2021 (JP) ................................ 2021-200988

(51) Int. Cl.

*B41J 2/44* (2006.01)
*B41J 3/407* (2006.01)

(Continued)

(52) U.S. Cl.

CPC ................ *B41M 5/24* (2013.01); *B41J 2/442* (2013.01); *B44C 1/228* (2013.01); *B65B 21/00* (2013.01);

(Continued)

(58) Field of Classification Search

CPC .......... B41M 5/24; B65B 21/00; B65B 57/00; B65D 23/08; B65D 2203/02;

(Continued)

(56) References Cited

U.S. PATENT DOCUMENTS

2005/0036026 A1* 2/2005 Inukai ...................... B41J 2/473 347/236
2014/0305831 A1* 10/2014 Hansen ................ B23K 26/352 219/121.85

(Continued)

FOREIGN PATENT DOCUMENTS

JP 2006-076210 3/2006
JP 2006-248191 9/2006

(Continued)

OTHER PUBLICATIONS

Extended European Search Report issued Dec. 6, 2022 in European Patent Application No. 22173070.8, 12 pages.

*Primary Examiner* — Yaovi M Ameh
(74) *Attorney, Agent, or Firm* — XSENSUS LLP

(57) ABSTRACT

Provided is a container including a container body and an image on the container body. The image includes a plurality of dented portions and non-dented portions. A visibility value of the image represented by Mathematical formula (1) below is greater than or equal to a predetermined value.

$$\text{Visibility value} = b_0 \cdot L^*_0 \cdot (1 - \exp(b_1 \cdot \Delta L^*)) \quad \text{Mathematical formula (1)}$$

In Mathematical formula (1), $L^*_0$ represents a luminosity of the image. $\Delta L^*$ represents a difference between the luminosity of the image and a luminosity of any other portion (Continued)

than the image, $b_0$ represents a positive real number, and $b_1$ represents a negative real number.

13 Claims, 68 Drawing Sheets

(51) Int. Cl.

| | |
|---|---|
| ***B41M 5/24*** | (2006.01) |
| ***B44C 1/22*** | (2006.01) |
| ***B65B 21/00*** | (2006.01) |
| ***B65B 57/00*** | (2006.01) |
| ***B65D 23/08*** | (2006.01) |
| *B44F 1/02* | (2006.01) |
| *B65D 1/02* | (2006.01) |

(52) U.S. Cl.
CPC .............. *B65B 57/00* (2013.01); *B65D 23/08* (2013.01); *B41J 3/40733* (2020.08); *B44F 1/02* (2013.01); *B65D 1/02* (2013.01); *B65D 2203/02* (2013.01); *B65D 2203/12* (2013.01)

(58) Field of Classification Search
CPC ........ B65D 2203/12; B65D 1/02; B41J 2/442; B41J 3/40733; B44C 1/228; B44F 1/02
See application file for complete search history.

(56) References Cited

U.S. PATENT DOCUMENTS

| | | | | |
|---|---|---|---|---|
| 2015/0235233 | A1 | 8/2015 | Dangmann et al. | |
| 2015/0352772 | A1* | 12/2015 | Feuilloley ............ | B29D 22/003 425/135 |
| 2022/0097414 | A1* | 3/2022 | Hirayama ............... | B65B 61/26 |

FOREIGN PATENT DOCUMENTS

| | | |
|---|---|---|
| JP | 2011-011819 | 1/2011 |
| JP | 2021-176648 | 11/2021 |
| JP | 2022-015739 | 1/2022 |

* cited by examiner

631

| Identification information | Kind | Parameter |
|---|---|---|
| 1 | Character | Para1 |
| 2 | Barcode | Para2 |
| 3 | QR code (registered trademark) | Para3 |
| 4 | Graphic | Para4 |
| 5 | Picture | Para5 |

621

| Item | Parameter |
|---|---|
| Kind of dented portion | Straight line |
| Cyclicity | Present |
| Interval | 70 μm |
| Boldness (processing width) | 50 μm |
| Processing depth | 10 μm |

CONTAINER AND CONTENT CONTAINING BODY, AND METHOD FOR PRODUCING CONTAINER AND CONTAINER PRODUCING APPARATUS

CROSS-REFERENCE TO RELATED APPLICATIONS

The present application claims priority under 35 U.S.C. § 119 to Japanese Patent Application No. 2021-095556 filed Jun. 8, 2021, and Japanese Patent Application No. 2021-200988 filed Dec. 10, 2021. The contents of which are incorporated herein by reference in their entirety.

BACKGROUND OF THE INVENTION

Field of the Invention

The present disclosure relates to a container and a content containing body, and a method for producing a container and a container producing apparatus.

Description of the Related Art

In recent years, marine pollution by plastic wastes has become a topic of discussion, and movements for eliminating plastic waste pollution have become active worldwide, and there has been an increasing demand for "cyclical recycling of containers". In the "cyclical recycling of containers", recycling companies convert used containers, which have been sorted by type and collected, into flakes that serve as materials of containers, and produce containers again.

In order to promote the "cyclical recycling of containers" smoothly, it is preferable to make sorted collection thorough and complete, material by material such as containers and labels. However, peeling labels from containers for sorted collection is bothersome and has become one constraint against thorough, complete sorted collection. In this regard, there is already a known technique for providing label-less containers by forming images representing information such as names and ingredients directly on the surfaces of containers using a carbon dioxide laser (for example, see Japanese Unexamined Patent Application Publication No. 2011-11819).

Furthermore, with a view to forming a dented pattern by irradiating the surface of a resin print plate with laser light and removing the resin from the portions irradiated with the laser light, conditions such as the wavelength and the pulse energy of an ultraviolet laser, and the spot diameter of the laser light during processing have been disclosed (for example, see Japanese Unexamined Patent Application Publication No. 2006-248191).

SUMMARY OF THE INVENTION

According to an embodiment of the present disclosure, a container includes a container body and an image on the container body. The image includes a plurality of dented portions and non-dented portions. A visibility value of the image represented by Mathematical formula (1) below is greater than or equal to a predetermined value.

$$\text{Visibility value} = b_0 \cdot L^*_0 \cdot (1 - \exp(b_1 \cdot \Delta L^*)) \quad \text{Mathematical formula (1)}$$

In Mathematical formula (1), $L^*_0$ represents a luminosity of the image. $\Delta L^*$ represents a difference between the luminosity of the image and a luminosity of any other portion than the image, $b_0$ represents a positive real number, and $b_1$ represents a negative real number.

DESCRIPTION OF THE EMBODIMENTS (Container)

Figure 1A:
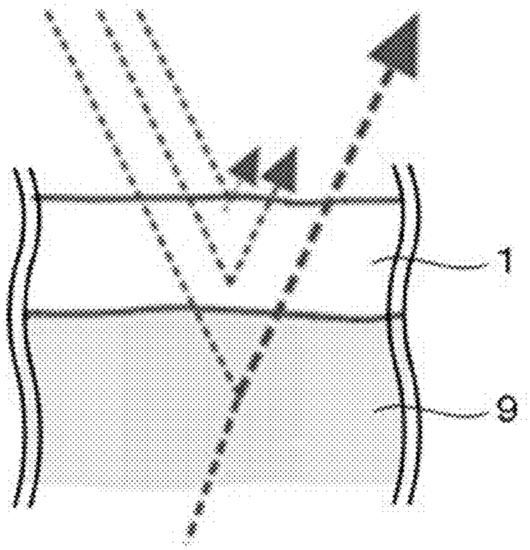
FIG. 1A is an exemplary view illustrating a state of diffuse reflection of light on a surface of a container body before laser processing.

A container of the present disclosure includes a container body and an image on the container body. The image includes a plurality of dented portions and non-dented portions. A visibility value of the image represented by Mathematical formula (1) below is greater than or equal to a predetermined value.

$$\text{Visibility value} = b_0 \cdot L^*_0 \cdot (1 - \exp(b_1 \cdot \Delta L^*)) \quad \text{Mathematical formula (1)}$$

In Mathematical formula (1), $L^*_0$ represents a luminosity of the image, $\Delta L^*$ represents a difference between the luminosity of the image and a luminosity of any other portion than the image, $b_0$ represents a positive real number, and $b_1$ represents a negative real number.

The visibility value is preferably 2 or greater and more preferably 6 or greater.

The present disclosure has an object to provide a container that can be cyclically recycled smoothly and is excellent in visibility of an image formed on a container body.

The present disclosure can provide a container that can be cyclically recycled smoothly and is excellent in visibility of an image.

Existing carbon dioxide laser processing and infrared wavelength processing have not succeeded in focusing laser light within a sufficiently small spot diameter, and cannot help significant degradation of the resolution. Therefore, these processing techniques cannot form the fonts that are used on the labels. Ultraviolet wavelength processing needs a pulse energy exceeding a process threshold (the pulse energy being defined by an average power output and a cyclic frequency of a laser), and cannot help using a low frequency in order to obtain a high pulse energy. Therefore, even if ultraviolet wavelength processing can process one dot by one pulse, the productivity of ultraviolet wavelength processing significantly depends on the cyclic frequency of the laser light. On the other hand, high-frequency processing cannot help using a low pulse energy, and cannot process one dot by one pulse but needs a plurality of pulses. Therefore, it cannot be helped that the frequency for forming one dot is low and the productivity cannot be improved.

The present disclosure provides a container including a container body and an image on the container body, where the image includes a plurality of dented portions and non-dented portions, and a visibility value of the image represented by Mathematical formula (1) above is greater than or equal to a predetermined value.

Ambient light diffusibility of the image including a plurality of dented portions and non-dented portions is higher than that of, for example, an image formed by one stroke. Therefore, the image has an improved contrast against a region of the container body having no image. Here, formation by one stroke means formation or drawing of a line or a graphic by unintermittent, continuous irradiation of laser light.

In the present disclosure, the diffusing effect by the plurality of dented portions and non-dented portions makes the image be seen whitely opaque against a region on which no image is formed, and an improved contrast makes the whitely opaque region be seen even whiter. This enables the image to be seen well at a high contrast even if the image includes a lot of information including, for example, minute lines and letters or characters. Hence, it is possible to provide a container on which an image including a lot of information is formed with a good visibility.

Moreover, it is possible to form an image without applying an impurity such as an ink to the container body. This eliminates the need for a step of removing an impurity in the cyclic recycling process, and can also prevent missing of management information due to removal of an ink as an impurity.

Furthermore, making an image whitely opaque enables the image to be seen at a good contrast even when a transparent plastic or transparent glass having a visible light transmissivity is used for the container body.

The container of the present disclosure includes a container body and an image on the container body, the image including a plurality of dented portions and non-dented portions. The container preferably includes a cap of a container.

<Container Body>

For example, the material, shape, size, structure, and color of the container body are not particularly limited and may be appropriately selected depending on the intended purpose.

The material of the container body is not particularly limited and may be appropriately selected depending on the intended purpose. Examples of the material of the container body include resins and glass. Among these materials, transparent resins or transparent glass are more preferable, and transparent resins are particularly preferable.

Examples of the resins of the container body include polyvinyl alcohol (PVA), polybutylene adipatelterephthalate (PBAT), polyethylene terephthalate succinate, polyethylene (PE), polypropylene (PP), polyethylene terephthalate (PET), vinyl chloride (PVC), polystyrene (PS), polyurethane, epoxy, biopolybutylene succinate (PBS), polylactic acid blend (PBAT), starch blended polyester resins, polybutylene terephthalate succinate, polylactic acid (PLA), polyhydroxybutyrate/hydroxyhexanoate (PHBH), polyhydroxyalkanoic acid (PHA), bio PET30, biopolyamide (PA) 610, 410, 510, bio PA1012, 10T, bio PA11T, MXD10, biopolycarbonate, biopolyurethane, bio PE, bio PET100, bio PA11, and bio PA1010. One of these resins may be used alone or two or more of these resins may be used in combination. Among these resins, biodegradable resins such as polyvinyl alcohol, polybutylene adipate/terephthalate, and polyethylene terephthalate succinate are preferable in terms of environmental impacts.

The shape of the container body is not particularly limited and may be appropriately selected depending on the intended purpose. Examples of the shape of the container body include a bottle shape, a circular columnar shape, a quadrangular prismatic shape, a box shape, and a pyramidal shape. Among these shapes, a bottle shape s preferable.

The container body having a bottle shape includes an opening portion, a shoulder portion joined to the opening portion, a trunk portion joined to the shoulder portion, and a bottom portion joined to the trunk portion.

The size of the container body is not particularly limited and may be appropriately selected depending on the use of the container.

The structure of the container body is not particularly limited and may be appropriately selected depending on the intended purpose. For example, the container body may have a single-layer structure or a multilayer structure.

Examples of the color of the container body include a colorless transparent color, transparent colors, and opaque colors. Among these colors, a transparent colorless color is preferable.

<Image>

An image including a plurality of dented portions and non-dented portions is formed on the surface of the container body.

The image includes, for example, letters or characters, symbols, graphics, pictures, and codes. Specifically, the image represents information such as a name, ingredients, an identification number, a name of a manufacturer, a date of manufacture, a best-by date, a barcode, a QR code (registered trademark), a recycle mark, or a logo mark.

A dented portion is formed of a plurality of processed portions. The plurality of processed portions are provided along a first scanning direction (main scanning direction), and may each have a dot shape or a line shape. The processed portions are preferably circular processed portions or elliptical processed portions in a plan view perspective.

In terms of visibility and productivity, it is preferable that a dented portion be provided linearly along the first scanning direction with the plurality of processed portions contacting or overlapping each other.

A non-dented portion is a flat region of the container body with no dented portion formed.

The laser scanning directions include two directions, namely a main scanning direction and a sub-scanning direction. The main scanning direction and the sub-scanning direction are orthogonal to each other.

The main scanning direction is a direction in which a laser irradiation unit is moved. The sub-scanning direction is a direction in which the container body, which is the laser processing target, is moved.

The first scanning direction is the main scanning direction of laser processing. A second scanning direction is the sub-scanning direction of laser scanning.

Figure 1B:
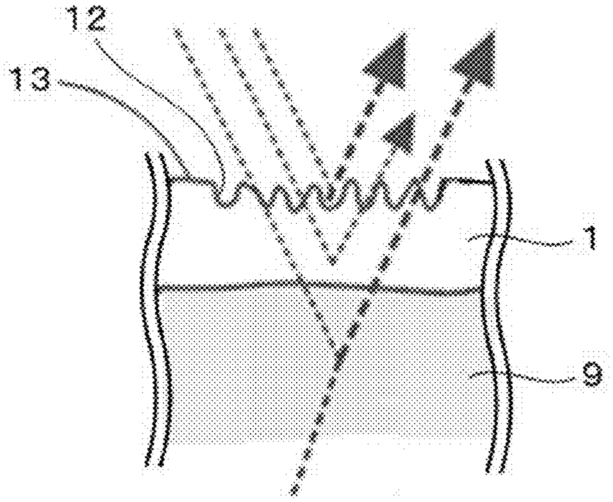
FIG. 1B is an exemplary view illustrating a state of diffuse reflection of light on a surface of a container body in which a plurality of dented portions have been formed by laser processing.

When a plurality of dented portions 12 are formed on the surface of the container body 1 by, for example, laser processing and an image 11 is formed as an aggregate of the dented portions 12 as illustrated in FIG. 1B, the diffuse reflectance on the surface of the container body 1 becomes higher than that before the surface is laser-processed as illustrated in FIG. 1A. That is, a whitely opaque image 11 is formed as illustrated in FIG. 1B. As the plurality of dented portions 12 are aggregated more densely, the degree of white opaqueness becomes higher and the image becomes more seeable, but laser processing consumes more time, productivity becomes lower, and deformation of the container body 1 by heat generation and color change due to degeneration of the material become more likely on the other hand. Therefore, it is preferable to aggregate the dented portions to a degree until which the visibility is not influenced.

Figure 1C:
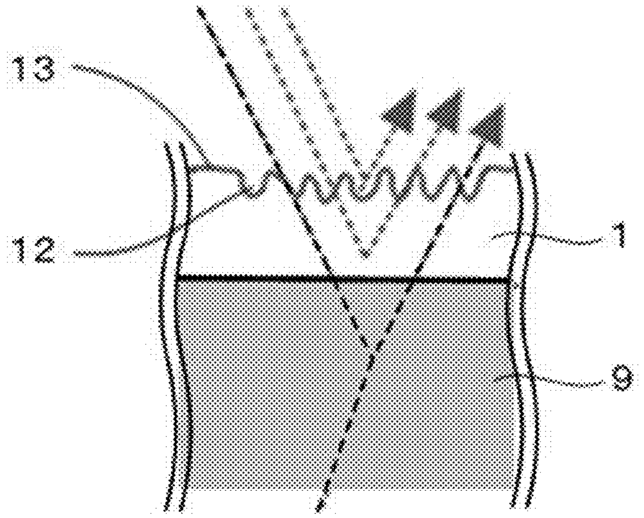
FIG. 1C is an exemplary view illustrating a state of diffuse reflection of light on a surface of a container body in which a plurality of dented portions have been formed by laser processing and on a content.

The visibility of the image 11 is dependent not only on the diffuse reflectance by the plurality of dented portions 12, but also on the influence of transmitted light from a content 9 contained in the container body 1 (FIG. 1C). When the container body 1 is formed of a transparent material such as a PET bottle or glass, transmitted light from the content 9 contained in the container body 1 is more influential as illustrated in FIG. 1C. When the image 11 is an aggregate of a plurality of dented portions 12 at a density at which productivity does not drop, it is also necessary to take into consideration the influence of transmitted light through non-dented portions 13.

As a result of conducting earnest studies in order to form an image having a good visibility taking into consideration also the processed conditions of the surface of the container body and the content contained in the container body, the present inventor has established a visibility evaluation method that takes into consideration all the influences from the processed conditions and the content.

Next, the visibility evaluation method will be described. The visibility evaluation method takes a photo of the container body, and measures the luminosity that can be sensed from each of the visible image and a portion other than the image.

Figure 2A:
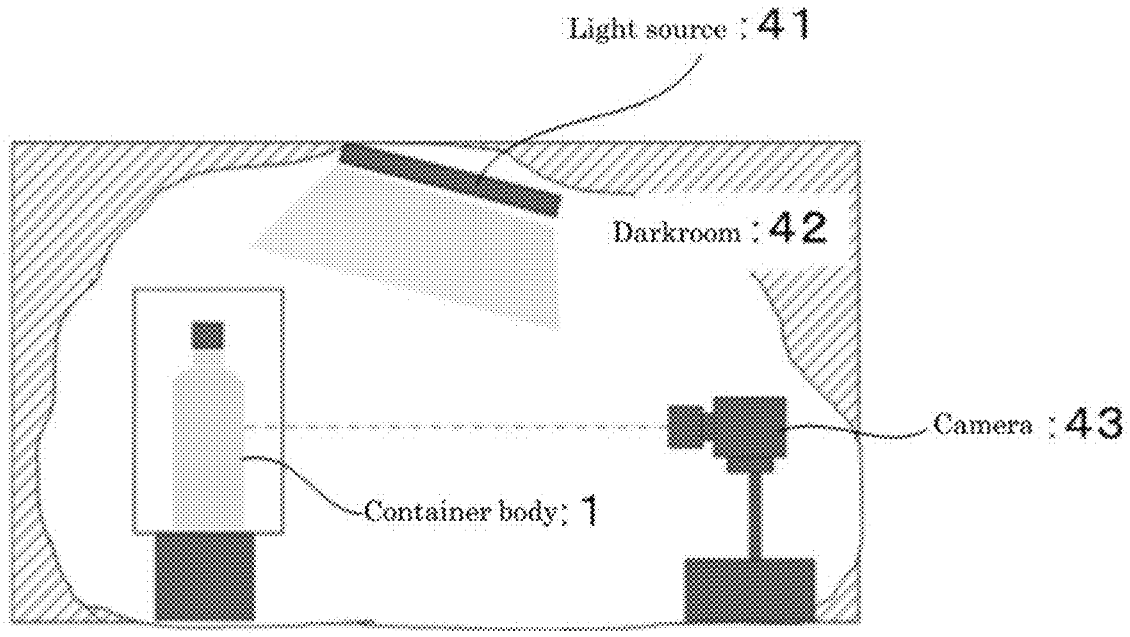
FIG. 2A is a view illustrating an example of a method for taking a photo of a container body.
Figure 2B:
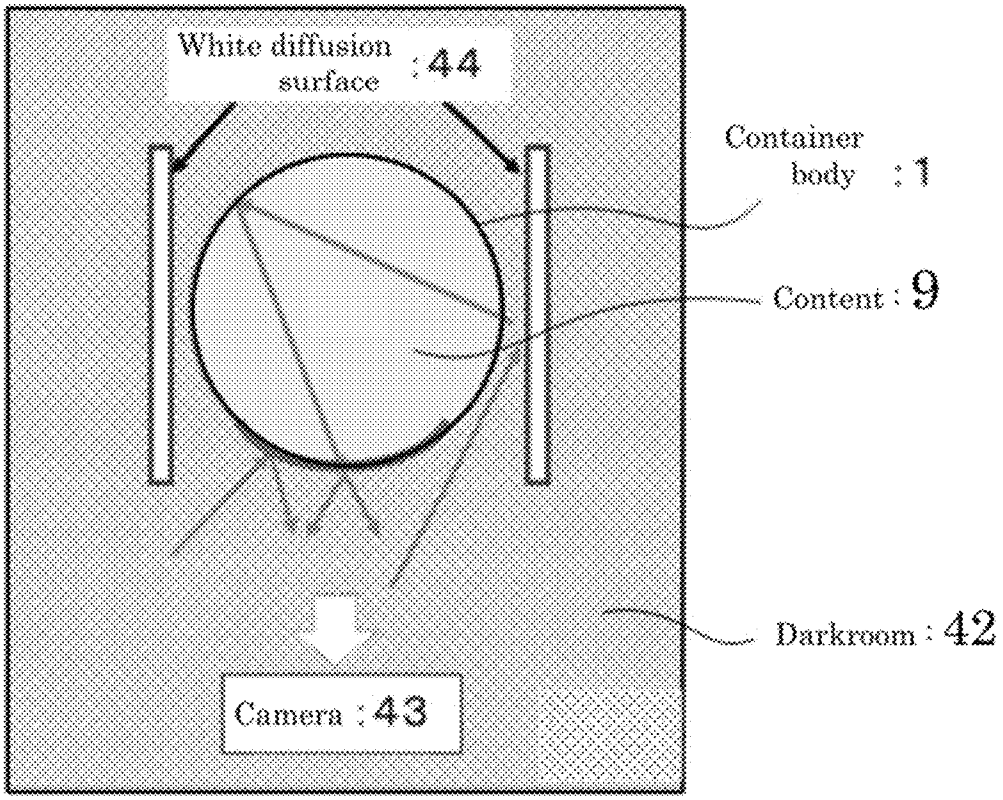
FIG. 2B is a view illustrating a state in which white diffusion surfaces are set on side surfaces of a container body in a method for taking a photo of a container body.

A photo of the container body is taken in an environment in a darkroom 42 as illustrated in FIG. 2A in order to prevent an undesirable image from being reflected on the surface of the container body 1 depending on the shape of the container body 1. A camera 43 is set as illustrated in FIG. 2A. It is preferable to dispose a flat light source, which serves as a light source 41, at a predetermined angle in order that a component to be regularly reflected from the surface of the container body 1 may not be taken in the photo, and it is preferable to set a pair of white diffusion surfaces 44 on the side surfaces of the container body 1 as illustrated in FIG. 2B in order that the influence from the content 9 in the container body 1 can be reflected in the photo to be taken. Specifically, the photo is taken under the photo taking conditions described below. As a result, a photo that is close to what is seen in a normal environment can be taken.

<Photo Taking Conditions in the Visibility Evaluation Method>

A camera 43, a sample (container body 1), and a light source 41 are set in a darkroom as illustrated in FIG. 2A, The light source is disposed at a diffuse lighting position, which is, for example, a position obliquely above the sample, and is a position at which the light source does not generate a component that is to be sensed by the camera as a regular reflection component from the processed surface, and may be a position obliquely below or a position on the side surfaces.

White surfaces are set on the side surfaces of the sample, in order to make it possible to take into consideration the ambient light from the surrounding.

The photo taking conditions are set as described below in a manner that the values read as a white color may not be saturated.

—Photo Taking Conditions—

Camera: AREA SCAN CAMERA ACA3088-57 μM available from Basler AG

Lens: RICOH LENS FL-CC2514-2M (F1.4 f25 mm 2/3")

Aperture: F1.4

Exposure time: 20,000 (microseconds)

Photo taking distance: 500 mm

Light source: LED tracer

Figure 3:
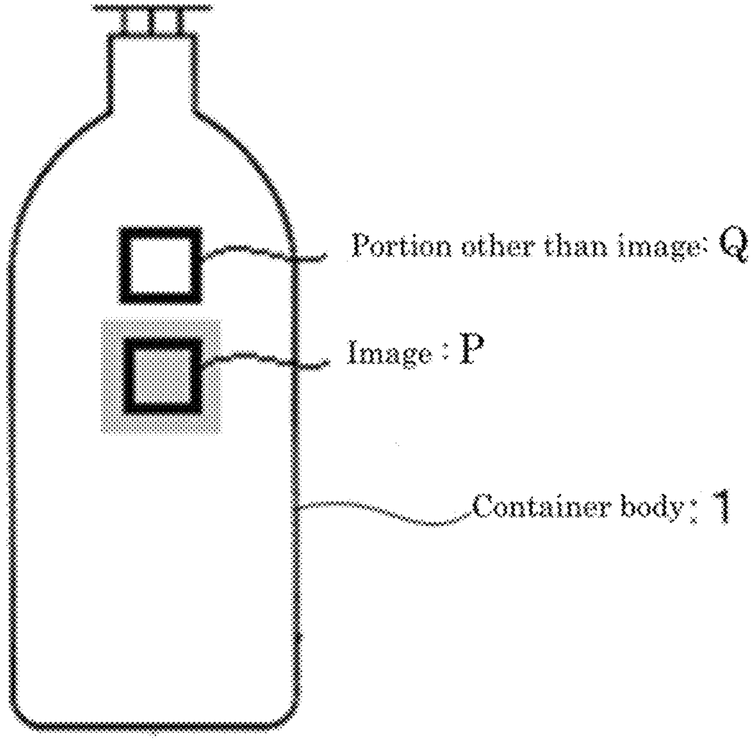
FIG. 3 is a schematic view illustrating an image P and a portion Q other than the image on a container body in taking a photo of the container body.

The luminosity of the image and the luminosity of a portion other than the image are measured from the taken photo. As illustrated in FIG. 3, output values from the image P and the portion Q other than the image are converted to luminosity values. As the camera's output values, which are dependent on, for example, the image size, it is preferable to use an average value of an area of about from some square millimeters through some tens of square millimeters, taking into consideration variation of the image size.

The output values can be converted to luminosity values in a manner described below based on values (G signals) to be read by the camera when a photo of a chart having known luminosity values (L*) is taken by the camera in the environment in which the container body is measured, and based on the known luminosity values.

—G Signals and Conversion to Luminosity—

A photo of a color chart (gray chart) having known luminosity values is taken, and outputs are approximated with an n-th order polynomial. For example, the G signals are converted to luminosity values according to a third-order polynomial presented below.

$$L^*=Lab\_1st\times G1+Lab\_2nd\times G2+Lab\_3rd\times G3+Lab\_const$$

$$Lab\_1st=0.461535$$

$$Lab\_2nd=-0.000281$$

$$Lab\_3rd=0.000000$$

$$Lab\_const=1.211053$$

Figure 4:
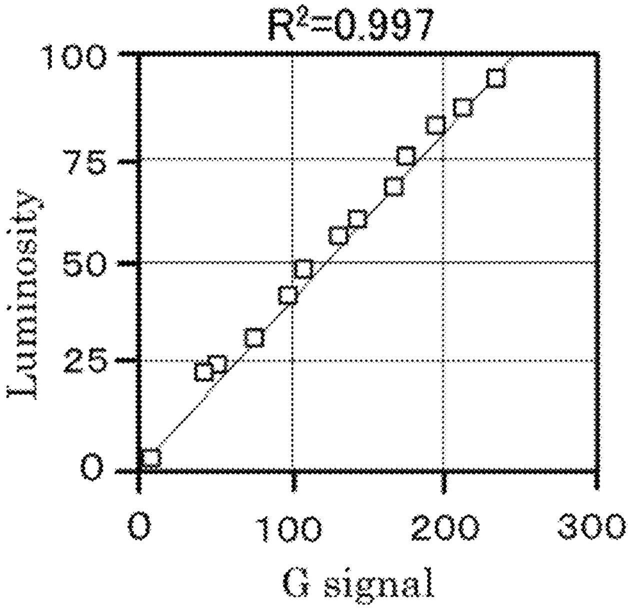
FIG. 4 is a graph plotting a relationship between a G signal and luminosity.

FIG. 4 is a graph plotting a relationship between the G signals and luminosity values derived according to the formula presented above. From FIG. 4, the contribution ratio is 0.997.

—Subjective Evaluation—

For ranking of evaluation samples, samples that have been laser-processed under varied conditions are subjectively evaluated with the contents to be contained in the container bodies varied, and subjective evaluation scores are obtained.

Samples: Six samples processed under varied conditions

Contents: Water, coffee, and tea

Subjective evaluation method: Scheffe's Paired Comparison method

Raters: Three persons (evaluation is performed twice for each)

First evaluation: Water in all samples

Figure 5:
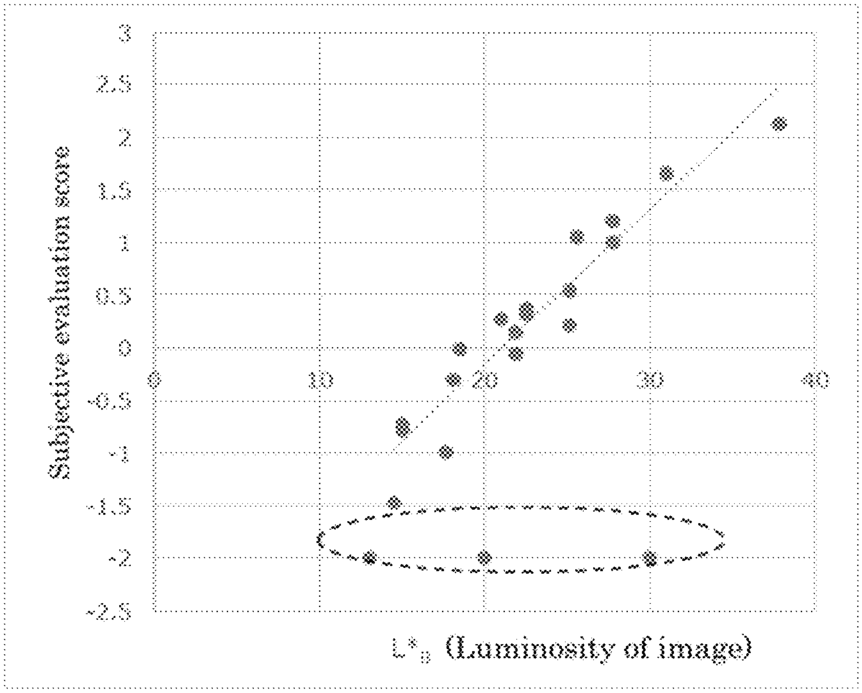
FIG. 5 is a graph plotting a relationship between a luminosity ($L^*_0$) of an image and subjective evaluation score.
Figure 6:
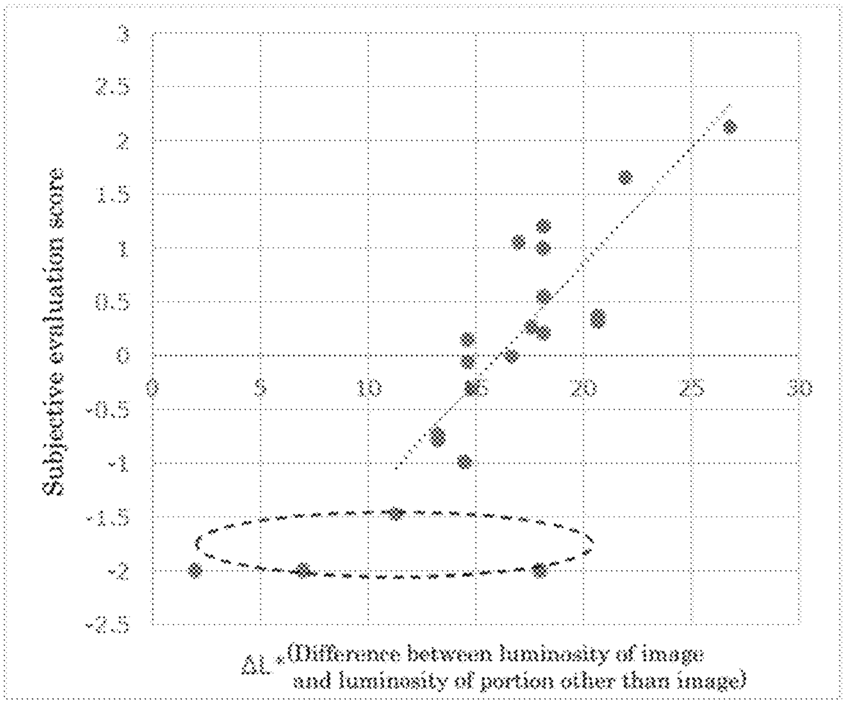
FIG. 6 is a graph plotting a relationship between a difference ($\Delta L^*$) between a luminosity of an image and a luminosity of a portion other than the image, and subjective evaluation score.

Second evaluation: Water in two samples, coffee in two samples, and tea in two samples Third evaluation: Water in one sample, coffee in three samples, and tea in two samples Evaluation environment: In an office's living room FIG. 5 and FIG. 6 plot the relationship between the subjective evaluation scores obtained and the luminosity ($L^*_0$) of the image, and the relationship between the subjective evaluation scores obtained and the difference ($\Delta L^*$) between the luminosity of the image and the luminosity of the portion other than the image, respectively. Some samples have a poor correlation, like the samples in the region enclosed by a dotted line in FIG. 5 and FIG. 6. These samples are in any of a condition with a significantly low luminosity ($L^*_0$) of the image and a condition with a small luminosity difference ($\Delta L^*$), or in both of these conditions.

Figure 7:
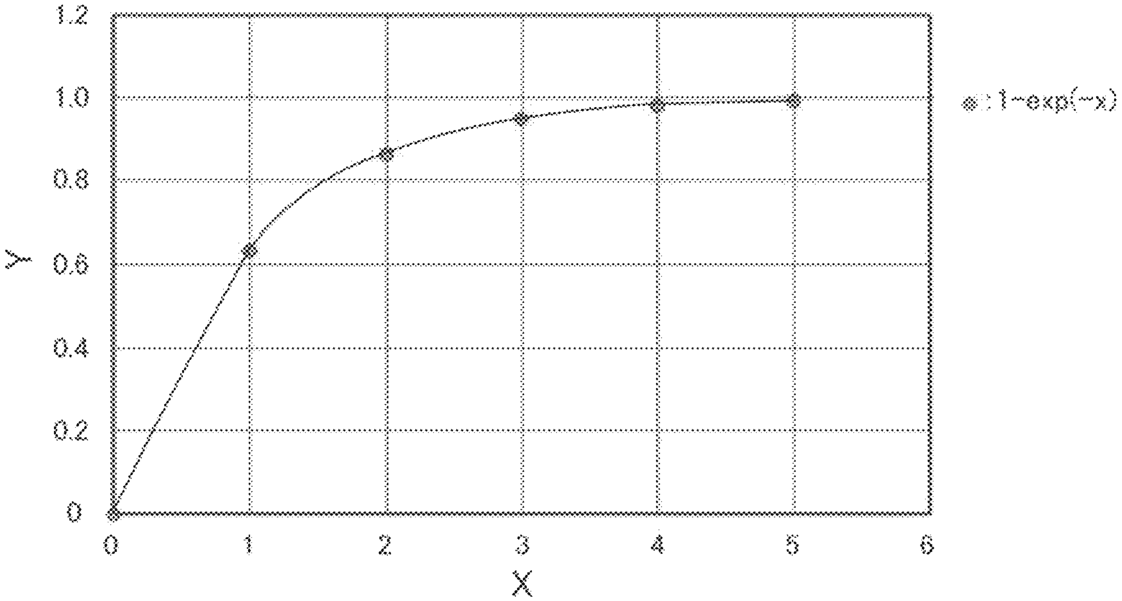
FIG. 7 is a graph plotting a relationship between x and Y included in a mathematical formula: $Y=1-\exp(-x)$.

Mathematical formula (1), which is multiplication of the luminosity $L^*_0$ of the image by $(1-\exp(\Delta L^*))$, is derived as a mathematical formula according to which such samples also have a high correlation. According to $Y=(1-\exp(-x))$, Y becomes closer to 0 as x is reduced as plotted in FIG. 7. Hence, Mathematical formula (1) expresses a tendency that the visibility is poorer as the luminosity difference ($\Delta L^*$) is smaller.

Hence, the visibility value is represented by Mathematical formula (1) below.

$$\text{Visibility value}=b_0 \cdot L^*_0 \cdot (1-\exp(b_1 \cdot \Delta L^*)) \quad \text{Mathematical formula (1)}$$

In Mathematical formula (1), $L^*_0$ represents the luminosity of the image, $\Delta L^*$ represents the difference between the luminosity of the image and the luminosity of the portion other than the image, $b_0$ represents a positive real number and is preferably around 0.2, and $b_1$ represents a negative real number and is preferably around −0.2.

The visibility value represented by Mathematica formula (1) expresses characteristics that the visibility is higher as the luminosity of the image is higher, and that the visibility disappears when the luminosity difference between the image and the portion other than the image disappears.

Figure 8:
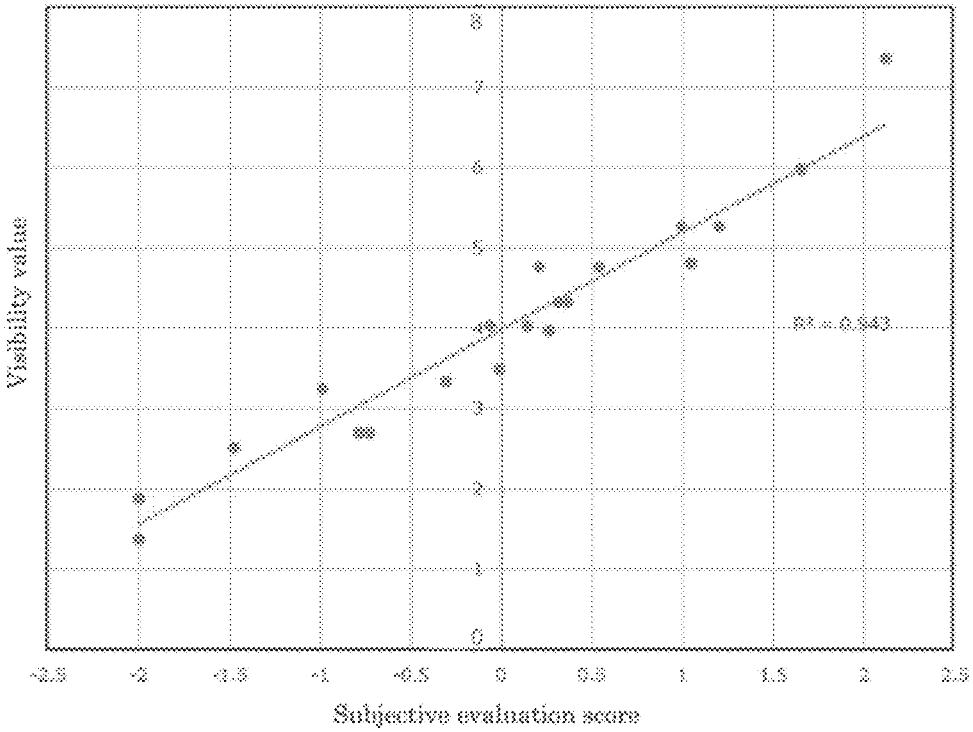
FIG. 8 is a graph plotting a relationship between subjective evaluation score and a visibility value.

Here, as plotted in FIG. 8, it has turned out that the visibility values represented by Mathematical formula (1) calculated where $b_0=0.195$ and $b_1=-0.193$ have a high correlation ($R^2=0.943$) with the subjective evaluation scores (paired comparison method) obtained when the processing conditions and the contents contained in the container body are varied.

<Subjective Evaluation Method>

Regarding samples on which images (letters) are laser-processed to under the conditions described below, the images are subjectively evaluated and the visibility of the image is evaluated to five grades. The results are plotted in FIG. 9.

—Evaluation Conditions—

Raters: Thirty persons

Samples: Ten kinds of samples in total, each having 5.5 pt letters formed under laser processing conditions varied among the samples, and each containing a content (e.g., water and tea) varied among the samples Evaluation environment: In an ordinary office's living room Rating method: The rating ranks are five-tiered as described below, and the raters subjectively evaluate the images.

[Evaluation Ranks]

1: The image cannot be read

2: The image cannot be read well.

3: The image can be read.

4: The image can be read well

5: The image can be read best.

Figure 9:
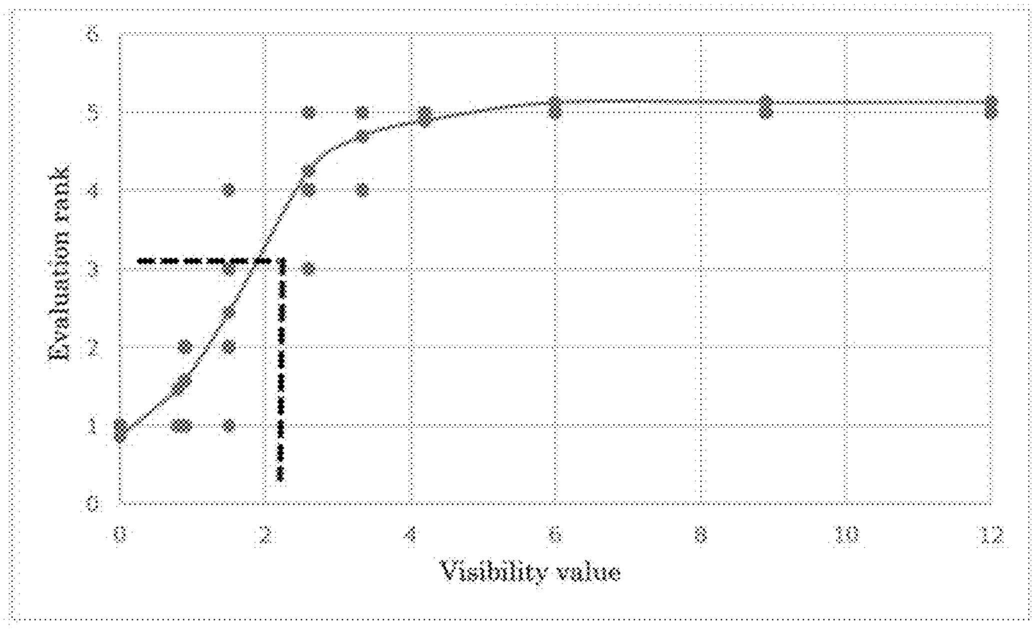
FIG. 9 is a graph plotting a relationship between a visibility value and an evaluation rank.

From the result of FIG. 9, it can be seen that the letter readability is rated to the rank 3 or higher when the visibility value is 2 or higher although the evaluation results are slightly scattered because of the nature of the subjective evaluation, and that all the raters rate the letter readability to the rank 5 (i.e., can be read best) when the visibility value is 6 or higher.

Figure 10:
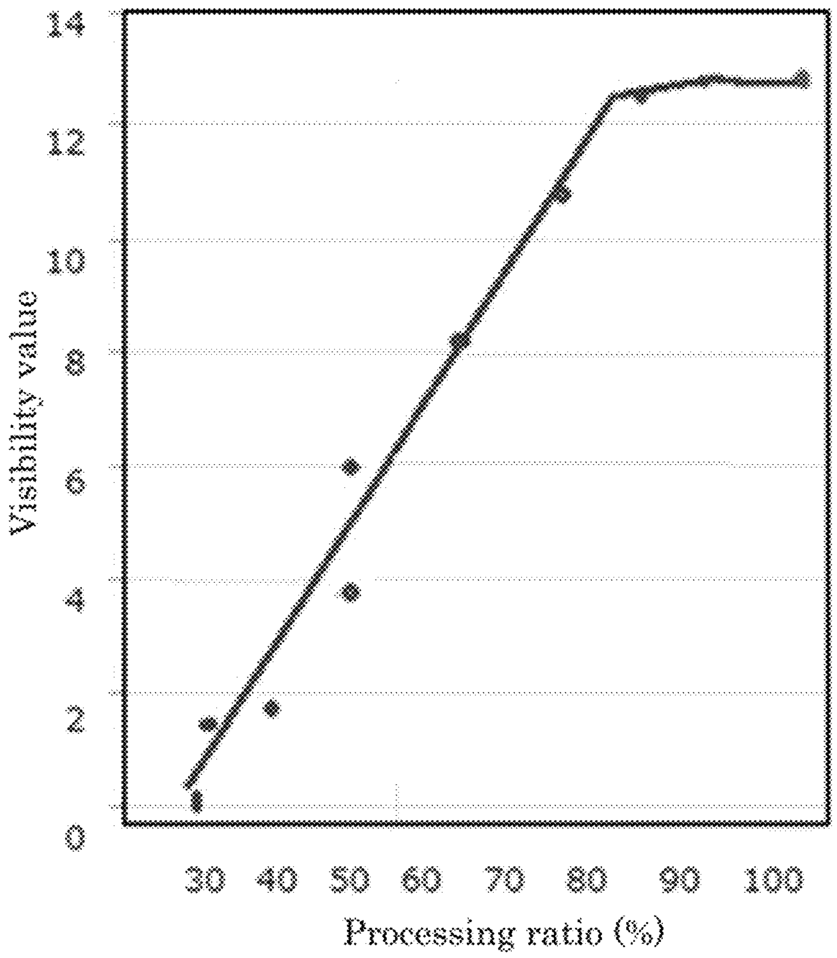
FIG. 10 is a graph plotting a relationship between a processing ratio and a visibility value.

Next, the relationship between the visibility value and the ratio of the area of a plurality of dented portions to the area of the image [(Area of a plurality of dented portions/Area of the image)×100] (hereinafter, may be referred to as "processing ratio") is investigated. It can be seen from FIG. 10 that a region having a low processing ratio has a correlation between the processing ratio and the visibility value, i.e., a poorer visibility along with a lower processing ratio, and that the visibility value is 2 or higher when the processing ratio is 40% or higher and the visibility value is about 6 or higher when the processing ratio is 50% or higher.

Hence, the processing ratio is preferably 40% or higher but 95% or lower. By setting the processing ratio to 40% or higher, it is possible to provide an image having an excellent visibility while maintaining a high productivity. Furthermore, by setting the processing ratio to 50% or higher, it is possible to form an image that would rank the highest in the image subjective evaluation.

FIG. 11A to FIG. 11F illustrate specific examples of an image 11 including a plurality of dented portions and non-dented portions.

Figure 11A:
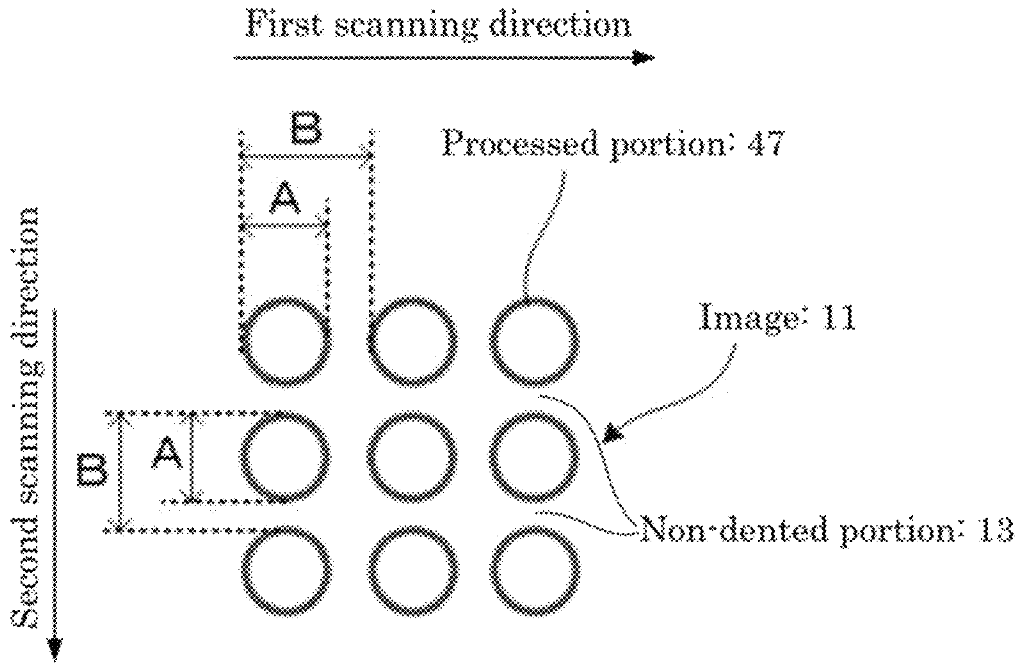
FIG. 11A is a view illustrating an example of an image including a plurality of dented portions and non-dented portions.

A dented portion 12 is formed of a plurality of processed portions 47. The plurality of processed portions 47 are provided linearly. In terms of visibility, it is preferable that the plurality of processed portions 47 be provided linearly, contacting or overlapping each other as illustrated in FIG. 11B, FIG. 11C, and FIG. 11F.

Figure 11B:
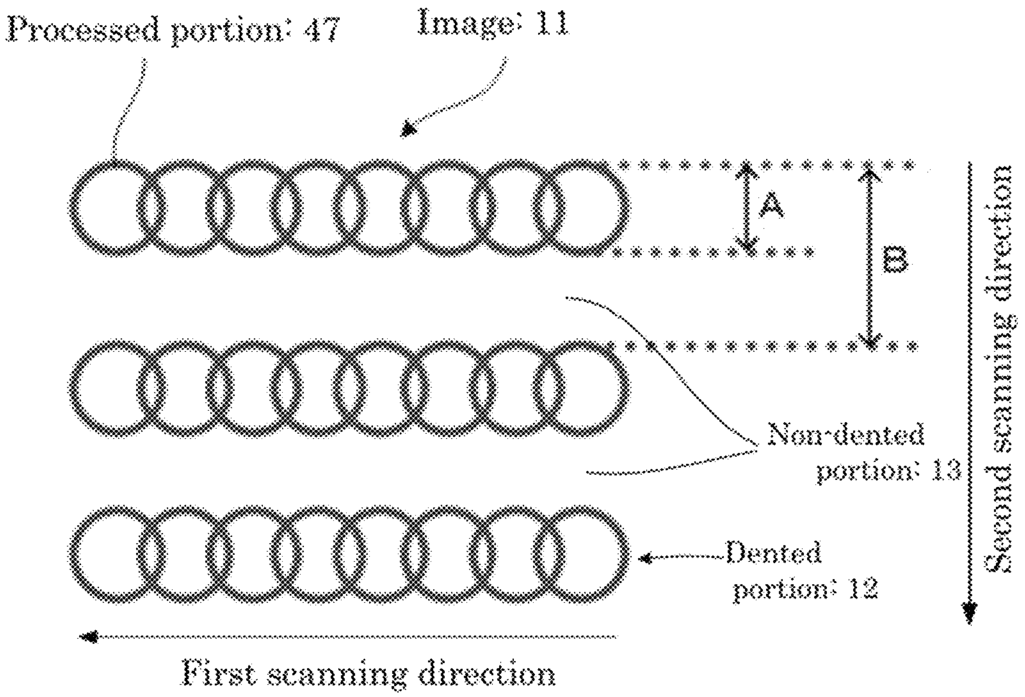
FIG. 11B is a view illustrating another example of an image including a plurality of dented portions and non-dented portions.
Figure 11C:
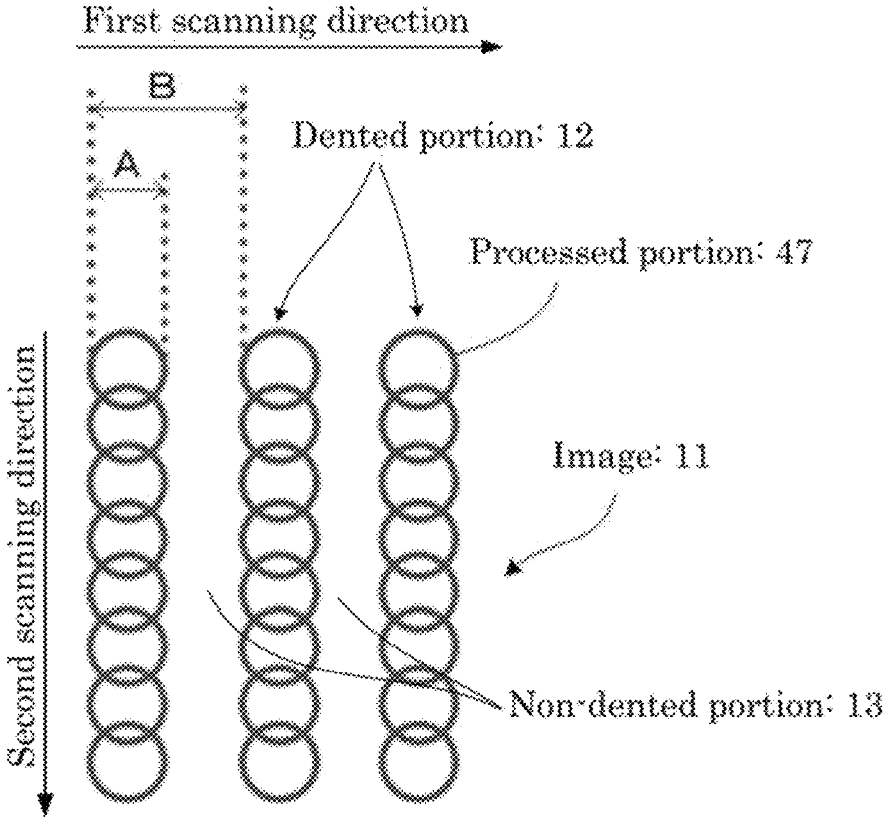
FIG. 11C is a view illustrating another example of an image including a plurality of dented portions and non-dented portions.
Figure 11D:
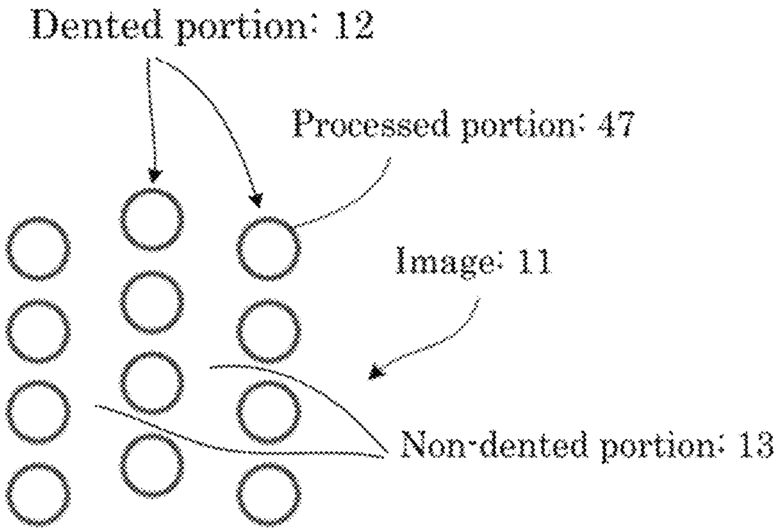
FIG. 11D is a view illustrating another example of an image including a plurality of dented portions and non-dented portions.
Figure 11E:
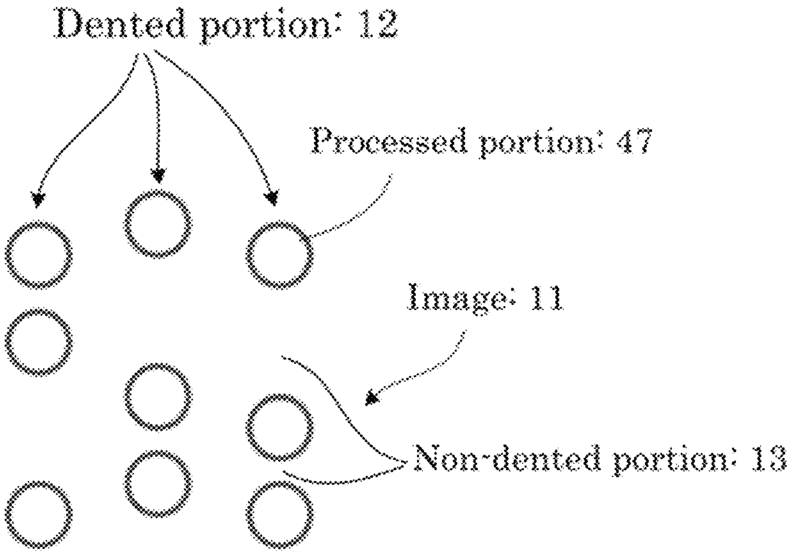
FIG. 11E is a view illustrating another example of an image including a plurality of dented portions and non-dented portions.
Figure 11F:
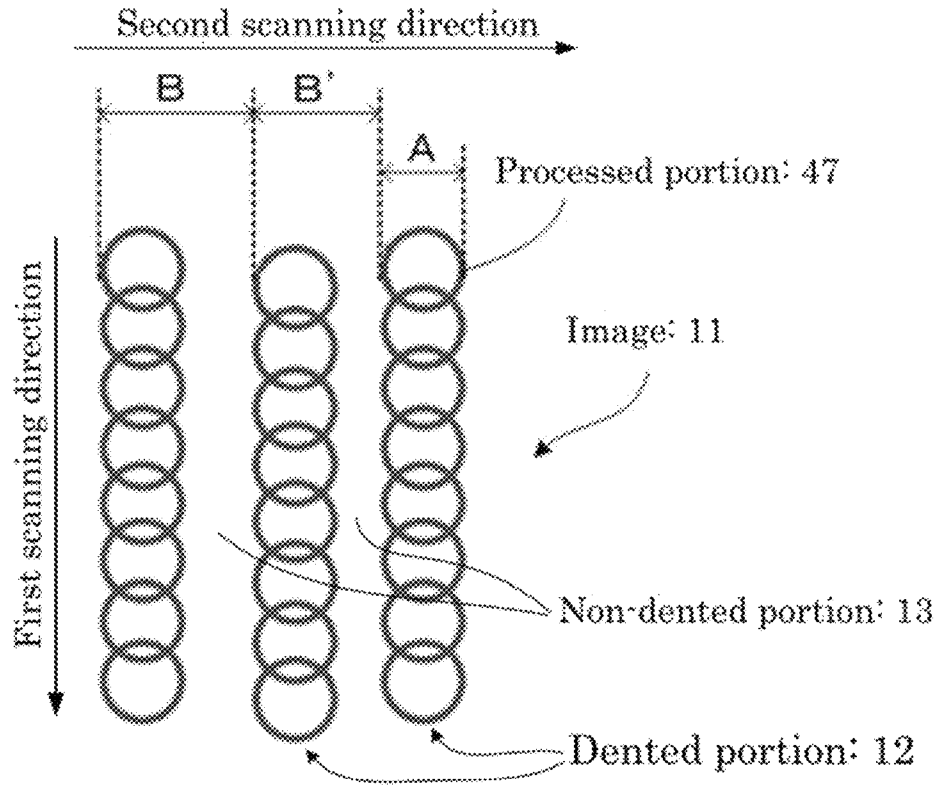
FIG. 11F is a view illustrating another example of an image including a plurality of dented portions and non-dented portions.
Figure 12A:
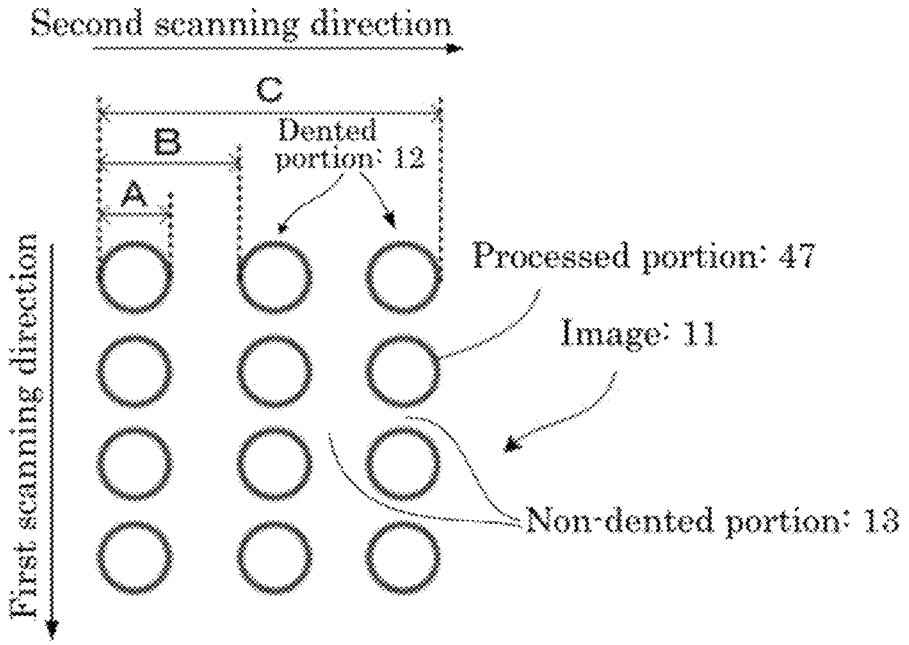
FIG. 12A is a view illustrating an example of a case where the size of a processed portion constituting a dented portion is less than or equal to a one-dot width of a resolution.
Figure 12B:
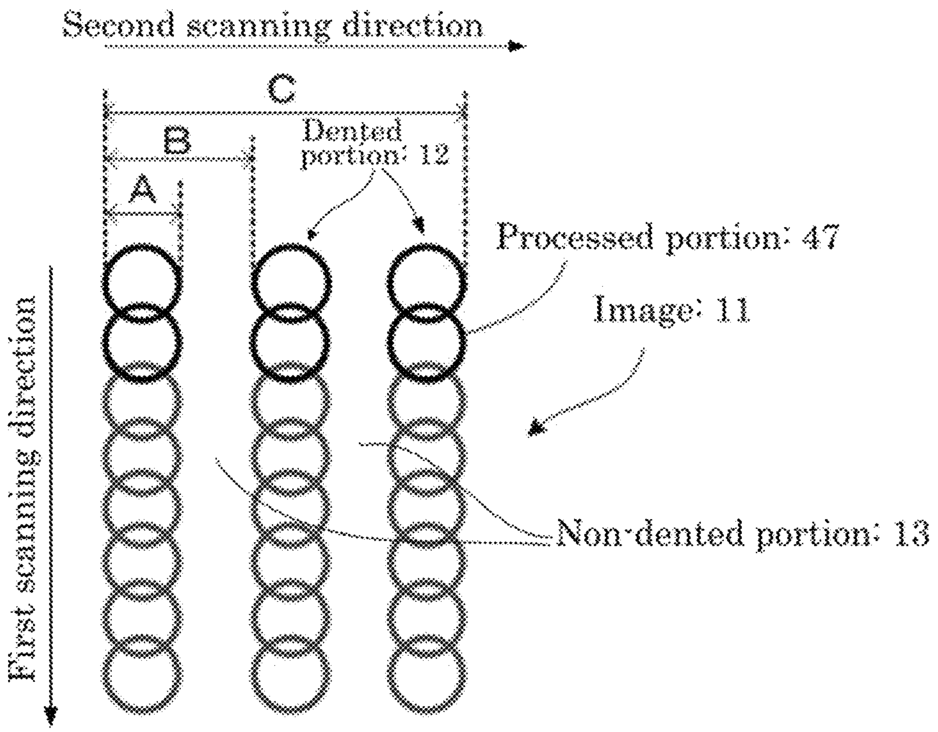
FIG. 12B is a view illustrating another example of a case where the size of a processed portion constituting a dented portion is less than or equal to a one-dot width of a resolution.
Figure 12C:
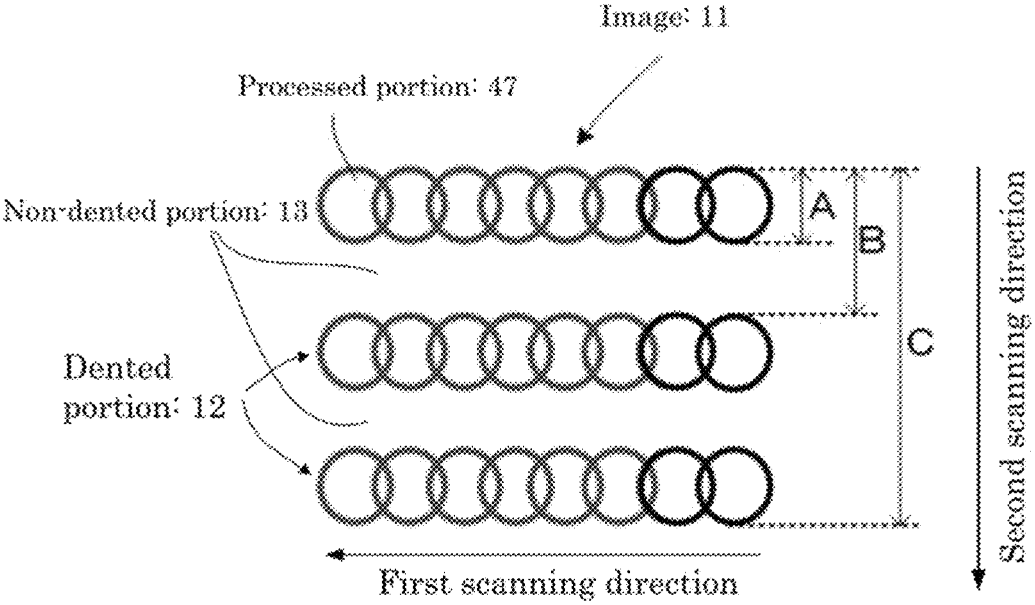
FIG. 12C is a view illustrating another example of a case where the size of a processed portion constituting a dented portion is less than or equal to a one-dot width of a resolution.

Furthermore, when the plurality of processed portions 47 are provided linearly along a first scanning direction (main scanning direction) as illustrated in FIG. 11B and FIG. 11F, a high visibility can be obtained at a high productivity.

Dented portions 12 that are provided in a dot shape along the first scanning direction as illustrated in FIG. 11A, FIG. 11D, and FIG. 11E are susceptible to transmitted light through non-dented portions 13 surrounding the processed portions 47. However, the non-dented portions 13 provided between the dented portions 12 can better prevent deformation of the body due to heat generation and color change due to degeneration of the material.

The processing ratio is calculated based on the width A of a processed portion 47 constituting a dented portion in a second scanning direction orthogonal to the first scanning direction and the width B of a non-dented portion 13 in the second scanning direction. For example, when an image 11 having a resolution of 200 dpi is formed, the processing ratio is $(A/2)^2*\pi/B^2$ provided that a processed portion 47 has a dot shape as illustrated in FIG. 11A. When A is 90 micrometers and B is 127 micrometers, the processing ratio is 40%. When processed portions 47 contact each other, for example, when A is 127 micrometers and B is 127 micrometers, the processing ratio is 79%.

When processed portions 47 are provided linearly along the first scanning direction overlapping each other as illustrated in FIG. 11B, the processing ratio is A/B. When A is 50 micrometers and B is 127 micrometers, the processing ratio is 40%. When processed portions 47 contact each other, for example, when A is 120 micrometers and B is 127 micrometers, the processing ratio is 95%.

Processed portions 47 may be arrayed in any of the longitudinal direction and the latitudinal direction (FIG. 11C). The width A of a processed portion 47 in the second scanning direction and the width B of a non-dented portion 13 in the second scanning direction each need not be uniform within an image 11 (FIG. 11D, FIG. 11E, and FIG. 11F). Processed portions 47 and non-dented portions 13 may be disposed randomly.

In terms of improving visibility, it is preferable that the width of a dented portion in the second scanning direction (sub-scanning direction) orthogonal to the first scanning direction be less than or equal to the dot width of a predetermined resolution. The predetermined resolution is, for example, 200 dpi.

For example, when forming an image having a resolution of 200 dpi under conditions that the width C of a minimum one dot in the second scanning direction (sub-scanning direction) is 127 micrometers, and the width A of a processed portion 47 in the second scanning direction is 20 micrometers, three lines of dented portions (straight lines) 12 each formed of a plurality of processed portions 47 are laser-processed within the width C of a minimum one dot in the second scanning direction. This enables minuter surface roughening of the surface of the container body, and improves visibility.

The width B of a non-dented portion 13 in the second scanning direction may be any other than 40 micrometers, and may be 63 micrometers, in which case, dots or lines are arrayed in two lines, and may be 80 micrometers, in which case, dots or lines are arrayed in 1.5 lines. Also in these cases, visibility is improved as in the case where the width B of a non-dented portion 13 in the second scanning direction is 40 micrometers. Moreover, by additionally satisfying a condition that the processing ratio is 40% or higher but 95% or lower at the same time, it is possible to obtain a good visibility and an improved productivity accompanying reduction of the processing area, and to prevent deformation of the container body and degeneration of the material due to heat generation.

Lines or dots formed of processed portions 47 may be arrayed in any of the longitudinal direction and the latitudinal direction. The width A of a processed portion 47 in the second scanning direction and the width B of a non-dented portion 13 in the second scanning direction each need not be uniform within an image 11, and processed portions 47 and non-dented portions 13 may be disposed randomly.

In another embodiment of the container of the present disclosure, the container includes a container body and an image on the container body, the image including a plurality of dented portions. A visibility value of the image represented by Mathematical formula (1) below is greater than or equal to a predetermined value. So long as the image includes dented portions, the image may or may not include non-dented portions.

$$\text{Visibility value} = b_0 \cdot L^*_0 \cdot (1 - \exp(b_1 \cdot \Delta L^*)) \quad \text{Mathematical formula (1)}$$

In Mathematical formula (1), $L^*_0$ represents the luminosity of the image, $\Delta L^*$ represents the difference between the luminosity of the image and the luminosity of a portion other than the image, $b_0$ represents a positive real number and is preferably around 0.2, and $b_1$ represents a negative real number and is preferably around −0.2.

The visibility value represented by Mathematical formula (1) expresses characteristics that the visibility is higher as the luminosity of the image is higher, and that the visibility disappears when the luminosity difference between the image and the portion other than the image disappears.

The visibility value is preferably 2 or greater and more preferably 6 or greater.

FIG. 13A to FIG. 13H illustrate specific examples of the image 11 including a plurality of dented portions 12 in the container body.

FIG. 13A to FIG. 13F illustrate examples in which the image 11 includes a plurality of dented portions 12 and non-dented portions 13.

Figure 13A:
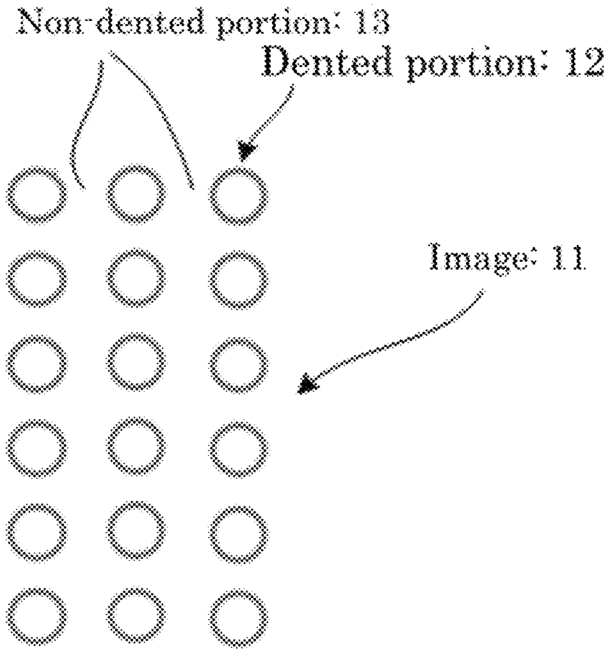
FIG. 13A is a view illustrating an example of an image including a plurality of dented portions according to another embodiment of a container.
Figure 13B:
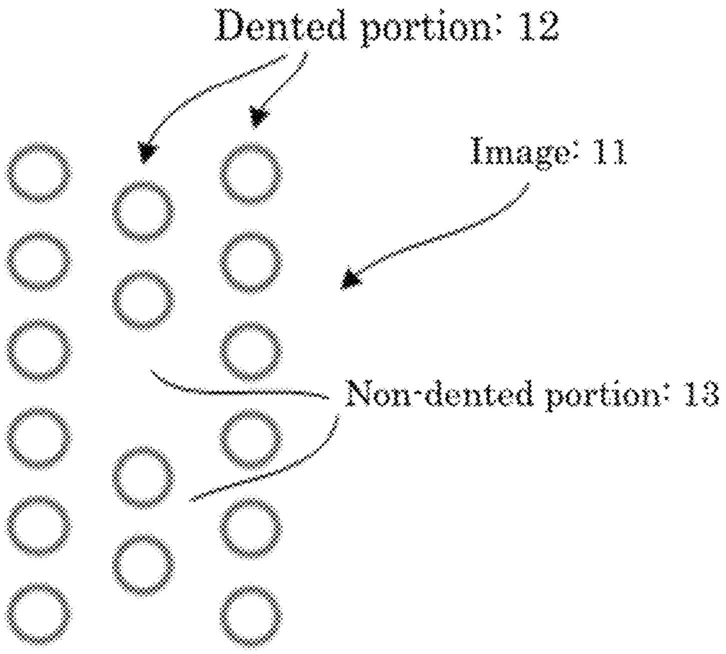
FIG. 13B is a view illustrating another example of an image including a plurality of dented portions according to another embodiment of a container.
Figure 13C:
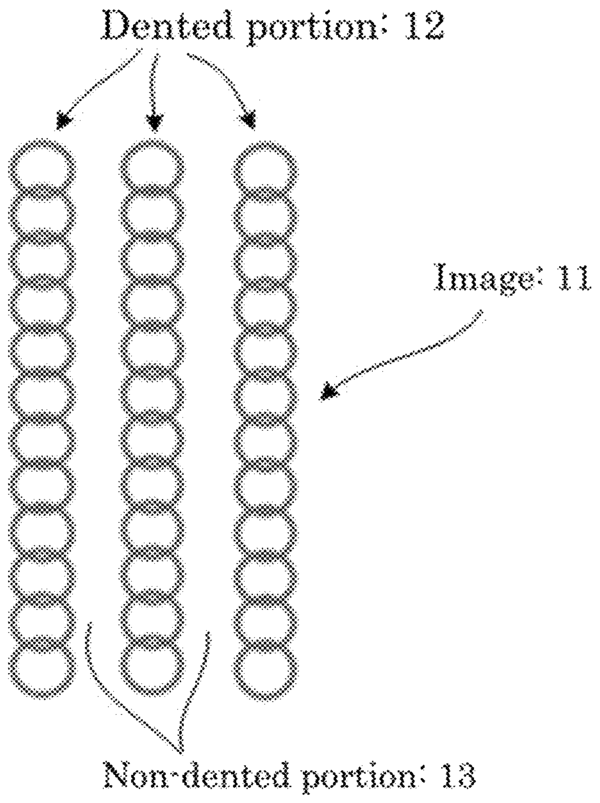
FIG. 13C is a view illustrating another example of an image including a plurality of dented portions according to another embodiment of a container.
Figure 13D:
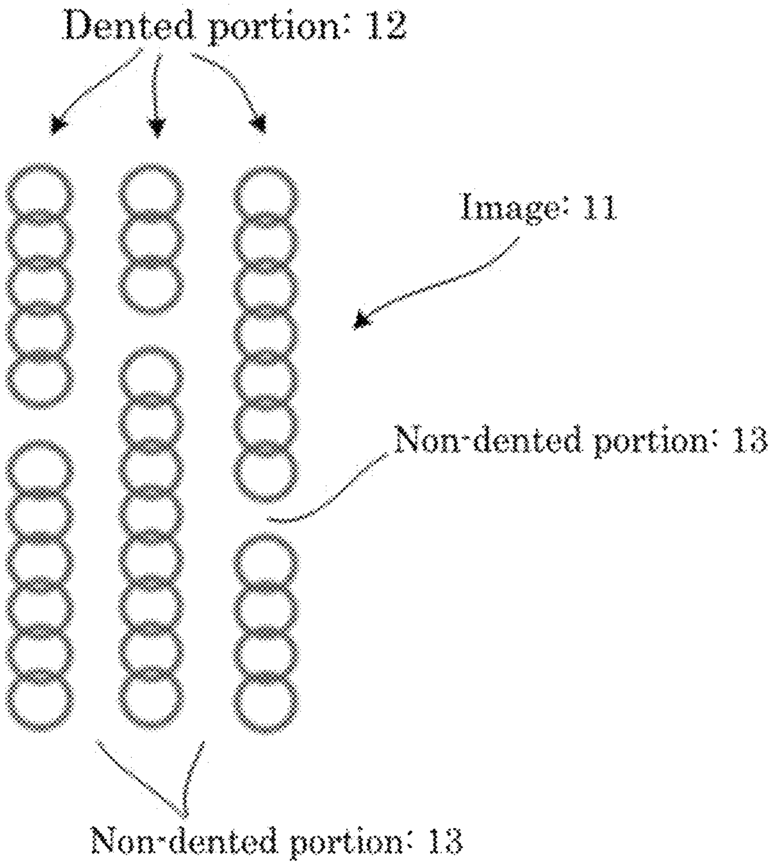
FIG. 13D is a view illustrating another example of an image including a plurality of dented portions according to another embodiment of a container.
Figure 13E:
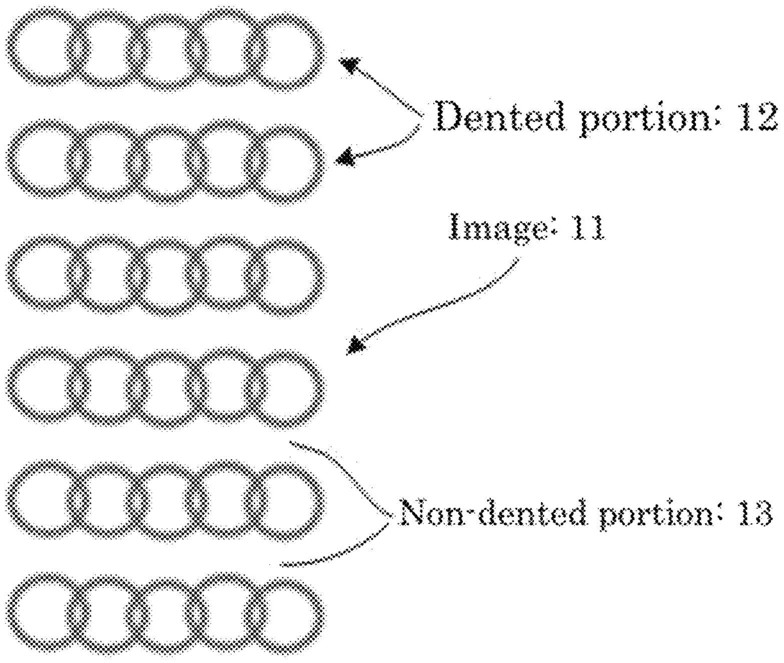
FIG. 13E is a view illustrating another example of an image including a plurality of dented portions according to another embodiment of a container.
Figure 13F:
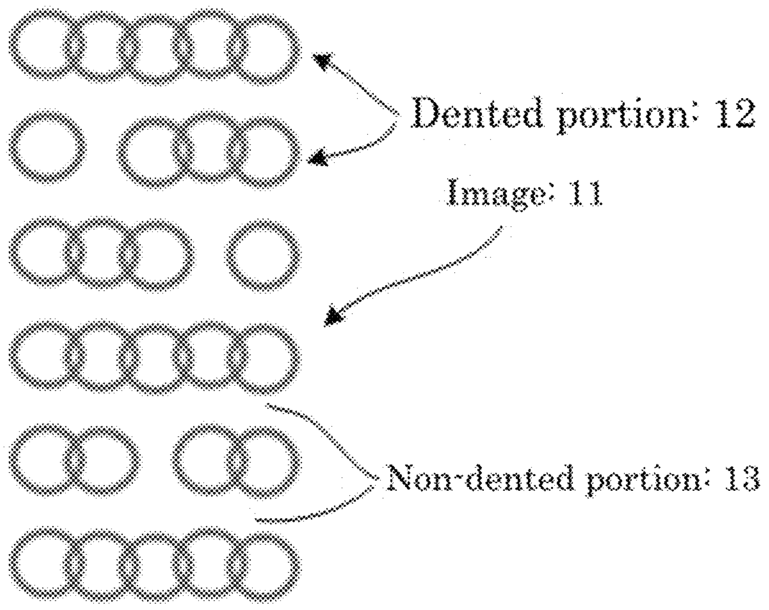
FIG. 13F is a view illustrating another example of an image including a plurality of dented portions according to another embodiment of a container.
Figure 13G:
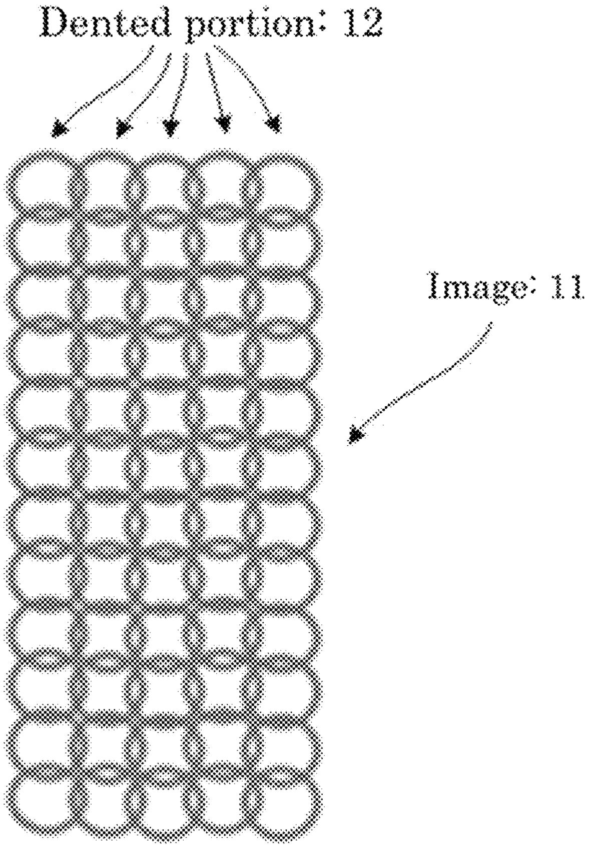
FIG. 13G is a view illustrating another example of an image including a plurality of dented portions according to another embodiment of a container.
Figure 13H:
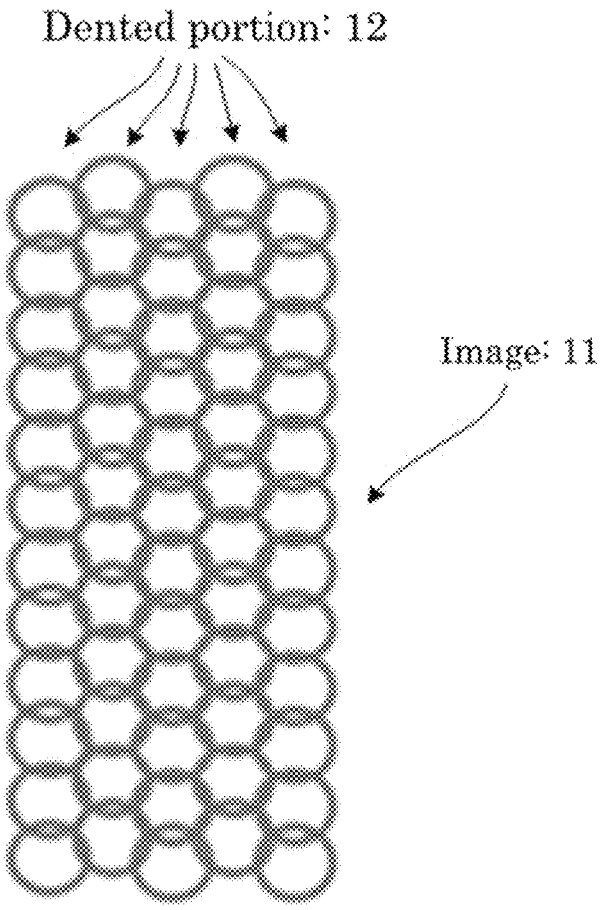
FIG. 13H is a view illustrating another example of an image including a plurality of dented portions according to another embodiment of a container.

FIG. 130 and FIG. 13H illustrate examples in which the image 11 includes only a plurality of dented portions 12 but does not include non-dented portions 13.

The image may be any of the images illustrated in FIG. 13A to FIG. 13H, or a combined image of two or more of these images.

In yet another embodiment of the container of the present disclosure, the container is filled with a liquid, has a transmittance a of 50 or higher but 100 or lower, and includes a container body and images on the container body, the images including a plurality of dented portions and non-dented portions. The images are formed on both of two regions, namely a region (front side) including such an external surface of the container as can be directly seen when the container is viewed from a predetermined viewing position relative to the container, and a region (back side) including such an external surface of the container as can only be seen through the interior of the container. There is at least one viewing position that satisfies the condition described above. V1, which represents a visibility value on the front side represented by Mathematical formula (1) below, and V2, which represents a visibility value on the back side represented by Mathematical formula (1) below, satisfy the following formula: $V2/V1 < 0.55$.

$$\text{Visibility value} = b_0 \cdot L^*_0 \cdot (1 - \exp(b_1 \cdot \Delta L^*)) \quad \text{Mathematical formula (1)}$$

In Mathematical formula (1), $L^*_0$ represents the luminosity of the images, $\Delta L^*$ represents the difference between the luminosity of the images and the luminosity of a portion other than the images, $b_0$ represents a positive real number, and $b_1$ represents a negative real number.

The transmittance a is 50 or higher but 100 or lower, and is preferably 50 or higher but 100 or lower in a wavelength range of from 400 nm through 800 nm.

In the present disclosure, it is preferable that the following formulae: $V1 > 5$ and $0 < V2 < 4$ be satisfied.

The transmittance a can be measured with, for example, a transmittance meter TLV-304-BP available from Asahi Spectra Co., Ltd.

Figure 14:
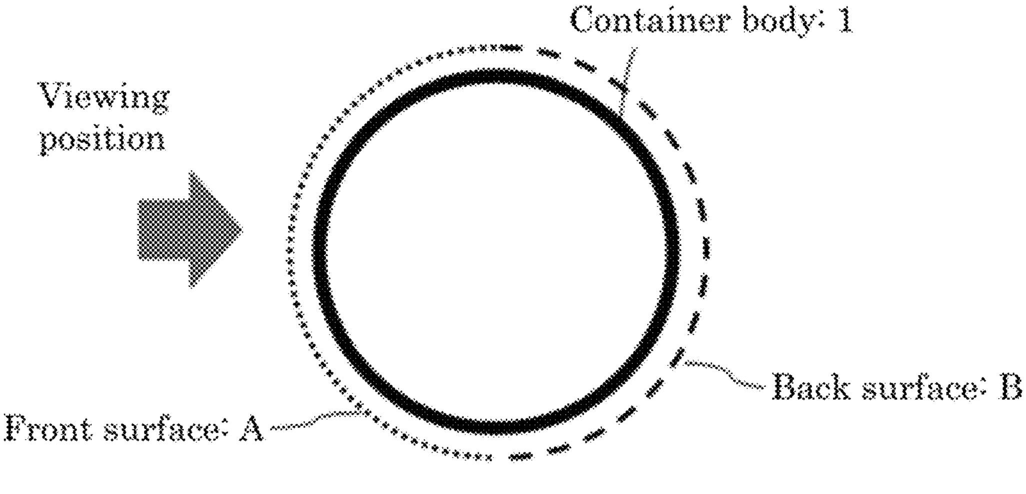
FIG. 14 is an exemplary top view of a container body.

FIG. 14 is a top view of the container body 1. The surface that is denoted by A in FIG. 14 and can be directly seen when the container is viewed from a predetermined position will be referred to as “front surface” below. The surface that is denoted by B in FIG. 14 and can be seen through the interior of the container will be defined to as “back surface” below.

Next, the visibility value V1 of the “front surface” and the visibility value V2 of the “back surface” will be defined below.

The visibility value V1 of the “front surface” can be calculated according to the same method as Mathematical formula (1) above in the visibility evaluation method described above.

The visibility value V2 of the “back surface” is calculated according to Mathematical formula (1) above, based on luminosity values of a visible region and a region other than the visible region on the back surface measured through the transparent container with the camera focus kept focused on a position on the front surface.

Figure 15A:
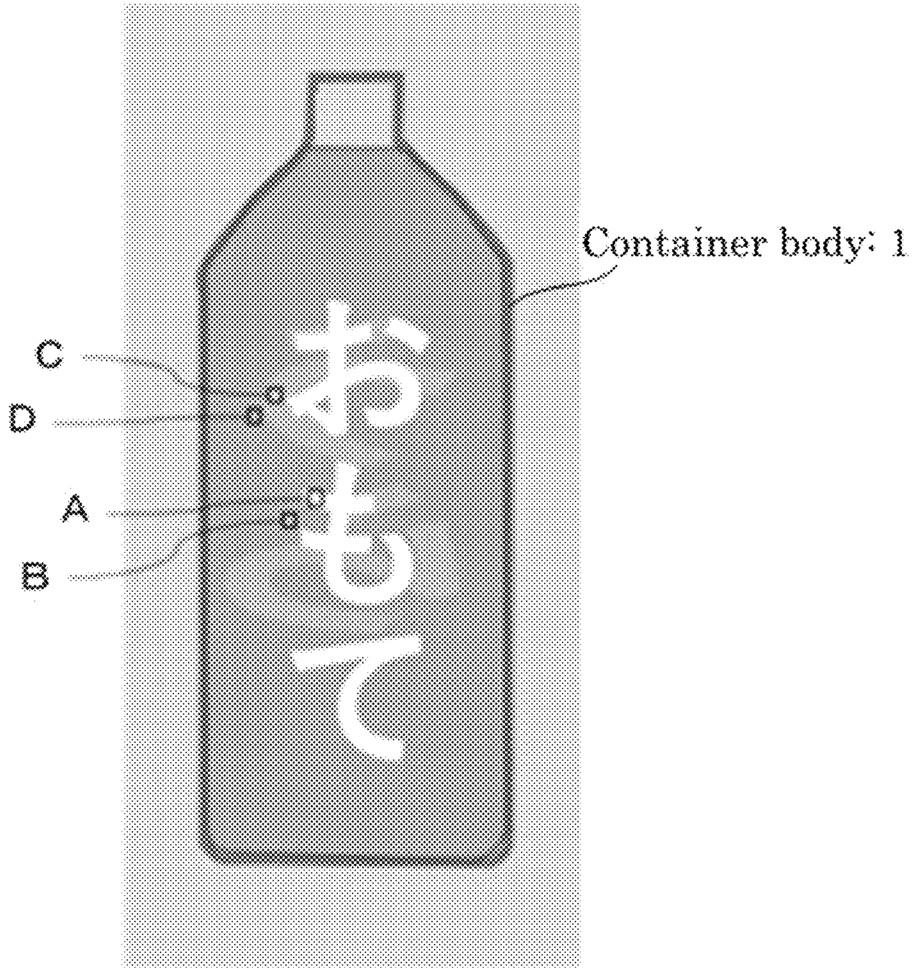
FIG. 15A is a view illustrating an example of a container having a drawn image representing Japanese characters "おもて" on a front surface and a drawn image representing Japanese characters "うら" on a back surface.
Figure 16A:
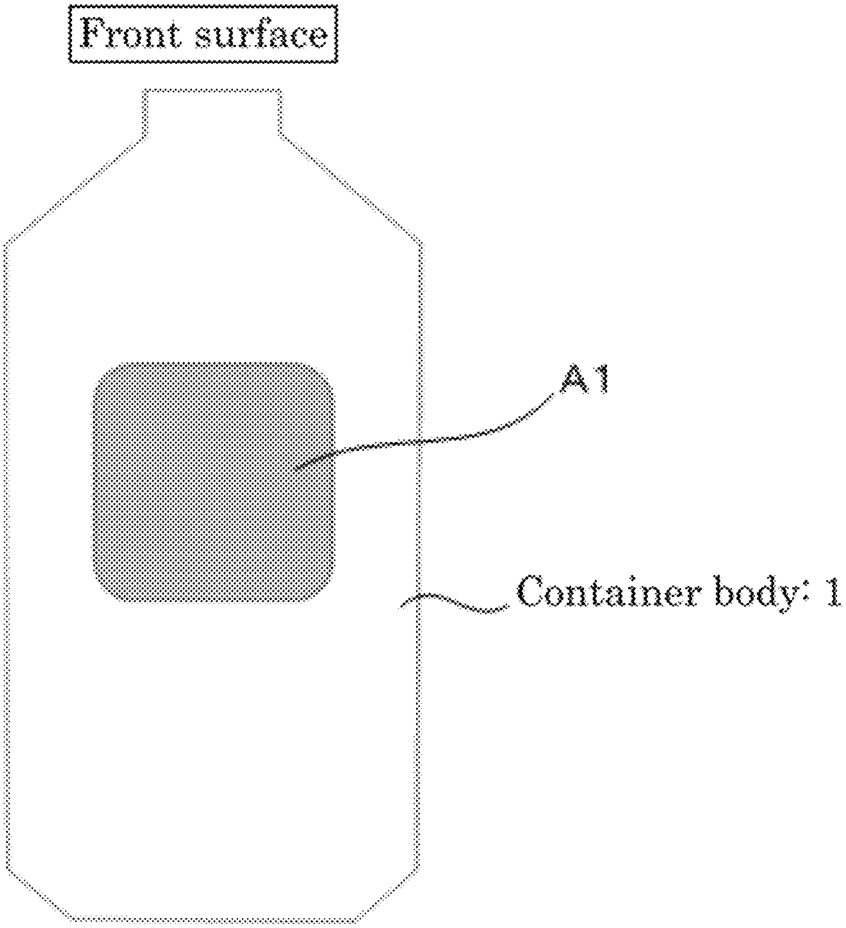
FIG. 16A is a view illustrating an example of a container having a drawn image A1 (with a total area S1) on a front surface in relation with a degree of image overlap between a front surface and a back surface.

FIG. 16A is a view illustrating an example of a container having a drawn image representing Japanese characters "おもて" on the front surface and a drawn image representing Japanese characters "うら" on the back surface. In FIG. 15A, "A" is an example of a sample region of a visible region on the "front surface", "B" is an example of a sample region of a region other than the visible region on the "front surface", "C" is an example of a sample region of a visible region on the "back surface", and "D" is an example of a sample region of a region other than the visible region on the "back surface".

When calculated visibility values of the "front surface" and the "back surface" of a predetermined container satisfy the following conditional expression, it is easy to read the drawn image on the "front surface". The conditional expression is V2/V1<0.55, where V1 represents the visibility value on the front side and V2 represents the visibility value on the back side viewed from the front side.

When the conditional expression is satisfied, it is easy to read the "front surface". However, when the conditional expression is not satisfied, the images on the "front surface" and the "back surface" overlap each other, and it is difficult to read the image on the "front surface".

It is optional to define which side is the "front surface". Wherever is the "front surface", it is preferable that the conditional expression: V2/V1<0.55 be satisfied.

Figure 15B:
FIG. 15B is a view illustrating an example of a state that a solution having a light color is contained in a container having a drawn image representing Japanese characters "おもて" on a front surface and a drawn image representing Japanese characters "うら" on a back surface.
Figure 15C:
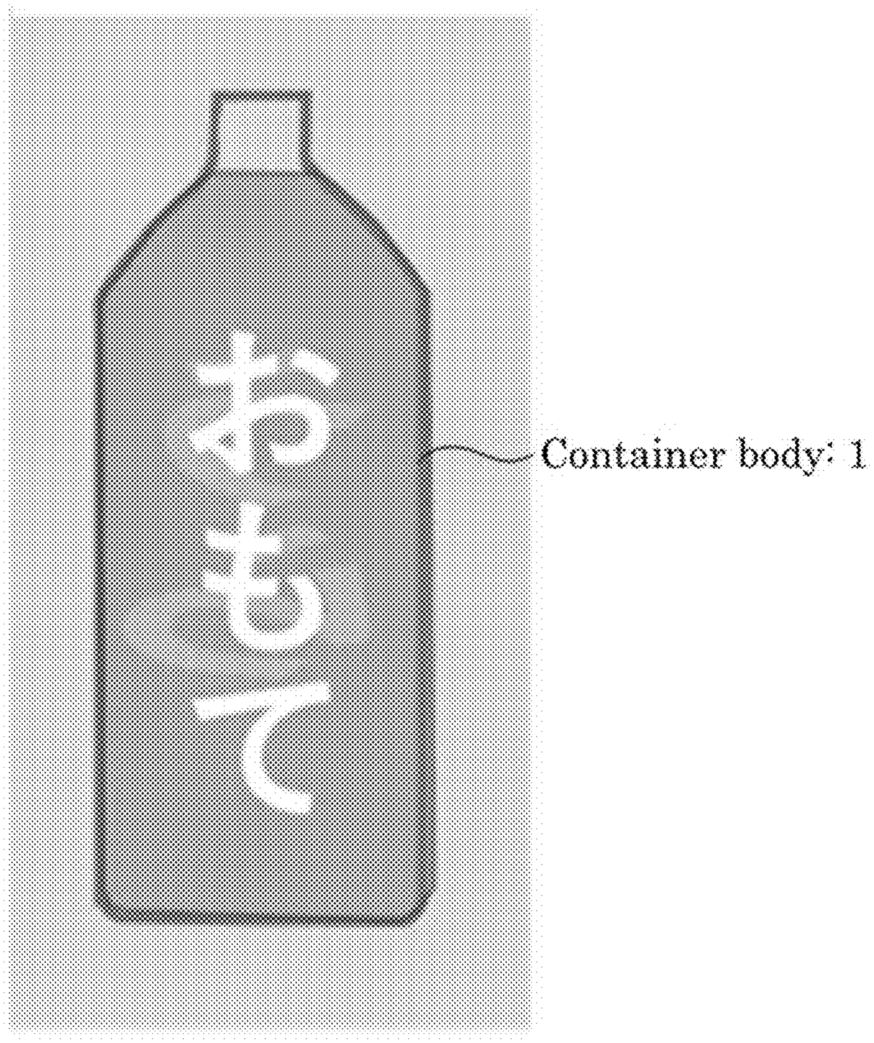
FIG. 15C is a view illustrating an example of a state that a solution having a deep color is contained in a container having a drawn image representing Japanese characters "おもて" on a front surface and a drawn image representing Japanese characters "うら" on a back surface.

FIG. 15B is a view illustrating an example of a state that a solution having a light color is contained in a container having a drawn image representing Japanese characters "おもて" on the front surface and a drawn image representing Japanese characters "うら" on the back surface. FIG. 15C is a view illustrating an example of a state that a solution having a deep color is contained in a container having a drawn image representing Japanese characters "おもて" on the front surface and a drawn image representing Japanese characters "うら" on the back surface.

In FIG. 15B, a colorless, transparent liquid such as water is sealed inside the container, and the above conditional expression: V2/V1<0.55 is not satisfied. In this case, the image representing Japanese characters "おもて" and a reversed image of the image representing Japanese characters "うら" overlap each other, and it is difficult to read the image.

In FIG. 15C, a colored liquid such as tea, coffee, a juice, and a lactic drink, or a colloid solution is sealed inside the container, and the above conditional expression: V2/V1<0.55 is satisfied. In this case, the reversed image of the image representing Japanese characters "うら" is not so conspicuous, and it is easy to read the image.

Table A presents the measurements of visible values of several liquids 1 to 7. "Liquid 1" in Table A represents water. As water is almost transparent, the images on the front and back overlap each other, and the visibility is not good, as demonstrated by the above conditional expression: V2/V1 being 0.99. The liquids 2 to 7 other than water satisfy the above conditional expression: V2/V1<0.55, and the image on the front can be seen well.

TABLE A

| Target No. | Content | Front visibility value V1 | Back visibility value V2 | V2/V1 |
|---|---|---|---|---|
| Liquid 1 | Water | 8.15 | 8.1 | 0.99 |
| Liquid 2 | Tea 1 | 6.01 | 1 | 0.17 |
| Liquid 3 | Coffee 1 | 5.69 | 0 | 0 |
| Liquid 4 | Coffee 2 | 5.72 | 0.15 | 0.03 |

TABLE A-continued

| Target No. | Content | Front visibility value V1 | Back visibility value V2 | V2/V1 |
|---|---|---|---|---|
| Liquid 5 | Tea 2 | 8.62 | 4.59 | 0.53 |
| Liquid 6 | Milky drink 1 | 8.64 | 3.57 | 0.41 |
| Liquid 7 | Milky drink 2 | 3.37 | 1.65 | 0.49 |

It is preferable that the following formula: S2/S1<0.2 or S3/S4>8 be satisfied, where S1 represents the total area of the image on the front side when seen from the front side. S2 represents the area of an overlapping portion between the images on the front side and the back side when seen from the front side, S3 represents the total area of the image on the back side when seen from the back side, and S4 represents the area of an overlapping portion between the images on the back side and the front side when seen from the back side.

Figure 16B:
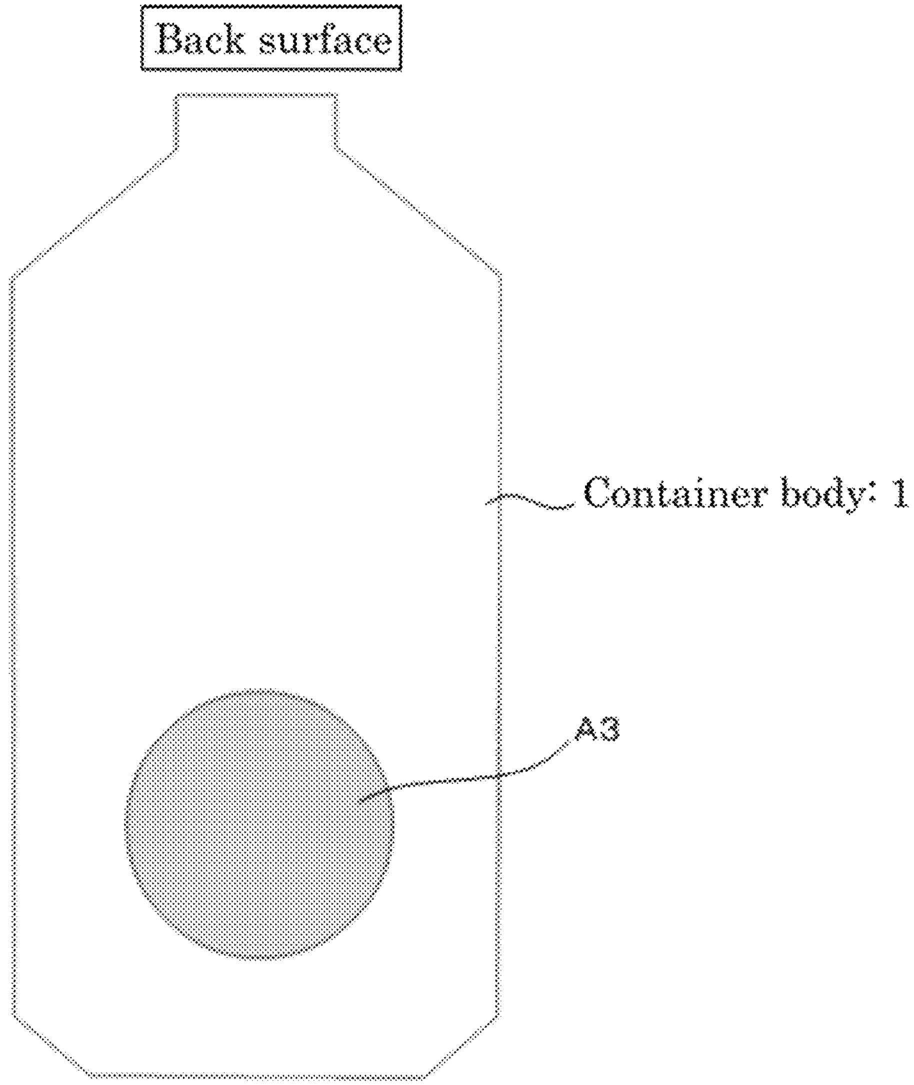
FIG. 16B is a view illustrating an example of a container having a drawn image A3 (with a total area S3) on a back surface in relation with a degree of image overlap between a front surface and a back surface.

FIG. 16A is a view illustrating an example of a container having a drawn image A1 (with a total area S1) on the front surface in relation with the degree of image overlap between the front surface and the back surface. FIG. 16B is a view illustrating an example of a container having a drawn image A3 (with a total area S3) on the back surface in relation with the degree of image overlap between the front surface and the back surface.

Figure 16C:
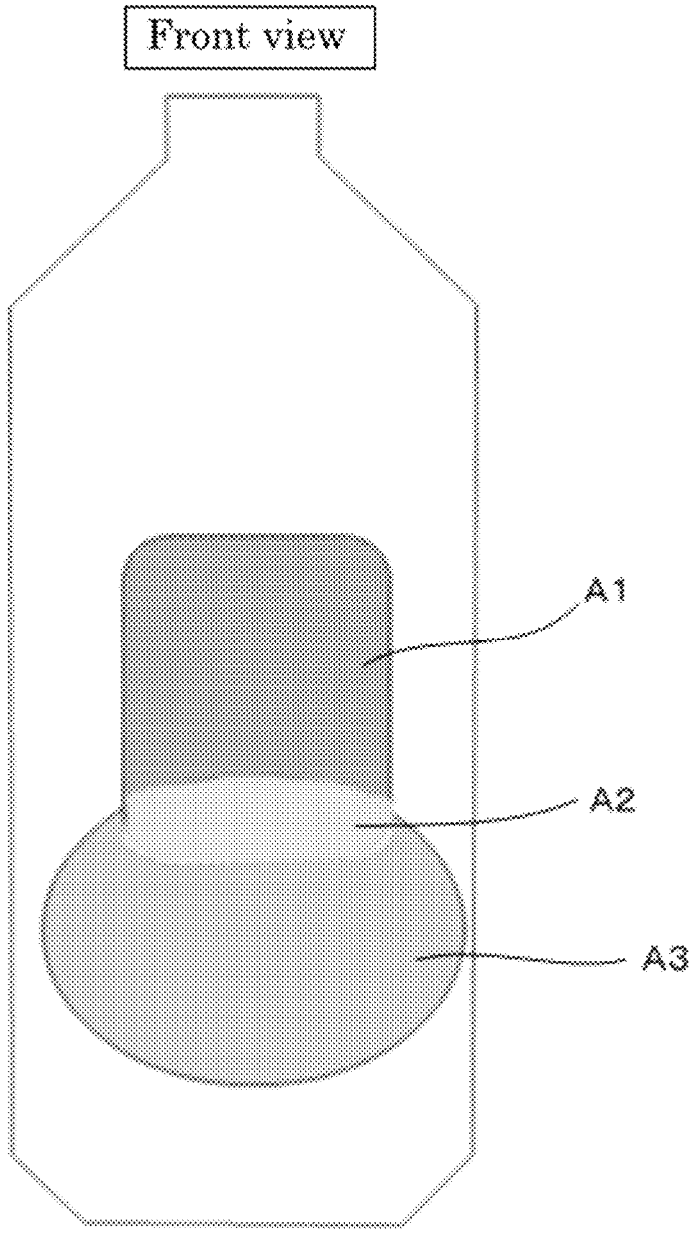
FIG. 16C is a view illustrating an example of a container having drawing images A1 and A3 and an overlapping portion A2 (with a total area S2) between A1 and A3, seen from a front side.
Figure 16D:
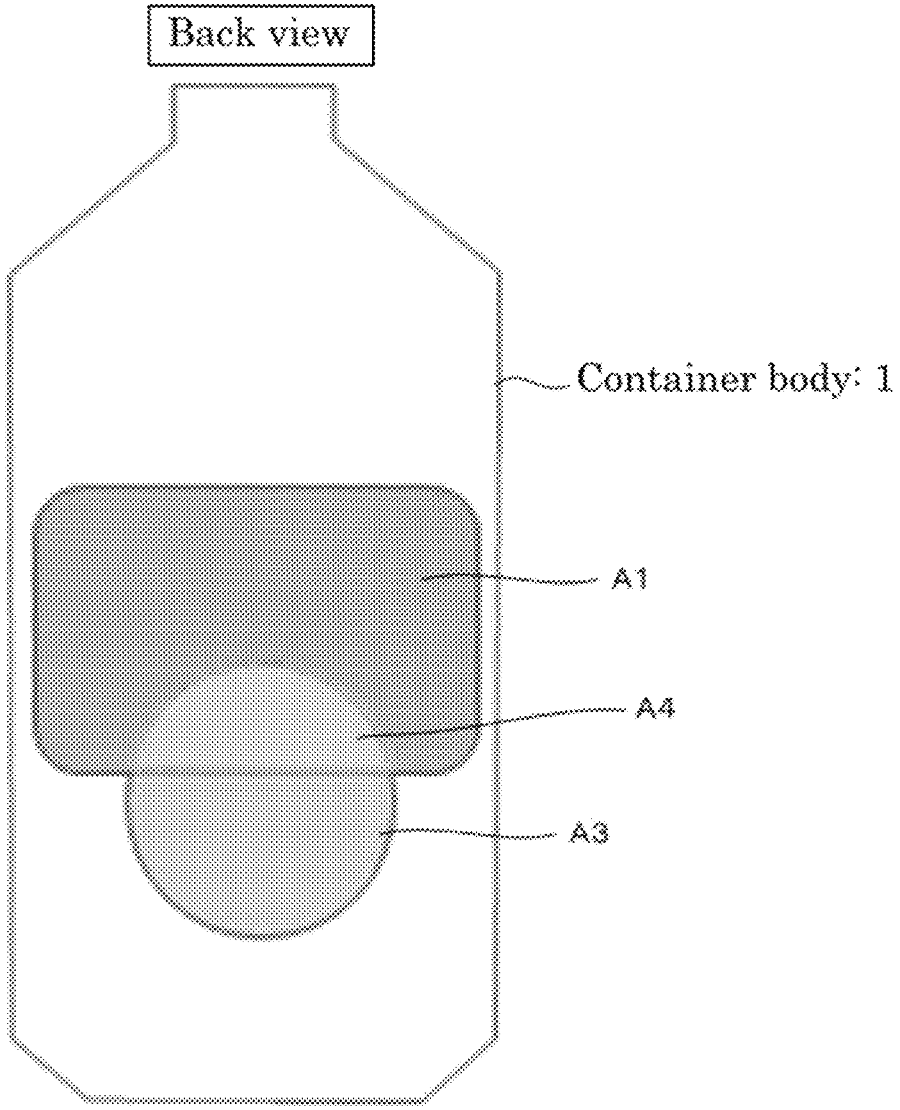
FIG. 16D is a view illustrating an example of a container having drawn images A1 and A3 and an overlapping portion A4 (with a total area S4) between A1 and A3, seen from a back side.

FIG. 16C is a view illustrating an example of a container having drawing images A1 and A3 and an overlapping portion A2 (with a total area S2) between A1 and A3, seen from the front side. FIG. 16D is a view illustrating an example of a container having drawn images A1 and A3 and an overlapping portion A4 (with a total area S4) between A1 and A3, seen from the back side.

Figure 17A:
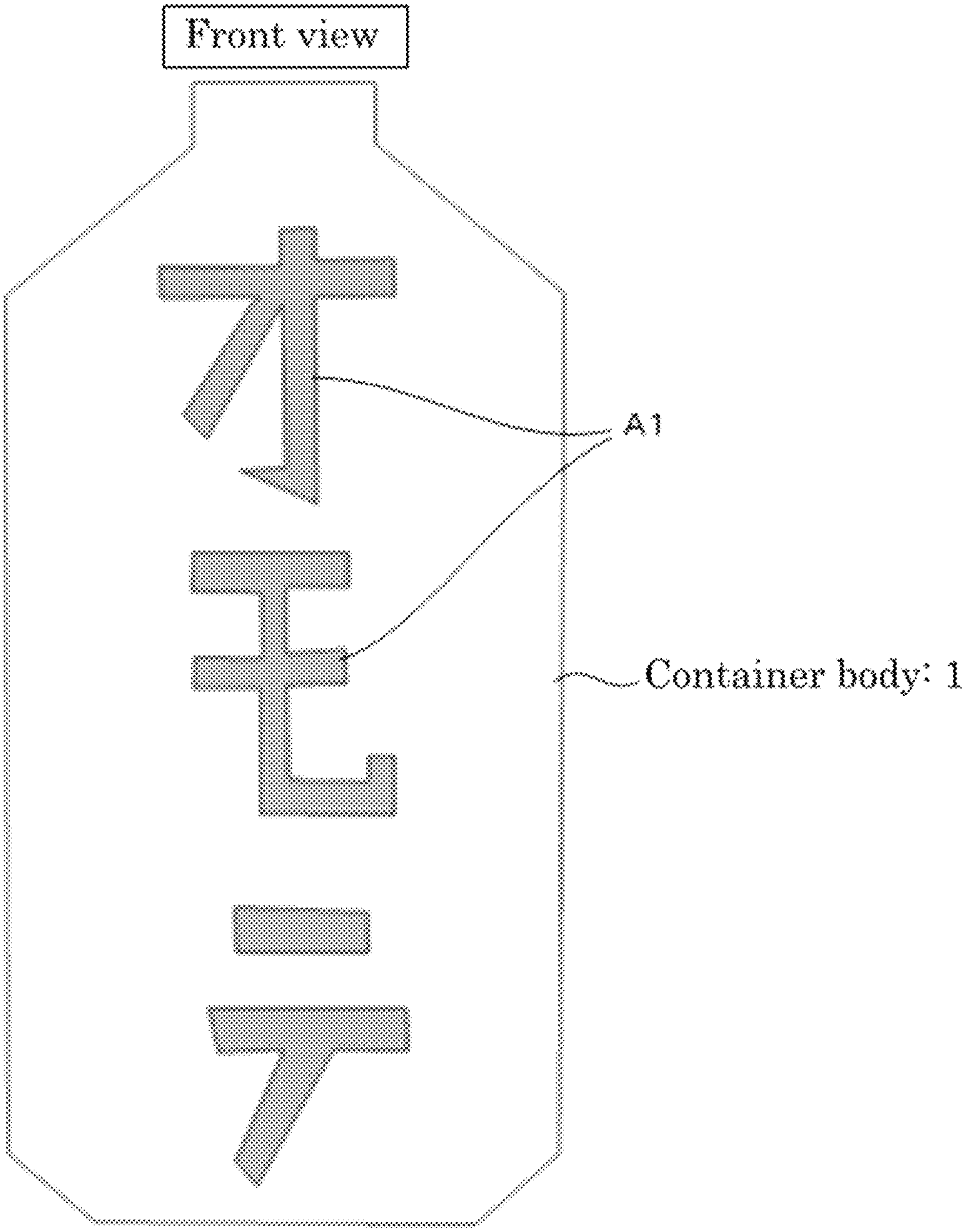
FIG. 17A is a view illustrating an example of a container having a drawn image representing Japanese characters "オモテ" on a front surface.
Figure 17B:
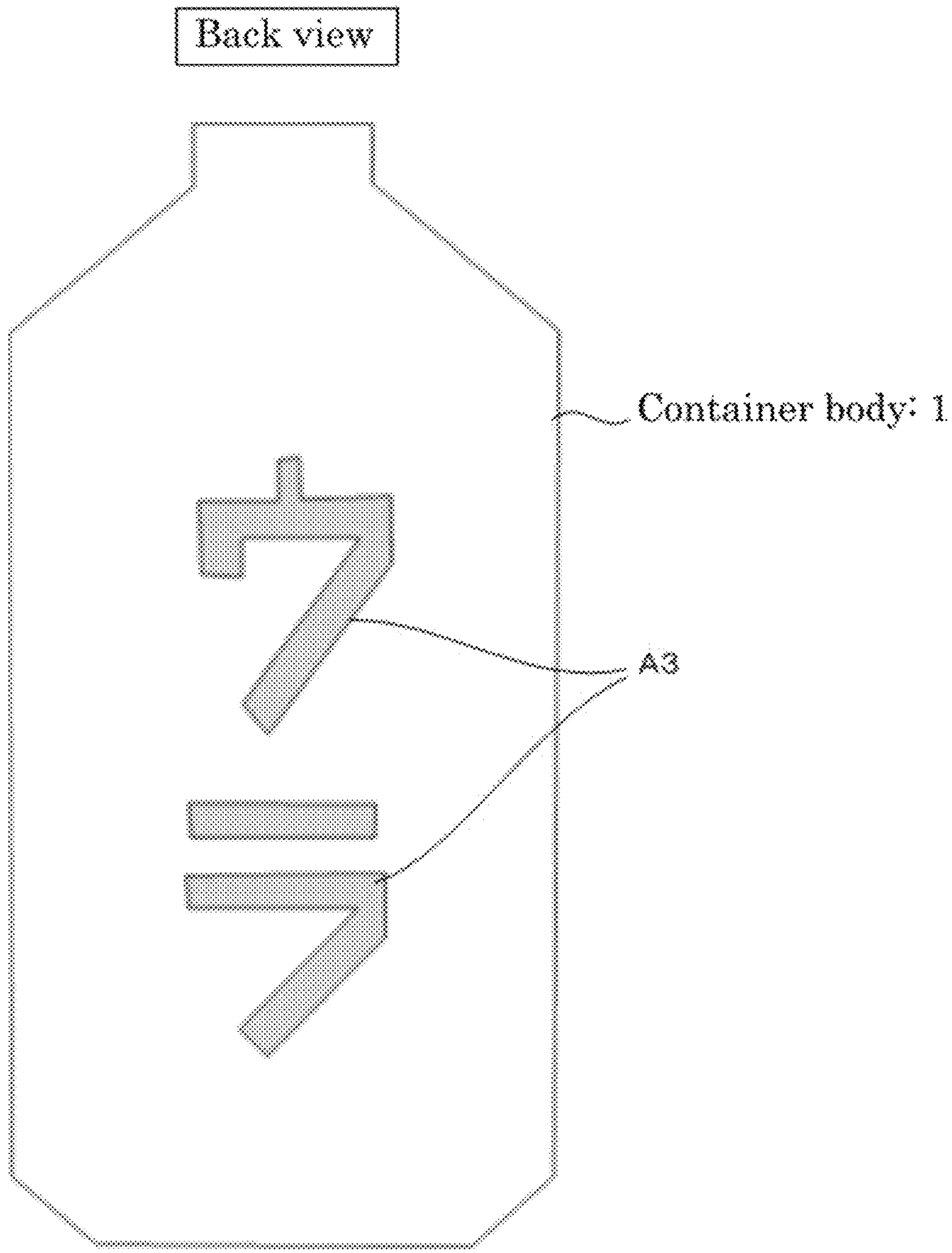
FIG. 17B is a view illustrating an example of a container having a drawn image representing Japanese characters "ウラ" on a back surface.

FIG. 17A is a view illustrating an example of a container having a drawn image A1 representing Japanese characters "オモテ" on the front surface. FIG. 17B is a view illustrating an example of a container having a drawn image A3 representing Japanese characters "ウラ" on the back surface.

Figure 18A:
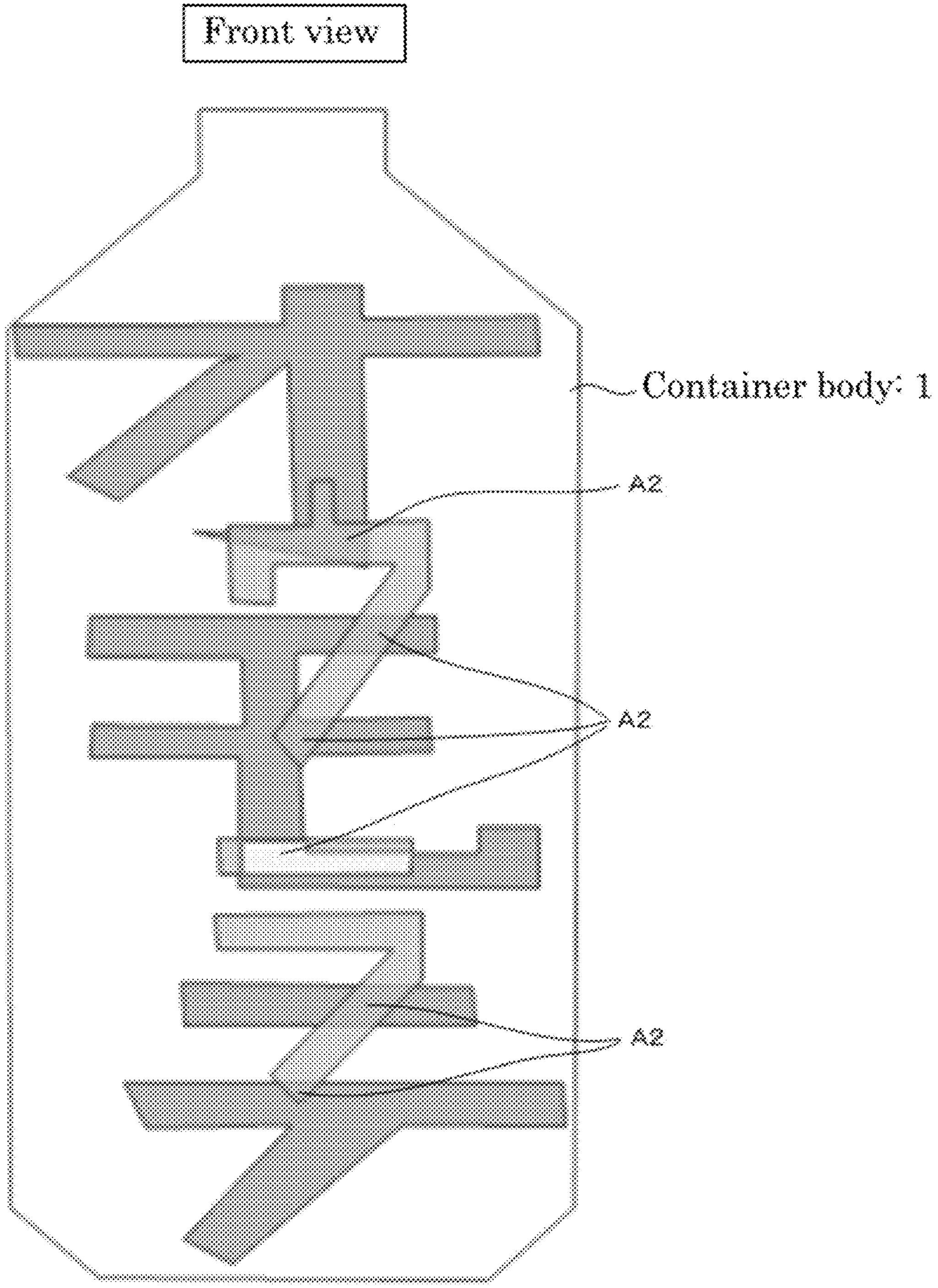
FIG. 18A is a view of an example of a container, illustrating overlapping portions A2 (with a total area S2) between A1 and A3 seen from a back side.
Figure 18B:
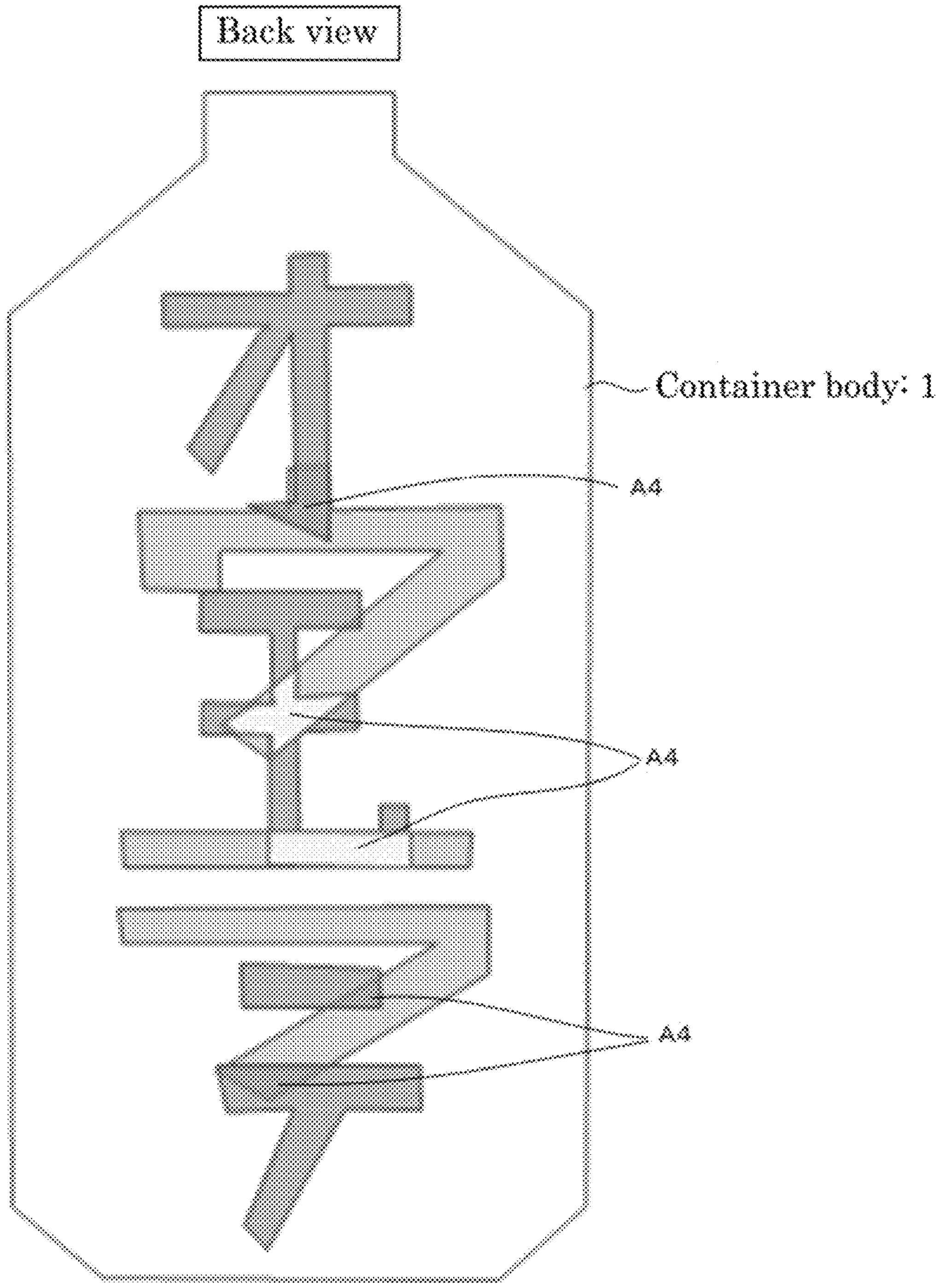
FIG. 18B is a view of an example of a container, illustrating overlapping portions A4 (with a total area S4) between A1 and A3 seen from a back side.

FIG. 18A is a view illustrating an example of a container, indicating overlapping portions A2 (with a total area S2) between A1 and A3 seen from the front side. FIG. 18B is a view illustrating an example of a container, indicating overlapping portions A4 (with a total area S4) between A1 and A3 seen from the back side.

When the image representing Japanese characters "オモテ" having a total area S1 is formed on the front surface as illustrated in FIG. 17A and the image representing Japanese characters "ウラ" having a total area S3 is formed on the back surface as illustrated in FIG. 17B, the visibility is good when the following formula S2/S1<0.2 is satisfied as illustrated in FIG. 18A, whereas visibility cannot be secured when the following formula: S3/S4<8 is satisfied as illustrated in FIG. 18B.

Figure 19A:
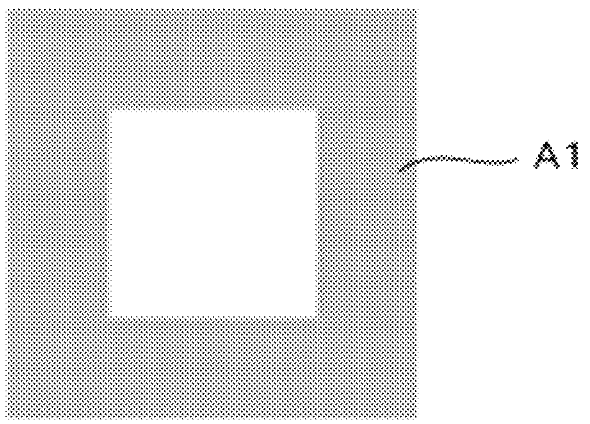
FIG. 19A is a view illustrating an image A1 (representing an outlined square shape having a size of 20 mm×20 mm and an area of 300 $mm^2$)
Figure 19B:
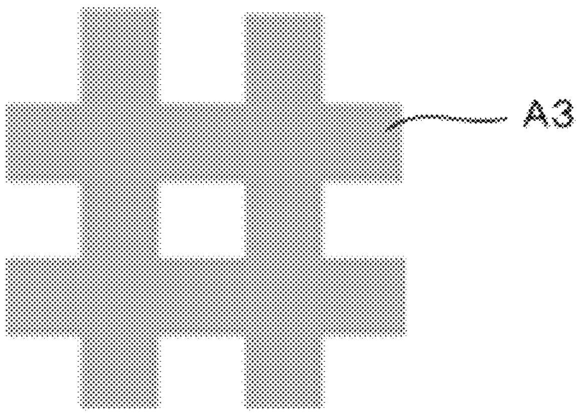
FIG. 19B is a view illustrating an image A3 (representing a grid shape having a size of 20 mm×20 mm and an area of 256 $mm^2$)

FIG. 19A is a view illustrating an image A1 (representing an outlined square shape having a size of 20 mm×20 mm and an area of 300 $mm^2$). FIG. 19B is a view illustrating an image A3 (representing a grid shape having a size of 20 mm×20 mm and an area of 256 $mm^2$).

For example, the image A1 illustrated in FIG. 19A (representing an outlined square shape having a size of 20 mm×20 mm and an area of 300 $mm^2$) is drawn on the front surface of a PET bottle having a diameter of 60 mm and filled with water, and the image A3 illustrated in FIG. 19B (representing a grid shape having a size of 20 mm×20 mm and an area of 256 $mm^2$) is drawn on the back surface or the PET bottle.

Figure 20A:
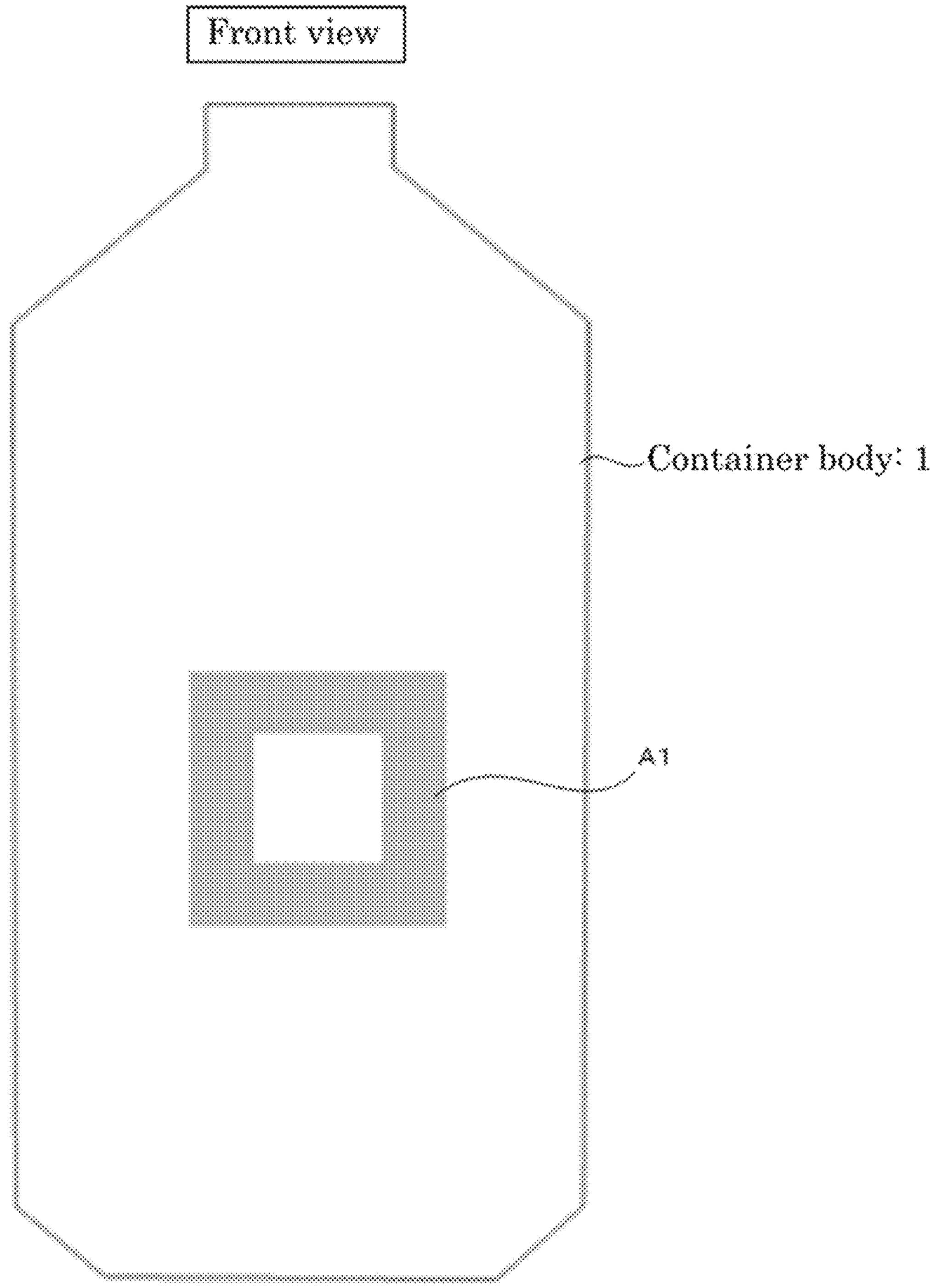
FIG. 20A is a front view of a container having drawn images A1 and A3.
Figure 20B:
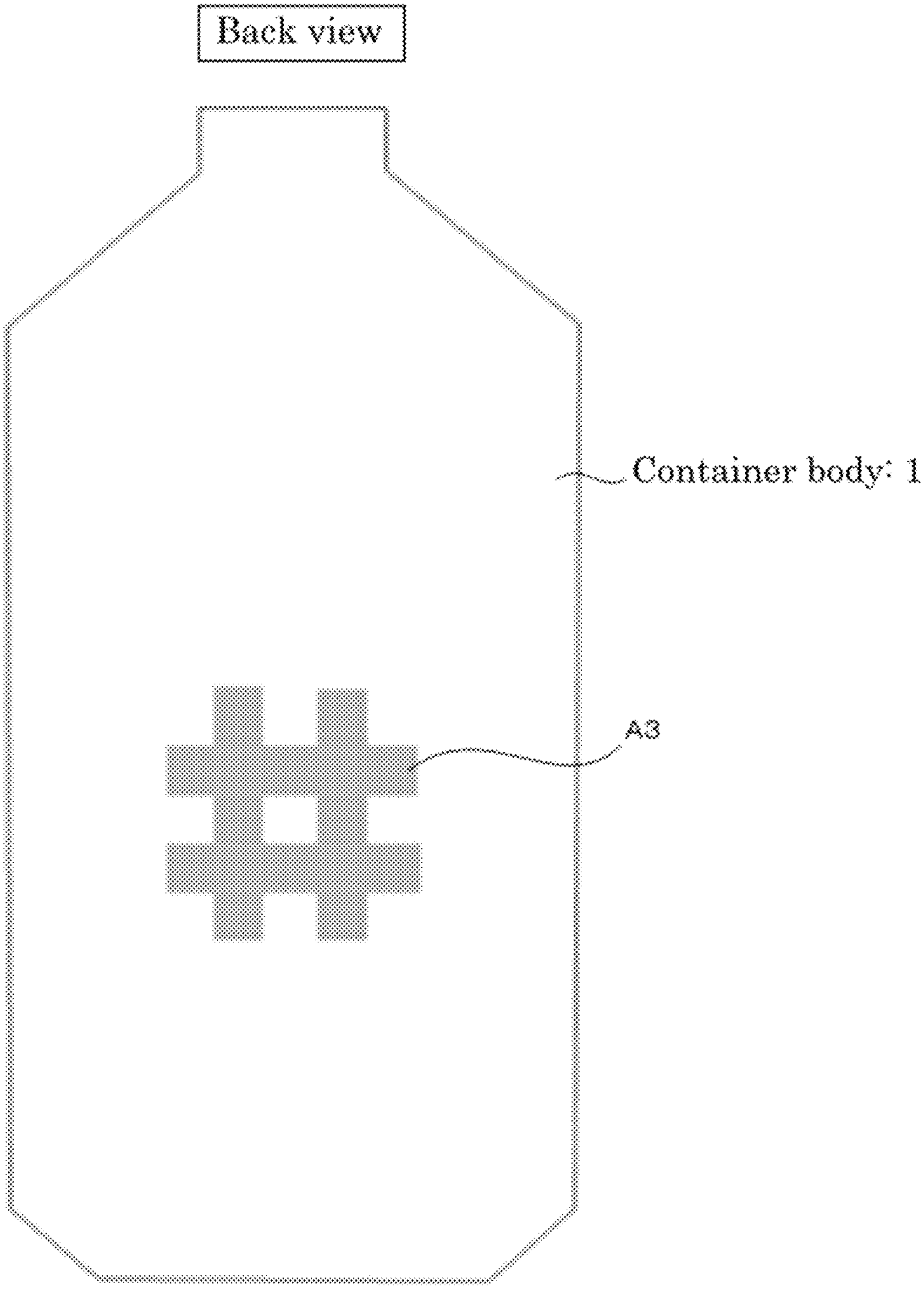
FIG. 20B is a back view of a container having drawn images A1 and A3.

FIG. 20A is a front view of a container having drawn images A1 and A3. FIG. 20B is a back view of a container having drawn images A1 and A3.

Figure 21A:
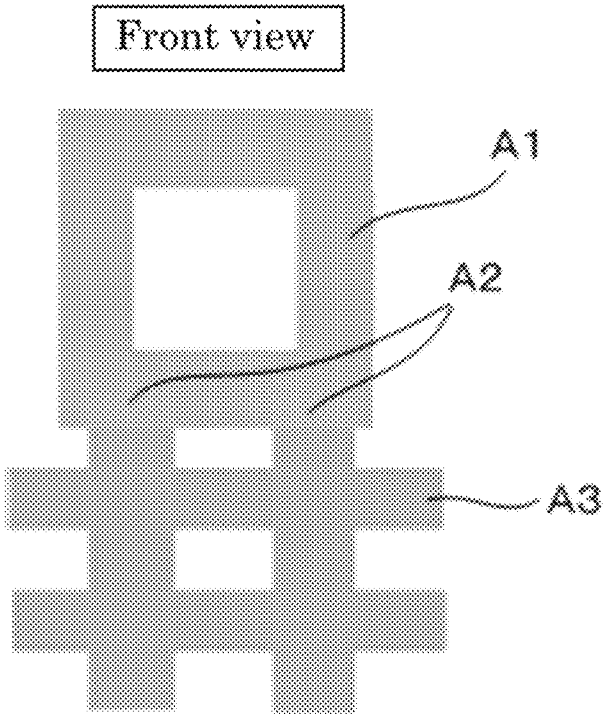
FIG. 21A is a front view when A1 and A3 are drawn in a manner that S2/S1=0.1 is satisfied (with an overlap of about 24 $mm^2$) or S3/S4=9 is satisfied (with an overlap of 24 $mm^2$)
Figure 21B:
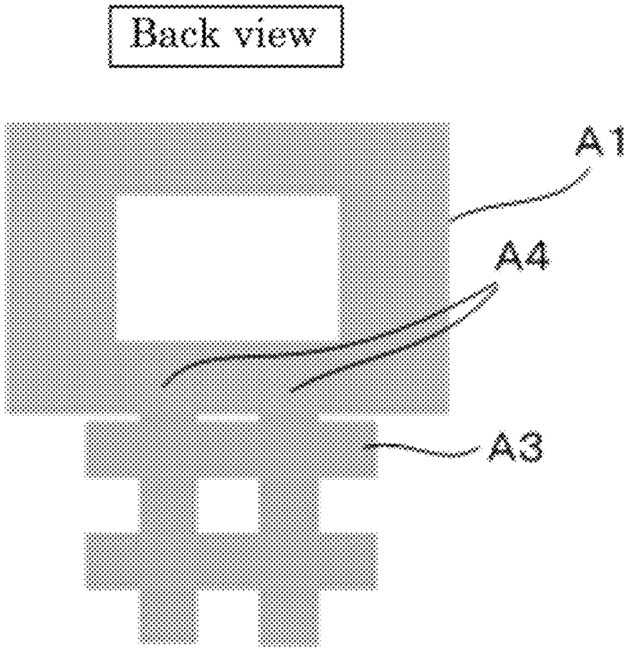
FIG. 21B is a back view when A1 and A3 are drawn in a manner that S2/S1=0.1 is satisfied (with an overlap of about 24 $mm^2$) or S3/S4=9 is satisfied (with an overlap of 24 $mm^2$)

FIG. 21A is a front view when A1 and A3 are drawn in a manner that S2/S1=0.1 is satisfied (with an overlap of about 24 $mm^2$) or S3/S4=9 is satisfied (with an overlap of 24 $mm^2$). FIG. 21B is a back view when A1 and A3 are drawn in a manner that S2/S1=0.1 is satisfied (with an overlap of about 24 $mm^2$) or S3/S4=9 is satisfied (with an overlap of 24 $mm^2$).

Figure 21C:
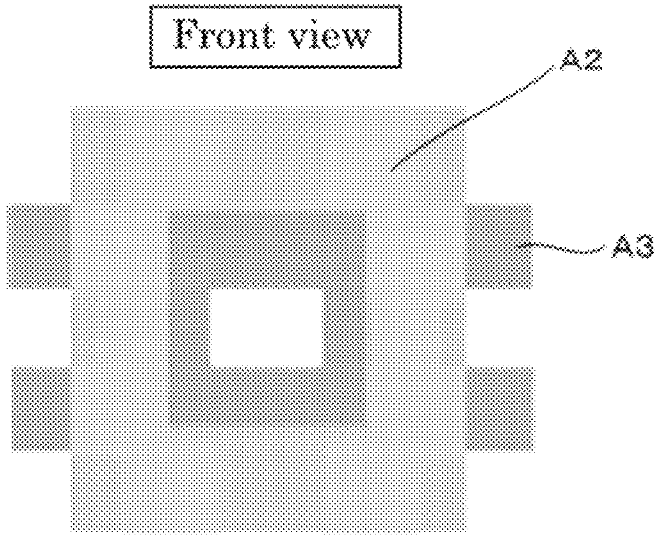
FIG. 21C is a front view when A1 and A3 are drawn in a manner that S2/S1=0.56 is satisfied (with an overlap of 156 $mm^2$) or S3/S4=1.7 is satisfied (with an overlap of 168 $mm^2$)
Figure 21D:
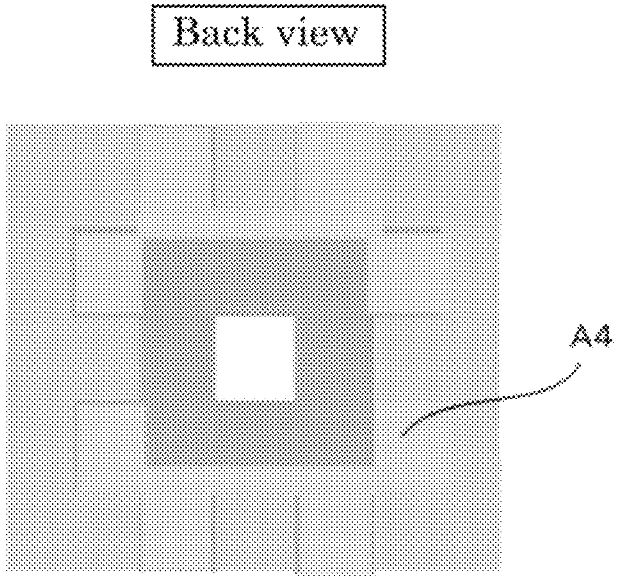
FIG. 21D is a back view when A1 and A3 are drawn in a manner that S2/S1=0.56 is satisfied (with an overlap of 156 $mm^2$) or S3/S4=1.7 is satisfied (with an overlap of 168 $mm^2$)

FIG. 21C is a front view when A1 and A3 are drawn in a manner that S2/S1=0.56 is satisfied (with an overlap of 156 $mm^2$) or S3/D4=1.7 is satisfied (with an overlap of 168 $mm^2$). FIG. 21D is a back view when A1 and A3 are drawn in a manner that S2/S1=0.56 is satisfied (with an overlap of 156 $mm^2$) or S3/D4=1.7 is satisfied (with an overlap of 168 $mm^2$).

When A1 and A3 are disposed in a manner that S2/S1=0.1 is satisfied (with an overlap of about 24 $mm^2$) or that S3/S4=9 is satisfied (with an overlap of 24 $mm^2$), the front view is as illustrated in FIG. 21A and the back view is as illustrated in FIG. 21B. It is easy to discern the "outline square shape" seen from the front side and the "grid shape" seen from the back side.

On the other hand, when A1 and A3 are disposed in a manner that S2/S1=0.56 is satisfied (with an overlap of 156 $mm^2$) or that S3/D4=1.7 is satisfied (with an overlap of 168 $mm^2$), the front view is as illustrated in FIG. 21C and the back view is as illustrated in FIG. 21D. It is not easy to discern the "outlined square shape" seen from the front side and the "grid shape" seen from the back side.

Figure 22A:
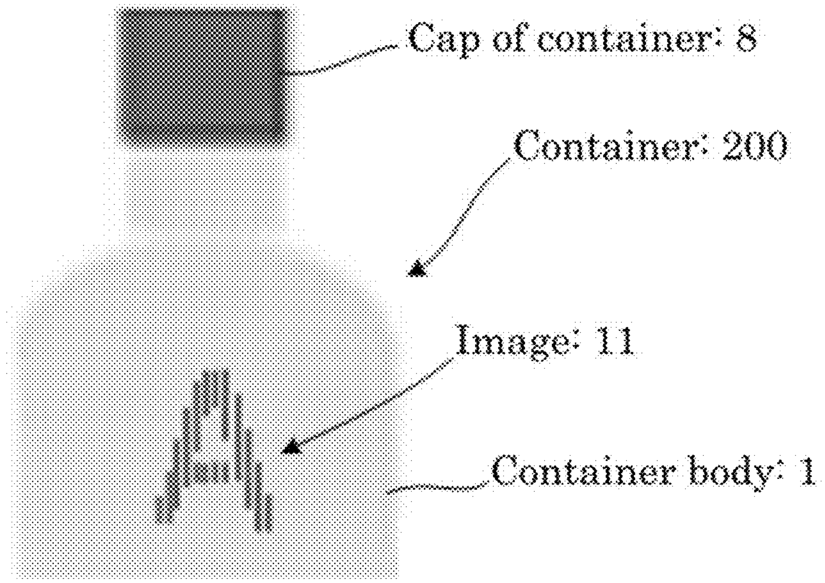
FIG. 22A is a view illustrating a state of an image drawn in a vertical direction of a container.
Figure 22B:
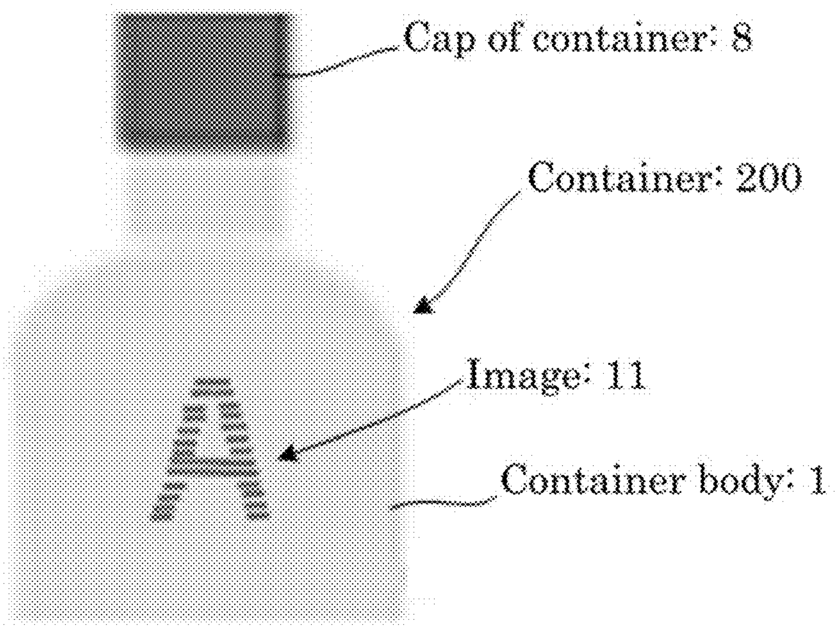
FIG. 22B is a view illustrating a state of an image drawn in a horizontal direction of a container.

FIG. 22A is a view illustrating a state of an image drawn in a vertical direction of a container. FIG. 22B is a view illustrating a state of an image drawn in a horizontal direction of a container.

When drawing letters or characters, or graphics on a container, the container may be processed in the vertical direction as illustrated in FIG. 22A, or the container may be processed in the horizontal direction as illustrated in FIG. 22B. When the container is processed in the vertical direction, the processed portion becomes highly visible by diffusing light in the circumferential direction of the container, and tends not to seem dark even when the processed portion is viewed from a position that is not exactly normal to the processed portion but is shifted to either side.

On the other hand, when the container is processed in the horizontal direction as illustrated in FIG. 22B, the processed portion diffuses less light in the circumferential direction than when the container is processed in the vertical direction. When containers are displayed on, for example, a shelf, vertically processed ones are more highly visible and can appeal as products.

<Cap of Container>

For example, the material, shape, size, structure, and color of a cap of a container are not particularly limited and may be appropriately selected depending on the intended purpose.

The material of the cap of a container is not particularly limited and may be appropriately selected depending on the intended purpose. Examples of the material of the cap of a container include resins, glass, metals, and ceramic. Among these materials, resins are preferable in terms of moldability.

As the resin of the cap of a container, the same resins as those of the container body of a container described above can be used.

Examples of the color of the cap of a container include opaque colors and transparent colors. Among these colors, opaque colors are preferable in terms of image readability.

The shape and size of the cap of a container are not particularly limited and may be appropriately selected depending on the intended purpose so long as the opening portion of a container body can be sealed (closed) by the shape and size.

The structure of the cap of a container is not particularly limited and may be appropriately selected depending on the intended purpose. It is preferable that the cap of a container include a first part that is separated from a container body when the cap is opened, and a second part that remains on the container body when the cap is opened.

It is preferable that the side surface of the first part have a boss and recess profile on the surface in order that a hand may not slip when opening the cap. It is preferable that the side surface of the second part not have a boss and recess profile, but have a flat surface.

Figure 23A:
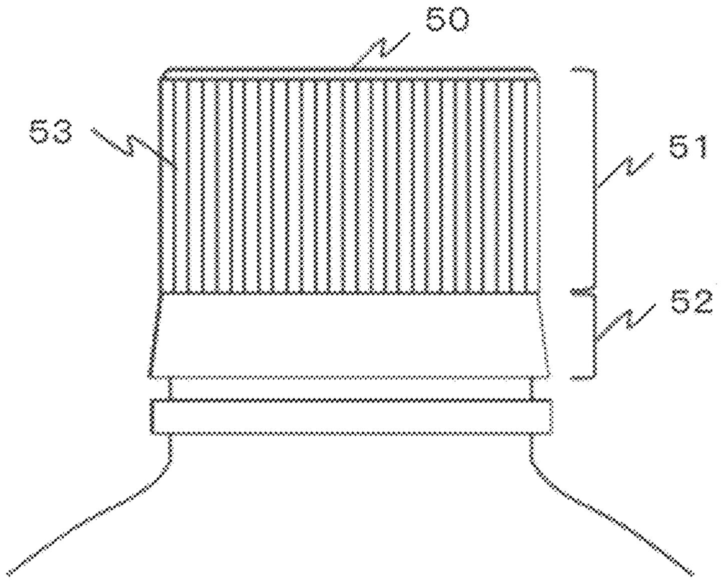
FIG. 23A is a schematic view illustrating an example of a cap of a container.
Figure 23B:
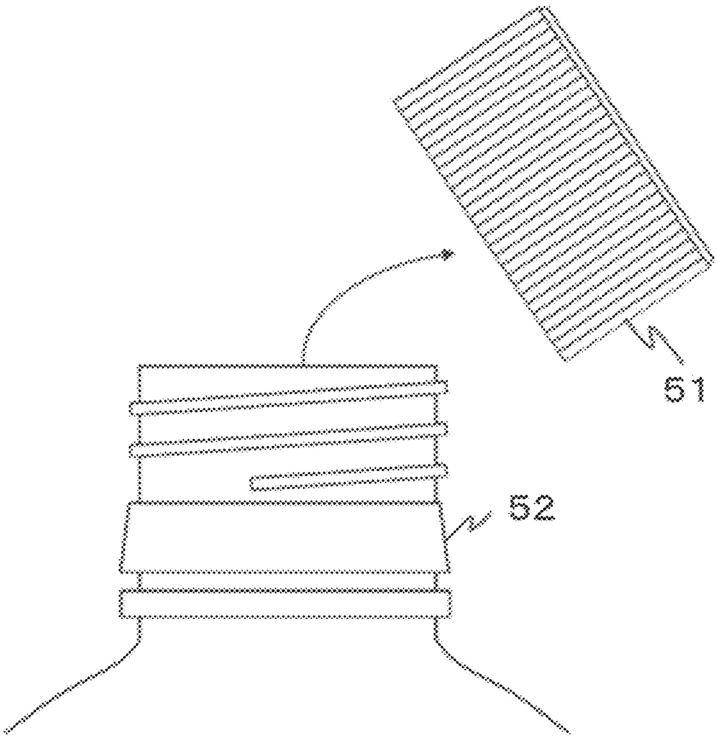
FIG. 23B is a schematic view illustrating an example of a cap of a container when the cap is opened.

A cap of a container includes a first part 51 that is separated from a container body when the cap is opened, and a second part 52 that remains on the container body 1 when the cap is opened, as illustrated in FIG. 23A and FIG. 23B. The side surface of the first part 51 has a boss and recess profile 53 on the surface in order that a hand may not slip when opening the cap. The side surface of the second part 52 does not have a boss and recess profile, but has a flat surface.

<First Embodiment of a Cap of a Container>

Figure 24:
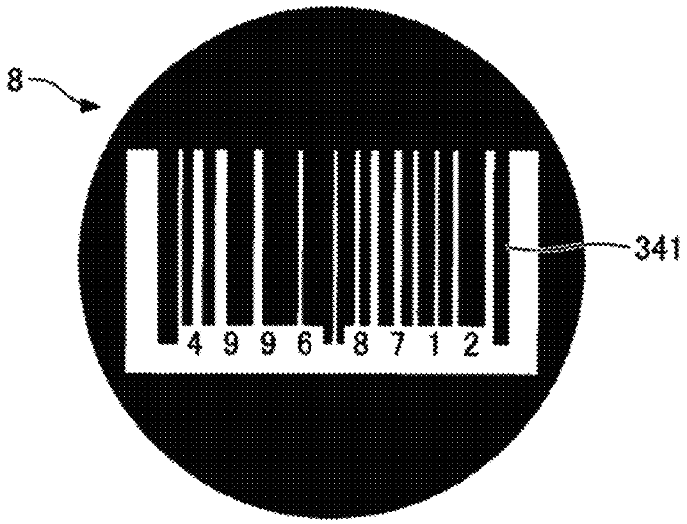
FIG. 24 is a view illustrating an example of a first embodiment of a cap of a container.

Next, image formation on a cap 8 of a container will be described. FIG. 24 is a view illustrating an example of an image formed on a cap 8 of a container. As illustrated in FIG. 24, a one-dimensional barcode 341, which is an example of an image, is formed on the surface of the cap 8 of a container.

In the one-dimensional barcode 341 illustrated in FIG. 24, bar-shaped regions, which are other than whitely opaqued regions formed by irradiating the surface of the black-colored cap 8 of a container with processing laser light, function as the one-dimensional barcode. Because the cap 8 of a container is small, it is preferable to form a short one-dimensional barcode such as an abbreviated code.

Moreover, a barcode may function not only on a whitely opaqued surface, but on a surface modified to any other color than white. Moreover, portions other than modified portions may constitute bars (linear regions) of a barcode, or modified portions may constitute bars.

For example, on-demand formation of, for example, a one-dimensional barcode, which represents the kind of the drink contained in a PET bottle, on a plain surface of a cap closing the PET bottle becomes available PET bottle by PET bottle. This enables as-needed procurement of a cap having a one-dimensional barcode corresponding to the kind of the drink without inventory. Moreover, information display on a cap realized by use of a single kind of a material without use of a label ensures adaptability to recycling.

The embodiments of the container of the present disclosure will be described in detail with reference to the drawings. In the drawings, the same components will be denoted by the same reference numerals, and may not be described repeatedly. For example, the numbers, positions, and shape of the components are not limited to the embodiments, and may be any numbers, positions, and shapes that are suitable for carrying out the present disclosure.

<First Embodiment of a Container>

Figure 25:
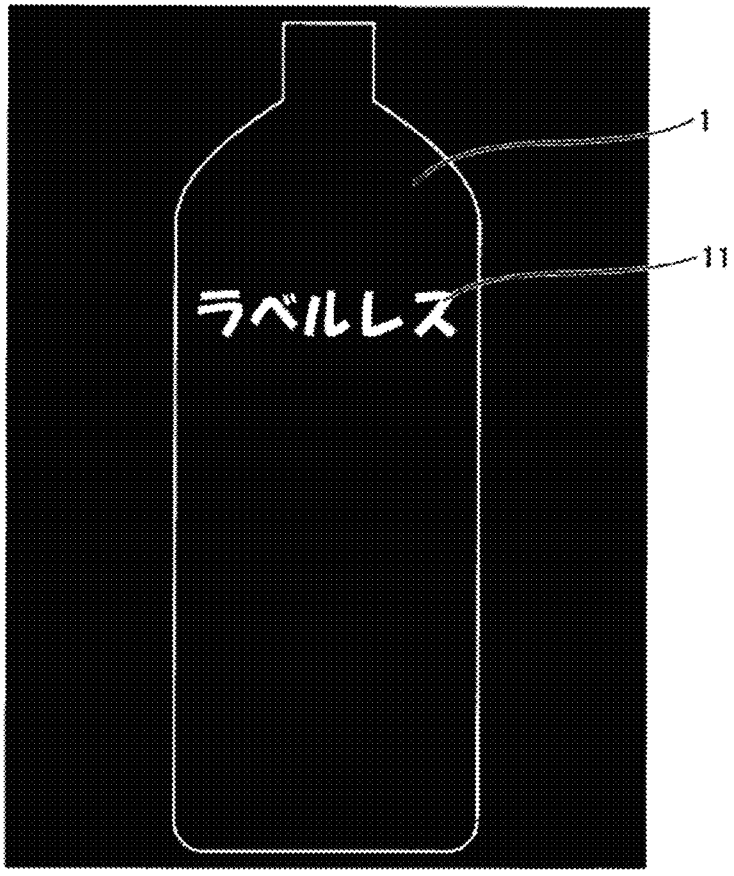
FIG. 25 is a view illustrating an example of a container body according to a first embodiment of a container.

FIG. 25 is a schematic view illustrating an example of a first embodiment of a container. A container body 1 illustrated in FIG. 25 is a cylindrical bottle formed of a resin (transparent resin) having a visible light transmissivity. FIG. 25 illustrates the container body 1 put in front of a black screen serving as the background. The background black screen is seen through the transparent container body 1. Alternatively, it is optional to regard instead that a black liquid is contained in the container body 1 and the black liquid in the transparent container body 1 is seen.

As the resin of the container body 1, polyethylene terephthalate (PET) is used.

An image (characters) 11 representing a Japanese term "ラベルレス" is formed on the surface of the container body 1. By the effect of diffusion of ambient light on the image (characters) 11, the image (characters) 11 is seen whitely opaque against the black color of the background or the black color of the liquid in the container body 1. Aggregates of a plurality of lines constituting the five characters included in the Japanese term "ラベルレス" correspond to the image (characters) 11. A region of the container body 1 on which the image (characters) 11 is not formed is a non-dented portion.

Figure 26:
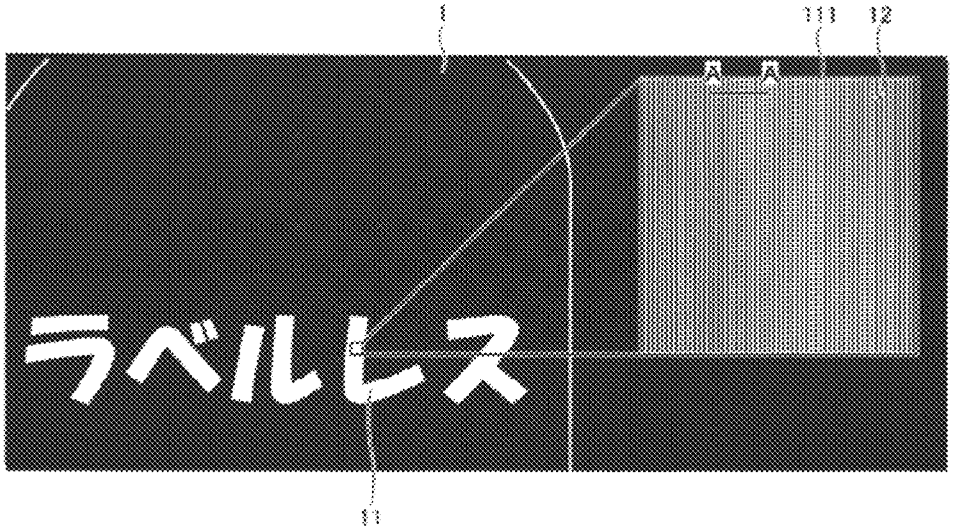
FIG. 26 is a view illustrating a relationship between an image and dented portions.

FIG. 26 is a view illustrating an example of a relationship between dented portions 12 and non-dented portions 13 formed on a container body 1. An expanded view 111 in FIG. 26 illustrates a part of an image (characters) 11 in an expanded manner. As illustrated in FIG. 26, an image (characters) 11 representing a Japanese term "ラベルレス" is formed on the surface of the container body 1. As illustrated in the expanded view 111 in FIG. 26, the image (characters) 11 is formed of a plurality of dented portions (straight lines) 12. In other words, the image (characters) 11 is formed of aggregates of dented portions (straight lines) 12. Although dented portions (straight lines) 12 are illustrated only in the region illustrated in the expanded view 111 in FIG. 26, the whole of the image (characters) 11 is formed of aggregates of dented portions (straight lines) 12.

The white regions in the aggregates of dented portions (straight lines) 12 are regions in which the surface of the container body has modified conditions. A plurality of dented portions (straight lines) 12 are an example of an aggregate of dented portions. A dented portion (straight line) 12 is an image smaller than the image (characters) 11. More specifically, a dented portion (straight line) 12 is an image formed of a straight line having an area smaller than the sum total of the areas of a plurality of straight lines constituting the image (characters) 11. In this way, the image (characters) 11 is formed, including aggregates of small (minutes) dented portions (straight lines) 12.

Figure 27:
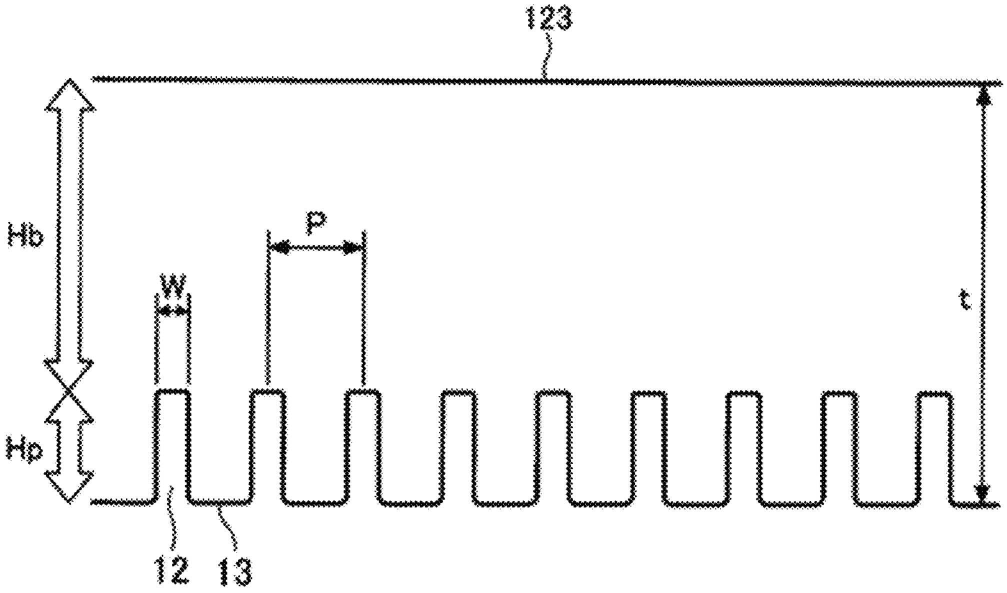
FIG. 27 is a cross-sectional view of FIG. 26 taken along a line A-A.

FIG. 27 is a cross-sectional view illustrating a cross-sectional shape taken along a line A-A of the expanded view 111 in FIG. 26. Non-dented portions 13 represent the surface of the container body 1. Dented portions 12 represent portions formed as a result of evaporation of the surface of the container body 1 in response to irradiation with processing laser light 20, and correspond to straight lines. The internal surface of the container body is indicated by 123.

A thickness t represents the thickness of the container body 1. A processed depth Hp represents the depth of a dented portion 12. A non-processed depth Hb represents the depth of a non-processed portion.

An interval between adjoining dented portions 12 represents the distance between the centers of the adjoining dented portions 12. The interval P in FIG. 27 represents the interval between adjoining dented portions (straight lines) 12. The width W represents the boldness of a dented portion (straight line) 12. Because the dented portions (straight lines) 12 according to the present embodiment are formed at a cycle, the interval P also corresponds to the cycle at which the dented portions (straight lines) 12 are formed.

The interval P is preferably 0.4 micrometers or greater but 130 micrometers or less. An interval P of 0.4 micrometers or greater enables ambient light to be diffused without being restricted by visible light threshold wavelengths, and can improve contrast of the image (characters) 11 including a plurality of dented portions (straight lines) 12 and non-dented portions 13.

An interval P of 130 micrometers or less can ensure a resolution of 200 dots per inch (dpi), and can make the image (characters) 11 be seen as a whitely opaque pattern at a high contrast by preventing the very dented portions (straight lines) 12 from being seen. An interval P of 50 micrometers or less is more preferable because the very dented portions can be more firmly prevented from being seen.

The embodiment described above has described preferable values of the interval P. When the dented portions have a cyclicity, the preferable values described above can also be applied to the cycle.

The expanded view 111 illustrates an aggregate of dented portions (straight lines) 12 formed at a cycle at regular intervals. The aggregate of dented portions is not limited to such an aggregate. An aggregate of dented portions may be an aggregate of a plurality of dented portions (straight lines) 12 formed noncyclically at irregular intervals, or an aggregate of dented portions formed of, for example, a plurality of dots formed cyclically or noncyclically. When a dented portion is a dot pattern, the image of this dot is a pattern smaller than the image of, for example, the characters 11.

In the present embodiment, the image (characters) 11 is formed of non-dented portions 13 and dented portions 12. When forming dented portions by such a boss and recess profile, it is preferable to provide a depth difference of 0.4 micrometers or greater between non-dented portions 13 and dented portions 12. A depth difference of 0.4 micrometers or greater enables ambient light to be diffused without being restricted by visible light threshold wavelengths, and can improve contrast of the image (characters) 11 formed of a plurality of dented portions 12 and non-dented portions 13.

Figure 28A:
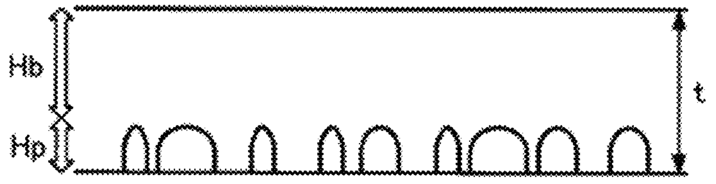
FIG. 28A is a view illustrating an example of a processed depth, which is shorter than a non-processed depth.

FIG. 28A to FIG. 28D are views illustrating various examples of a processed depth Hp. FIG. 28A is a view of a case where the processed depth Hp is shorter than a non-processed depth Hb of the container body 1, more specifically, a case where the ratio of the processed depth Hp to the non-processed depth Hb is from 1 or less: 9 or greater through 3:7. In this case, the dented portions have an improved stiffness (mechanical strength). For example, when the thickness of the container body 1 is from 100 micrometers through 500 micrometers, the processed depth Hp is 10 micrometers.

Figure 28B:
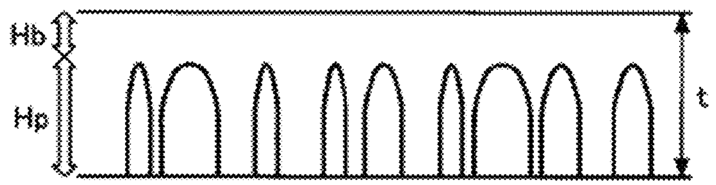
FIG. 28B is a view illustrating an example of a processed depth, which is longer than a non-processed depth.

FIG. 28B is a view of a case where the processed depth Hp is longer than the non-processed depth Hb of the container body, more specifically, a case where the ratio of the processed depth Hp to the non-processed depth Hb is from 7:3 through 9 or greater: 1 or less.

Figure 28C:
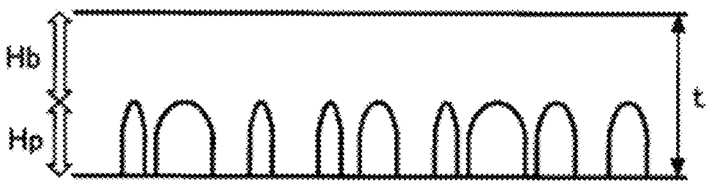
FIG. 28C is a view illustrating an example of a processed depth, which is equal or similar to a non-processed depth.

FIG. 28C is a view of a case where the processed depth Hip and the non-processed depth Hb of the container body are equal or similar, more specifically, a case where the ratio of the processed depth Hp to the non-processed depth Hb is from 4:6 through 6:4.

Figure 28D:
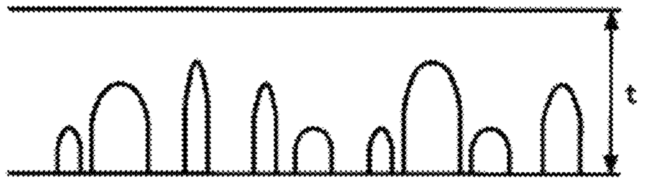
FIG. 28D is a view illustrating an example of a processed depth, where a processed depth and a non-processed depth are varied.

FIG. 28D is a view of a case where the processed depth Hp and the non-processed depth Hb of the container body are varied.

A light intensity control unit 651 of a laser irradiation control unit 65 of a container producing apparatus can adjust the processed depth Hp illustrated in FIG. 28A to FIG. 28D by controlling the light intensity of the laser light to be emitted by a laser light source 21.

<Second Embodiment of a Container>

According to a second embodiment of a container, an image to be formed on a container body 1 is a picture, which is formed of a plurality of pixels, each of which is an aggregate of dented portions. The picture, serving as an image can be expressed at multiple gradation levels by pixel-by-pixel variation of the interval between dented portions.

Figure 29:
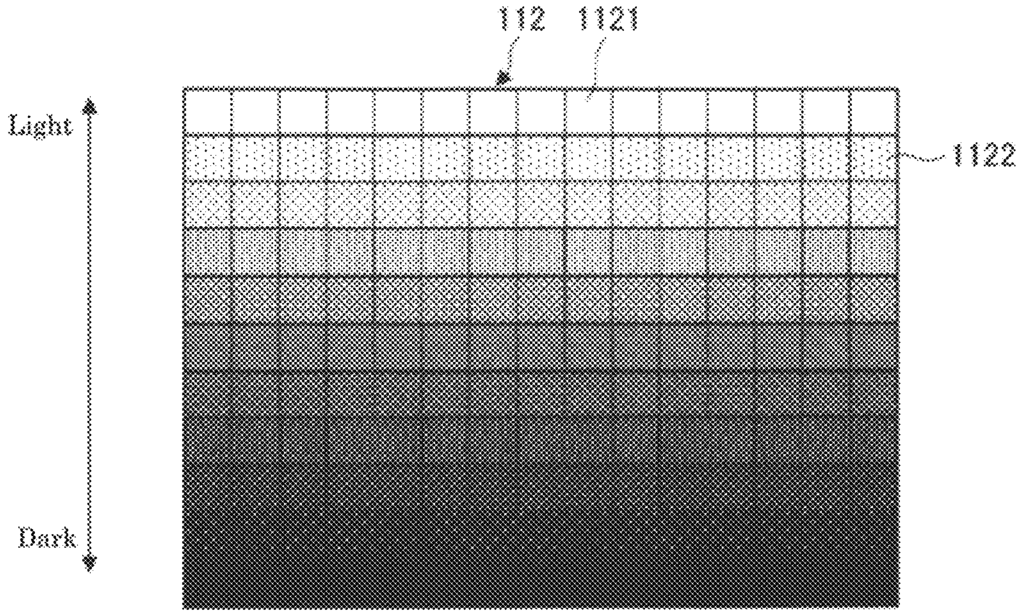
FIG. 29 is a view illustrating an example of gradation expression by dented portions.

FIG. 29 is a view illustrating an example of gradation expression by pixel-by-pixel variation of the interval between dented portions, illustrating processing target picture data 112 representing the picture corresponding to the image to be formed on the container body 1. Pixels 1121 represented by grid squares in FIG. 29 represent pixels constituting the processing target picture data 112. The processing target picture data 112 is formed of a plurality of pixels 1121.

In the present embodiment, a dented portion is a dot pattern, and each of the plurality of pixels 1121 is formed of an aggregate of dot data 1122. Dot data 1122 represented by a black region in the processing target picture data 112 corresponds to a region in which the conditions of the container body are modified by irradiation with processing laser light 20.

In FIG. 29, the interval between adjoining dot data 1122 is greater as the illustrated arrow is ascended more upward, whereas the interval between adjoining dot data 1122 is shorter as the illustrated arrow is descended more downward. As the interval between adjoining dot data 1122 is greater, ambient light diffusibility on the dot patterns formed on the container body 1 is lower, and a whitely opaqued image has a lower density. On the other hand, as the interval between adjoining dot data 1122 is shorter, ambient light diffusibility on the dot patterns formed on the container body 1 is higher, and a whitely opaqued image has a higher density.

Pixel-by-pixel variation of the interval between dented portions in this way enables expression of gradations (darkness or lightness) in the picture.

Figure 30A:
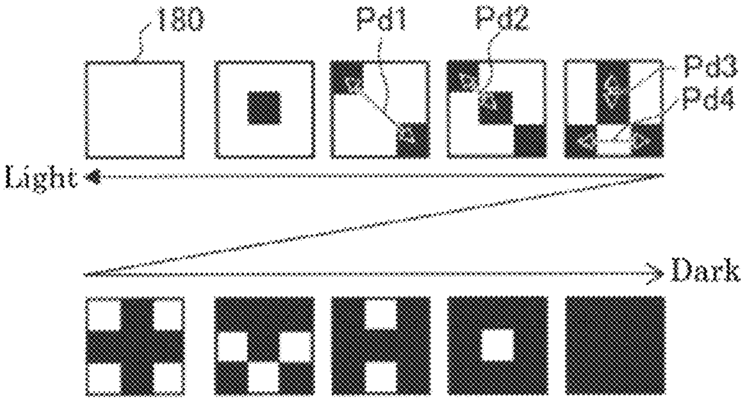
FIG. 30A is a view illustrating another example of gradation expression by dented portions, illustrating process data of dented portions having no cyclicity.
Figure 30B:
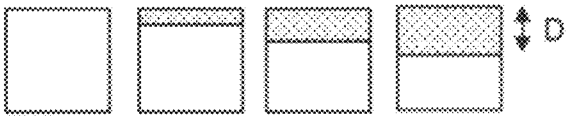
FIG. 30B is a view illustrating another example of gradation expression by dented portions, illustrating a cross-sectional view of dented portions by crystallization.
Figure 30C:
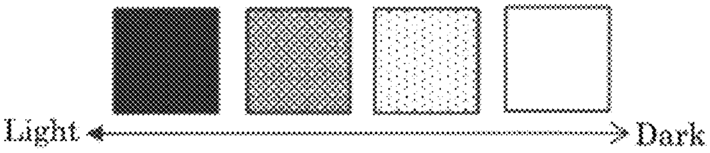
FIG. 30C is a view illustrating another example of gradation expression by dented portions, illustrating a plan view of the dented portions by crystallization.

FIG. 29 illustrates an example of gradation expression depending on the interval between dot patterns having cyclicity. The gradation expression method is not limited to this method. FIG. 30A to FIG. 30C are views illustrating other examples of gradation expression by dented portions. FIG. 30A is a view illustrating process data of dented portions having no cyclicity. In FIG. 30A, a pixel 180 represents one pixel. A pixel 180 is formed of rectangular dot data arranged noncyclically. The directions indicated by the illustrated arrow indicate the degree of darkness or lightness of the pixel density. As the number of dot data in a pixel 180 is greater, the density is higher.

The intervals Pd1 to Pd4 in FIG. 30A indicate the intervals between adjoining dot data in various dot data arrangement patterns in the pixels 180, and correspond to the intervals between dot patterns when dot patterns are formed on a container body 1.

FIG. 30B illustrates a cross-sectional view of dented portions formed by variation of a crystallized state. FIG. 30C illustrates a plan view of FIG. 30B.

FIG. 30B and FIG. 30C illustrate an example of varying a crystallization depth D by which the surface of a container body 1 is crystallized, to vary ambient light diffusibility by dented portions and consequently vary the density of an image. As the crystallization depth D is greater, ambient light diffusibility is higher, and the density of whiteness achieved by white opaquing is higher (whiter).

Figure 31:
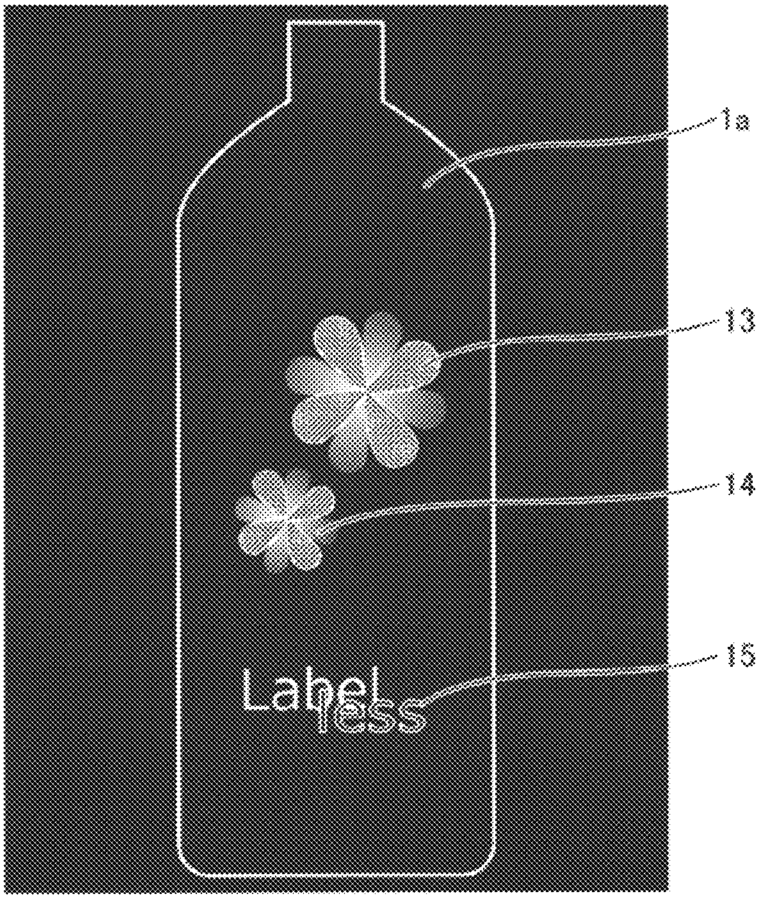
FIG. 31 is a view illustrating an example of a container body according to a second embodiment of a container.

FIG. 31 is a view illustrating an example of a container body 1*a* according to the second embodiment of the container. Pictures 13 and 14 expressed by multiple gradations are formed on the container body 1*a*. A picture 15 formed of overlapped letters is also formed.

The pictures 13, 14, and 15 are each formed of a plurality of pixels, each of which is formed of an aggregate of dot patterns, which are dented portions. Gradations are expressed by pixel-by-pixel variation of the interval between adjoining dot patterns. The pictures 13, 14, and 15 are each an example of an image.

As described above, in the second embodiment of the container, an image formed on a container body 1 is a picture, which is formed of a plurality of pixels, each of which is formed of an aggregate of dented portions, and the interval between the dented portions is varied from pixel to pixel. Resulting variation of diffusibility from pixel to pixel enables the density of an image formed on a container body 1 to be varied from pixel to pixel, and the image to be expressed by multiple gradations.

<Third Embodiment of a Container>

Figure 32:
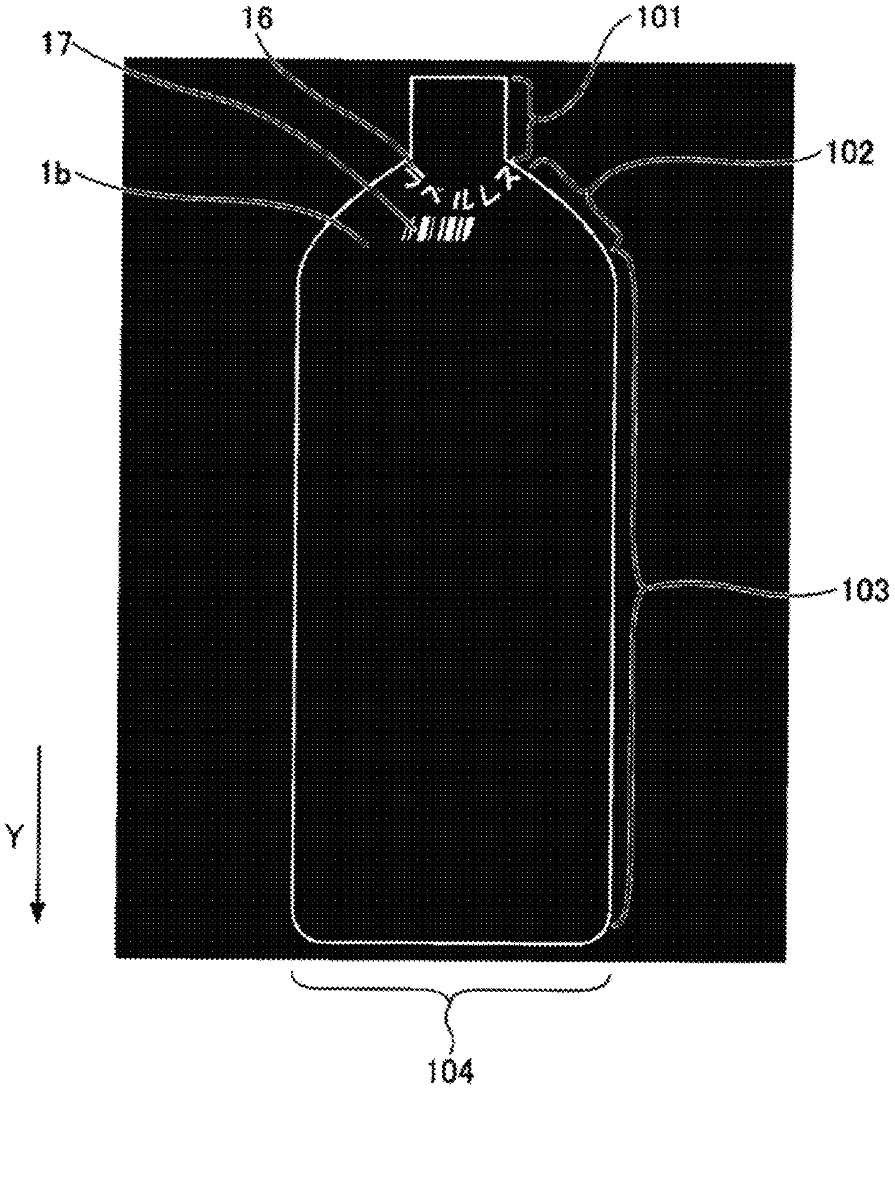
FIG. 32 is a view illustrating an example of a container body according to a third embodiment of a container.

FIG. 32 is a view illustrating an example of a container body 1*b* according to a third embodiment of a container. The container body 1*b* of FIG. 32 is a cylindrical bottle formed of an opening portion 101, a shoulder portion 102, a trunk portion 103, and a bottom portion 104. In the third embodiment of the container, an image formed of an aggregate of dented portions is formed on the shoulder portion of the container body 1*b* including the opening portion, the shoulder portion joined to the opening portion, the trunk portion joined to the shoulder portion, and the bottom portion joined to the trunk portion. This makes the image more seeable when the container body 1*b* is viewed from the opening portion side.

The opening portion 10 is a guide portion for guiding a content such as a drink into the container body 1*b*. A cap of a container may be provided in order to close the container body 1*b* to prevent the content contained in the container body 1*b* from spilling.

The shoulder portion 102 is a portion joined to the opening portion 101 and having a conical shape having an apex angle at the opening portion 101 side. The trunk portion 103 is a portion joined to the shoulder portion 102 and having a cylindrical shape of which cylindrical axis extends along a direction Y indicated by an arrow in FIG. 32. The shoulder portion 102 is inclined from the surface of the cylinder constituting the trunk portion 103.

The bottom portion 104 is a bottom portion of the container body 1*b* joined to the trunk portion 103.

Characters 16 representing a Japanese term "ラベルレス" and a barcode 17 are formed on the shoulder portion 102 of the container body 1*b*. The characters 16 and the barcode 17 are formed of aggregates of dented portions.

Figure 33:
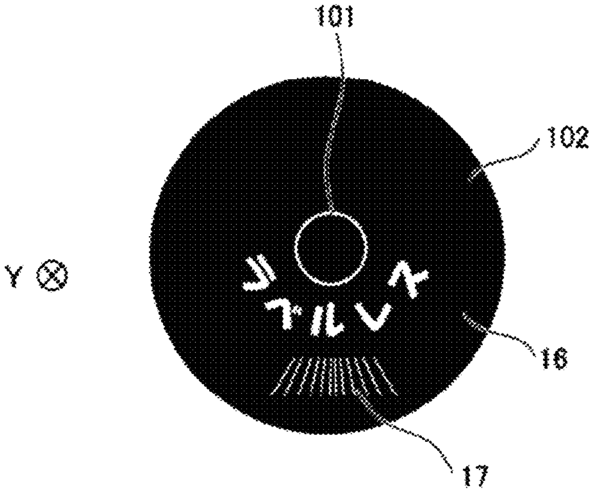
FIG. 33 is a view of a container body according to a third embodiment of a container, seen from an opening portion side.

FIG. 33 is a view of the container body 1*b* seen from the opening portion 101 side. In other words, FIG. 33 is a view of the container body 1*b* seen from the negative side of the direction Y toward the positive side of the direction Y in FIG. 33. As illustrated in FIG. 33, the characters 16 and the barcode 17 formed on the shoulder portion 102 inclined from the trunk portion 103 face a user (consumer) of the container body 1*b* when the user views the container body 1*b* from the opening portion 101 side. Hence, the user can see the characters 16 and the barcode 17 more easily than when the characters 16 and the barcode 17 are formed on the trunk portion 103.

<Modified Example 1 of the Third Embodiment of a Container>

Figure 34:
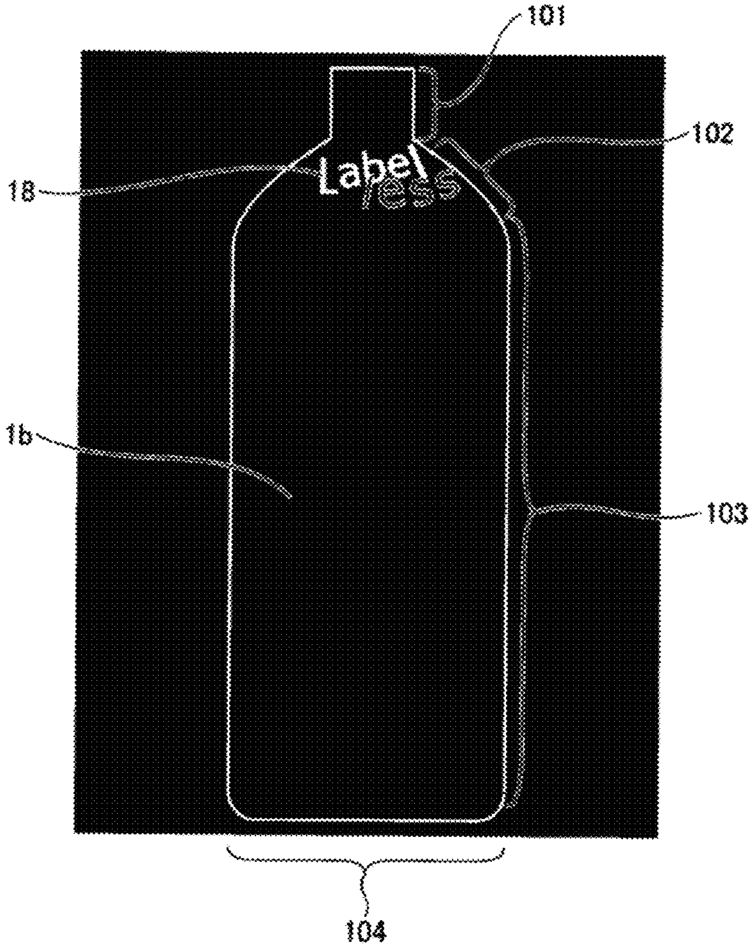
FIG. 34 is a view illustrating another example of a container body according to a third embodiment of a container.

FIG. 34 is a view illustrating an example of a modified example 1 of the third embodiment of a container. Letters 18, which are an image formed of overlapped letters, are formed on a shoulder portion 102 of a container body 1*b* of FIG. 34.

In the present embodiment, an image formed of aggregates of dented portions is formed on the shoulder portion 102 of the container body 1*b* including an opening portion 101, the shoulder portion 102 joined to the opening portion 101, a trunk portion 103 joined to the shoulder portion 102, and a bottom portion 104 joined to the trunk portion 103. This makes the image more seeable when the container body 1*b* is viewed from the opening portion 101 side.

Hence, for example, when the container body 1*b* is stored in, for example, a storage case in a state that the bottom portion 104 faces downward, the information displayed by the image is seeable without the container body 1*b* being taken out from the storage case, and efficient management of the container body 1*b* or the content of the container body 1*b* is available. As the case where the container body 1*b* is stored in, for example, a box in a state that the bottom portion 104 faces downward, there is a case where, for example, the container body 1*b* is a drink PET bottle, and a plurality of PET bottles are stored in a storage case.

When the bottom of a storage case is transparent or through holes are opened in the bottom of a storage case and the container body 1*b* stored in the storage case is seeable from the bottom side of the storage case, an image may be formed on the bottom portion 104 of the container body 1*b*.

<Modified Example 2 of the Third Embodiment of a Container>

Figure 35:
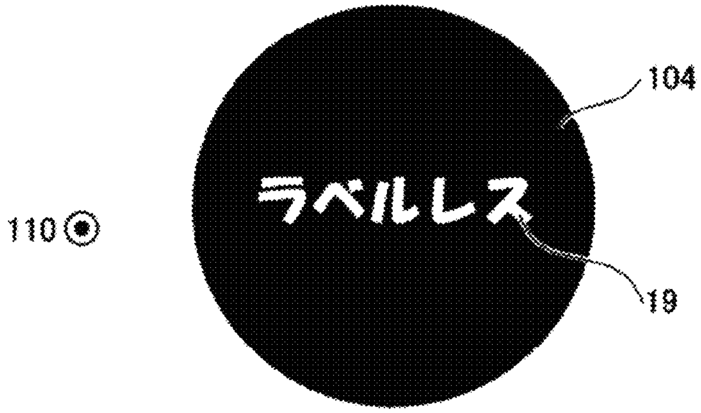
FIG. 35 is a view of a container body according to a third embodiment of a container, seen from a bottom portion side.

FIG. 35 is a view illustrating an example of a modified example 2 of the third embodiment of a container. FIG. 35 is a view illustrating an example in which an image including a plurality of dented portions and non-dented portions is formed on a bottom portion 104 of a container body 1*b*. As illustrated in FIG. 35, characters 19 representing a Japanese term "ラベルレス" are formed on the bottom portion 104 as an example of an image.

Formation of an image on the bottom portion 104 makes the information displayed by the image seeable from the bottom side of a storage case without the container body 1*b* being taken out from the storage case, and enables efficient management of the container body 1*b* or the content of the container body 1*b*.

<Fourth Embodiment of a Container>

Figure 36A:
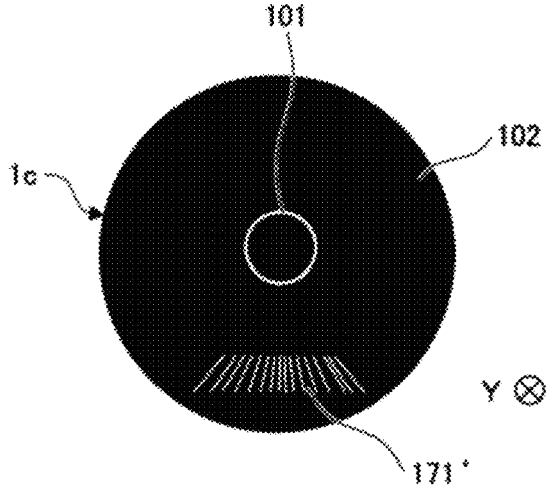
FIG. 36A is a view of a barcode according to a comparative example, seen from an opening portion side.
Figure 36B:
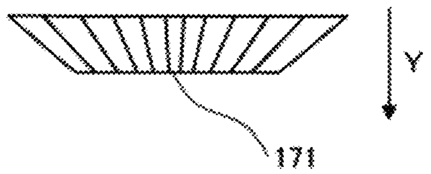
FIG. 36B is a view illustrating an example of a barcode according to a fourth embodiment of a container.
Figure 36C:
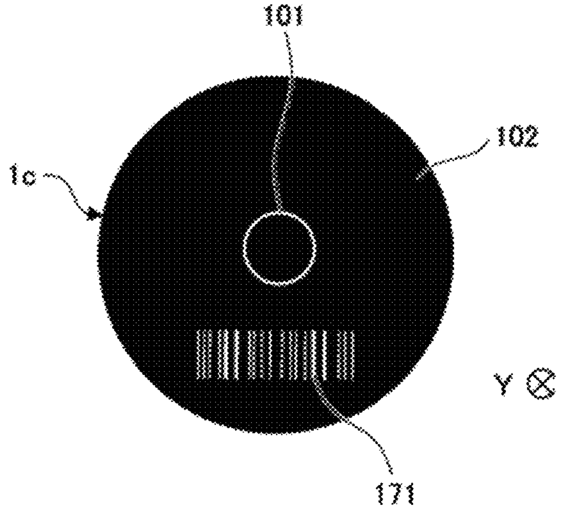
FIG. 36C is a view of the barcode of FIG. 36B seen from an opening portion side.

FIG. 36C is a view illustrating an example of a container body 1*c* according to a fourth embodiment of a container. A barcode, which is an example of an image including a plurality of dented portions and non-dented portions, is formed on the container body 1*c*.

When a shoulder portion of a container is formed in a conical shape having an apex angle at an opening portion side, an image formed on the shoulder portion may be seen to increase in width as the viewing position on the opening portion side goes away from the opening portion.

FIG. 36A is a view of a barcode 171', which is an image according to a comparative example formed on a shoulder portion 102 of a container body 1*c*, seen from the opening portion side. As illustrated in FIG. 36A, a rectangular barcode 171' is seen to be broadened as the viewing position goes away from the opening portion 101. As a result, the barcode 171' may not be read appropriately from the opening portion 101 side.

Hence, in the fourth embodiment of the container, a barcode 171 that decreases in width as the viewing position goes away from the opening portion 101 is formed on the shoulder portion 102. FIG. 36B illustrates an example of such a barcode 171. The negative side in the direction Y in FIG. 36B corresponds to the opening portion 101 side, and the barcode 171 decreases in width as the viewing position goes away from the opening portion 101.

FIG. 36C illustrates a view of the barcode 171 formed on the shoulder portion 102 of the container body 1*c*, seen from the opening portion 101 side. The barcode 171 is a pattern that decreases in width as the viewing position goes away from the opening portion 101. Therefore, when the barcode 171 is viewed from the opening portion 101 side, increase in the width of the barcode 171 as the viewing position goes away from the opening portion 101 is offset, and the barcode is seen correctly as a rectangular barcode. It is preferable to optimize the width of the barcode 171 to suit to the inclination angle of the shoulder portion 102 with respect to the trunk portion 103.

In the fourth embodiment of the container, the barcode 171 that decreases in width as the viewing position goes away from the opening portion 101 is formed on the shoulder portion 102. This prevents the barcode 171 from being seen to broaden as the viewing position goes away from the opening portion 101, and enables a code such as the barcode 171 or a QR code (registered trademark) to be read appropriately from the opening portion 101 side. Reading of a code includes not only viewing and reading of the code by a user, but also reading of the code by a reading device such as a barcode reader and a QR code (registered trademark) reader.

<Fifth Embodiment of a Container>

Figure 37A:
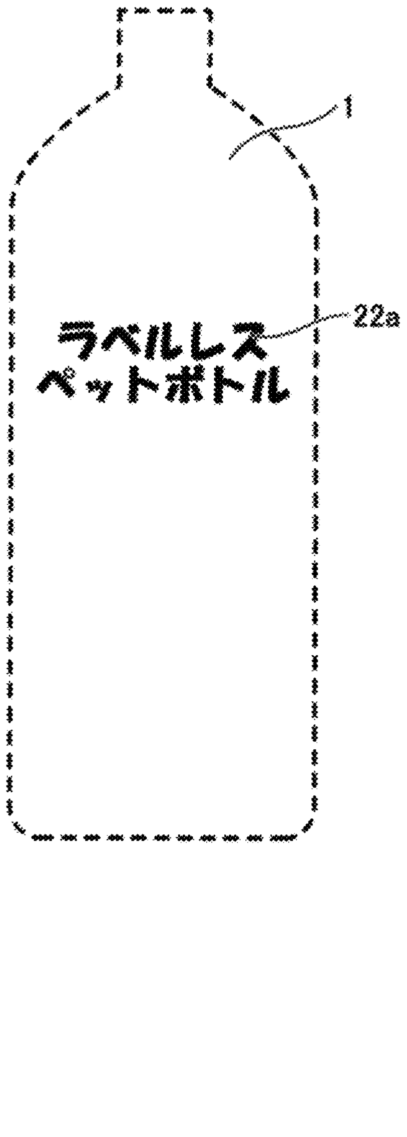
FIG. 37A is a view illustrating a container body according to a fifth embodiment of a container.

FIG. 37A is a view illustrating a container body 1 according to a fifth embodiment of a container. The container body 1 of FIG. 37A is formed of a resin or glass having a visible light transmissivity (a transparent resin or transparent glass), and is put in front of a white screen serving as the background. The background white screen is seen through the transparent container body 1. Alternatively, it is optional to regard instead that a white liquid is contained in the transparent container body 1 as a content and the white liquid in the container body 1 is seen through the transparent container body 1.

Characters 22*a* are formed on the surface of the container body 1 of FIG. 37A. The characters 22*a* are formed through blackening of the surface of the container body 1 by, for example, carbonization by irradiation with processing laser light. The blackened characters 22*a* are seen black against the background white color or the white color of the liquid in the container body 1. By blackening the surface of the container body 1 in this way, it is also possible to make an image such as the characters 22*a* formed of a plurality of dented portions and non-dented portions seeable.

<Modified Example 1 of the Fifth Embodiment of a Container>

Figure 37B:
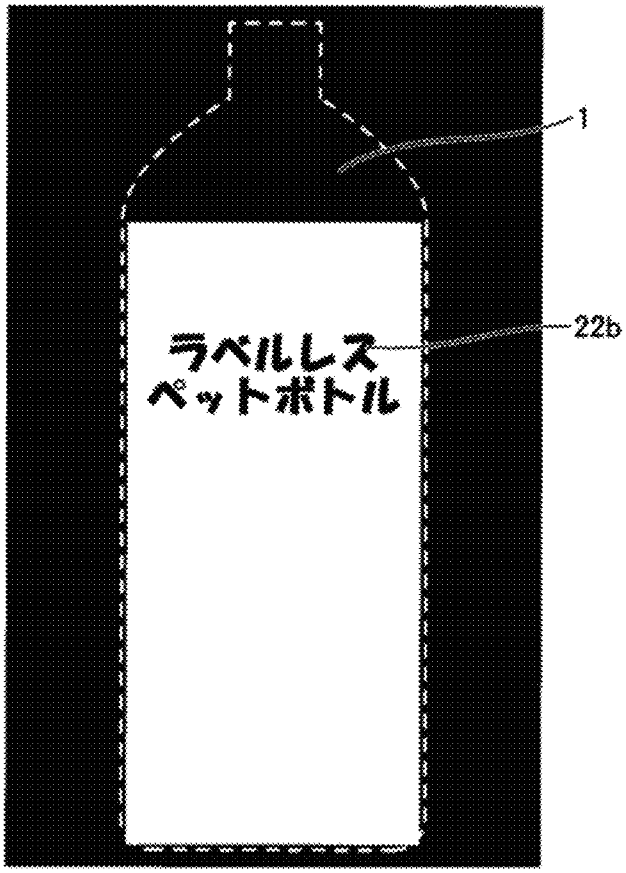
FIG. 37B is a view illustrating a container body according to a modified example 1 of a fifth embodiment of a container.

FIG. 37B is a view illustrating a container body 1 according to a modified example 1 of the fifth embodiment of a container. The container body 1 of FIG. 37B is formed of a transparent resin or transparent glass, and is put in front of a black screen serving as the background. The background black screen is seen through the transparent container body 1. Alternatively, it is optional to regard instead that a black liquid is contained in the transparent container body 1 and the black liquid in the container body 1 is seen through the transparent container body 1.

A pattern is formed on the surface of the container body 1 of FIG. 37B through modification of the surface conditions of the container body 1 by irradiation of a region other than characters 22*b* with processing laser light. The region other than the characters 22*b* corresponds to an image formed of an aggregate of dented portions.

The region other than the characters 22*b* has an improved ambient light diffusibility and is seen whitely opaque. The black color of the background screen or the black color of the liquid in the container body 1 is seen through the regions of the characters 22*b*. It is also possible to make an image representing, for example, the characters 22*b* seeable in this way.

By also increasing the contrast of an image against the color of a content contained in the container body 1 of a container having a visible light transmissivity, it is possible to provide a container on which a pattern including a lot of information is formed with a good visibility. For example, when a content is black, an image formed on a container is more seeable when the image is whitely opaqued. When a content is white, an image formed on a container is more seeable when the image is blackened.

<Modified Example 2 of the Fifth Embodiment of a Container>

Figure 38:
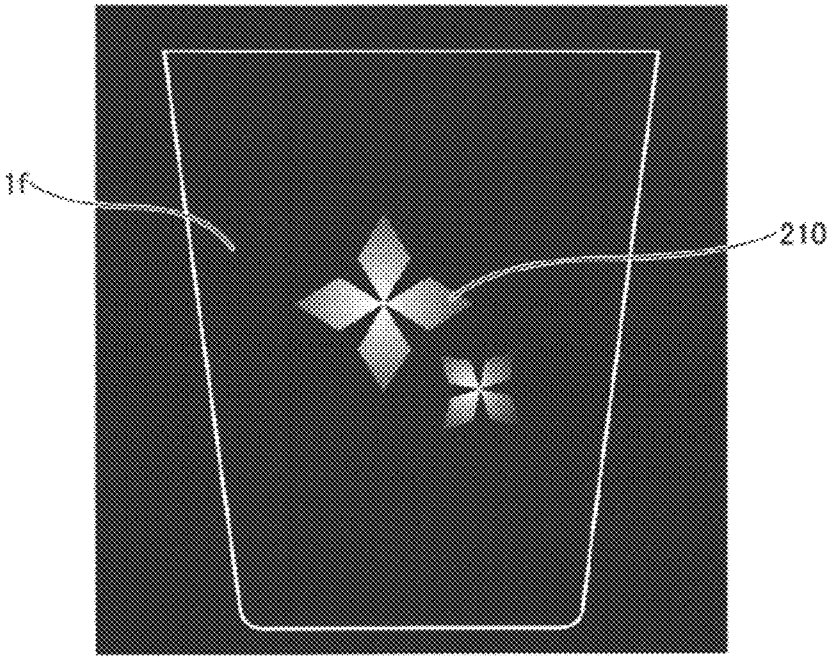
FIG. 38 is a view illustrating an example of a container according to a modified example 2 of a fifth embodiment of a container.

The fifth embodiment described above has described a bottle such as a PET bottle formed of a resin as an example of a container. However, the container is not limited to such bottles. The container may be a cup formed of glass. FIG. 38 is a view illustrating an example of a cup 1*f* serving as a container according to a modified example 2 of the fifth embodiment of a container. As illustrated in FIG. 38, an image 210 formed of an aggregate of dented portions is formed on the cylindrical surface of the cup if.

The embodiments described above have described examples in which the container body 1 has a visible light transmissivity, and is put in front of, for example, a black screen serving as the background.

<Sixth Embodiment of a Container>

Figure 39A:
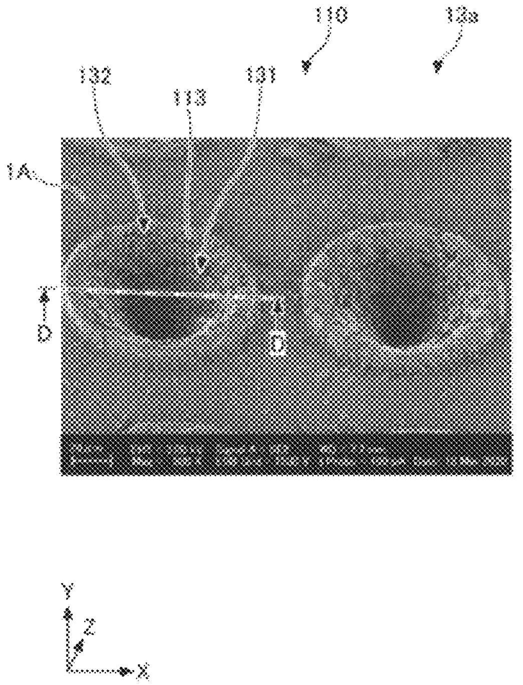
FIG. 39A illustrates a scanning electron microscopic oblique view of a trace of modification, seen in a top-downward perspective.
Figure 39B:
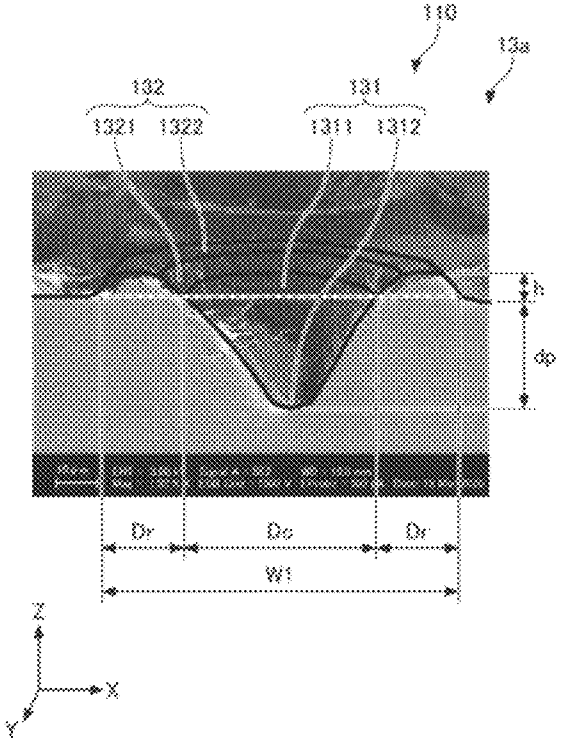
FIG. 39B illustrates a scanning electron microscopic oblique view of a trace of modification, seen in a cross-sectional perspective on arrow D-D of FIG. 39A.

Next, a trace of modification on the surface of a container body by irradiation with processing laser light will be described. FIG. 39A and FIG. 39B are scanning electron microscopic (SEM) views of a trace of modification. FIG. 39A is an oblique view seen in a top-downward perspective. FIG. 39B is an oblique view seen in a cross-sectional perspective on arrow D-D of FIG. 39A. In FIG. 39A, a trace of modification 110 is observed.

As illustrated in FIG. 39A and FIG. 39B, the trace of modification 110 includes a dented portion 131 and a bossed portion 132. The dented portion 131 has a first inclined surface 1311 and a bottom portion 1312, and is formed in a bowl-like shape. A dented portion width Dc represents the width of the dented portion 131. A depth dp represents the height (length in the Z axis direction) of the bottom portion 1312 with respect to the surface of a non-patterned region in which no pattern is formed.

The bossed portion 132 has an apex portion 1321 and a second inclined surface 1322, and is formed in a torus-like shape. A torus means a rotating surface obtained by rotating the circumference of a circle. A torus width Dr represents the width of the torus portion of the bossed portion 132 in the radial direction. A height h represents the height (length in the Z axis direction) of the apex portion 1321 with respect to the surface of the non-patterned region.

A trace of modification width W1 represents the width of the whole trace of modification 110. The trace of modification width W1 is, for example, about 100 micrometers. The first inclined surface 1311 and the second inclined surface 1322 are continuous surfaces. Continuous surfaces represent seamless surfaces formed of the same material and having no gap.

As illustrated in FIG. 39, minute dented or bossed portions 113 are formed in the surfaces constituting the dented portion 131 and the bossed portion 132, and the surfaces are roughened. The dented or bossed portions 113 are formed of dented portions and bossed portions having a width smaller than the trace of modification width W1 of the trace of modification 110, and typically formed of dented portions and bossed portions having a width of from 1 micrometer through 10 micrometers.

As illustrated in FIG. 39A, processing debris resulting from processing the trace of modification 110 have scattered between adjoining traces of modification, and roughen the surfaces. The surface roughness of a patterned region 13*a* is greater than the surface roughness of the non-patterned region due to surface roughening by the dented or bossed portions 113 and the processing debris.

(Container Containing Body)

A content containing body of the present disclosure includes the container of the present disclosure and a content contained in the container.

Examples of the content include drinks, powders, and gases. When the content is a drink, the content often has a color such as a transparent color, a white color, a black color, a brown color, or a yellow color.

<First Embodiment of a Content Containing Body>

Figure 40:
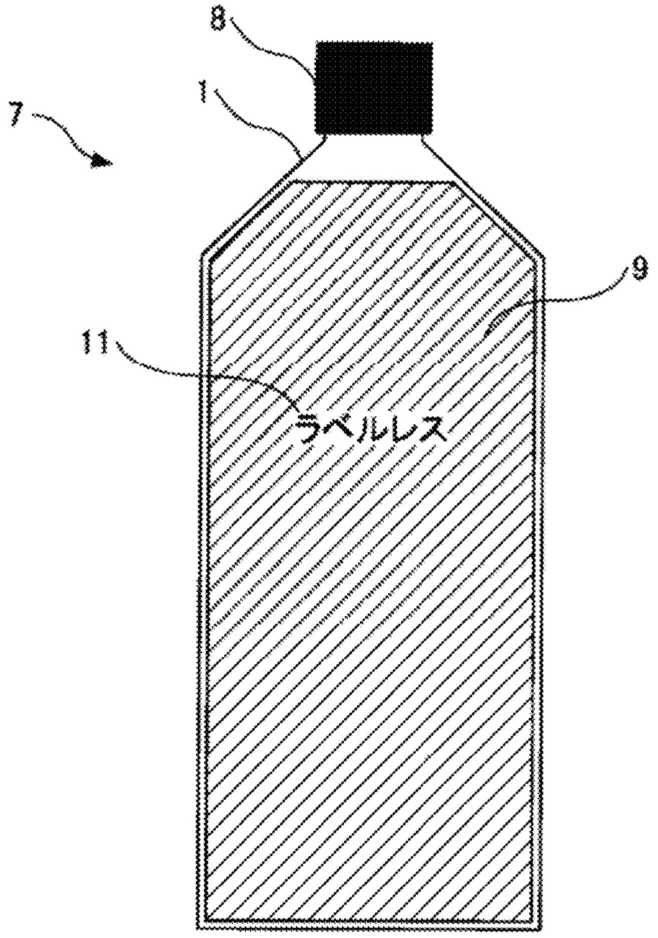
FIG. 40 is a view illustrating an example of a first embodiment of content containing body.

FIG. 40 is a schematic view illustrating an example of a first embodiment of a content containing body. A content containing body 7 of FIG. 40 includes a container body 1, a cap 8 of a container, and a content 9 such as a liquid drink contained in the container body 1. Characters 11 representing a Japanese term "ラベルレス" is formed on the surface of the container body 1.

The content 9 often has a color such as black, brown, or yellow. A threaded portion for threadedly engaging with and fixing the cap 8 of a container is formed on an opening portion of the content containing body 7. A threaded portion for threadedly engaging with the threaded portion formed on the opening portion of the content containing body 7 is formed on the internal side of the cap 8 of a container.

The method for producing the content containing body 7 includes the following three methods.

Method 1: A method of producing a content containing body by forming an image on the container body 1, entering the content 9, and subsequently sealing the container with the cap 8

Method 2: A method of producing a content containing body by entering the content 9, and subsequently sealing the container with the cap 8 and forming an image on the container body 1

Method 3: A method of producing a content containing body by forming an image on the container body 1 while entering the content 9, and subsequently sealing the container with the cap 8.

(Method for Producing a Container and Container Producing Apparatus)

A method for producing a container of the present disclosure is a method for producing the container of the present disclosure, includes an irradiation step of irradiating a container body with laser light to form an image, preferably includes either or both of a rotating step and a moving c step, and further includes other steps as needed.

A container producing apparatus of the present disclosure is an apparatus configured to produce the container of the present disclosure, includes an irradiation unit configured to irradiate a container body with laser light to form an image, preferably includes either or both of a rotating unit and a moving unit, and further includes other units as needed.

The spot diameter of the laser light is preferably 1 micrometer or greater but 200 micrometers or less and more preferably 10 micrometers or greater but 100 micrometers or less. When the spot diameter of the laser light is less than 1 micrometer, which is close to the wavelength of visible light, the structure processed with such a beam spot diameter cannot scatter light and make an image be seen whitely opaque. On the other hand, when the spot diameter of the laser light is greater than 200 micrometers, the structure cannot help being seen by a human eye.

It is preferable to form an image by controlling the intensity of the laser light.

It is preferable to form an image by scanning the laser light.

It is preferable to form an image by controlling the intensity of a plurality of laser light beams emitted from a plurality of laser light sources independently.

The method for producing a container of the present disclosure forms an image by irradiating a container body, on which the image is to be drawn, with laser light while rotating the container body.

The apparatus is configured to fix the laser position and move the container, or fix the container and move the laser position.

When moving a container body, an image may be formed under synchronization control of rotating the container body by a predetermined angle, drawing an image with laser, and rotating the container body again by the same angle and drawing an image with laser again, or an image may be drawn with laser on a container body that is rotated at a uniform speed. A container holding position may be the opening portion, the body, or the bottom.

During processing, the container body may be set vertically, horizontally, or obliquely.

The container body may be marked with an image from one side when the container body is passing, for example, a conveyor, or may be marked with images from a plurality of positions at the same time when the container body is passing, for example, a conveyor.

The wavelength of the laser light source is not limited to the ultraviolet band and the visible band, and a wavelength in the near infrared band or the mid-infrared band is also preferable. Specifically, a wavelength region of 1,200 nm or longer but 1,500 nm or shorter is also preferable.

For example, a wavelength in the near-infrared band and the mid-infrared band is preferable because a high-speed operation is available with the wavelength in these bands when making a container body seeable whitely opaque by foaming (thermal modification), and device arraying is also easy with the wavelength in these bands. A wavelength in the ultraviolet band is also preferable because laser light having a high light intensity is available for ablation processing.

Each wavelength band includes a wavelength that has a prominently higher absorptivity into the container body than nearby wavelengths. It is particularly preferable to use such a wavelength.

Table 1 below presents examples of the wavelength having a prominently high absorptivity in each wavelength band. Table 1 presents "approximate wavelength band" on the right column, the wavelength having a prominently high absorptivity in each wavelength band on the left column, and the absorptivity of the wavelength having a prominently high absorptivity on the center column.

TABLE 1

| Wavelength | Absorptivity | Approximate wavelength band |
|---|---|---|
| 1660 nm | 0.24 | 1600 nm~1720 nm |
| 2130 nm | 0.36 | 2050 nm~2210 nm |
| 2270 nm | 0.65 | 2200 nm~2340 nm |
| 2340 nm | 0.69 | 2260 nm~2420 nm |
| 2450 nm | 0.76 | 2350 nm~2550 nm |
| 5800 nm | 0.44 | 5700 nm~6000 nm |
| 8030 nm | 0.46 | 7780 nm~8230 nm |
| 9120 nm | 0.42 | 8600 nm~9500 nm |
| 9760 nm | 0.28 | 9600 nm~10100 nm |
| 11500 nm | 0.22 | 11400 nm~11600 nm |
| 13800 nm | 0.47 | 13500 nm~14500 nm |

Absorptivity is different depending on, for example, the material or thickness of the container body. By way of example, Table 1 presents values relating to a container body formed of PET and having a thickness of 0.5 mm, and presents wavelengths having an absorptivity of 20% or higher.

Using a laser light source that can emit the wavelengths presented in Table 1, it is possible to secure laser light absorptivity into the container body and form a pattern having a good visibility at a high speed. Specific examples of the laser light source include a YAG laser configured to emit laser light having a wavelength of 1,660 nm.

The embodiments of the container producing apparatus of the present disclosure and the method for producing a container of the present disclosure will be described in detail below with reference to the drawings. In the drawings, the same components will be denoted by the same reference numerals, and may not be described repeatedly. For example, the numbers, positions, and shapes of the components are not limited to the embodiments, and may be any numbers, positions, and shapes that are suitable for carrying out the present disclosure.

<First Embodiment of Container Producing Apparatus>

Figure 41:
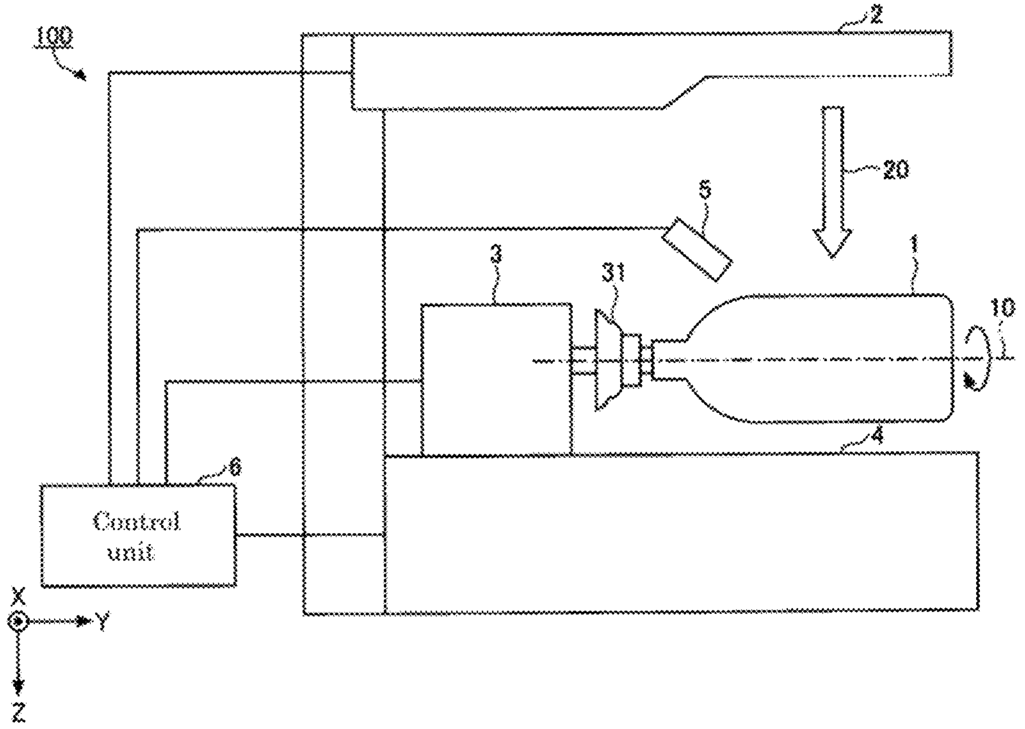
FIG. 41 is a schematic view illustrating an example of a first embodiment of a container producing apparatus.

FIG. 41 is a view illustrating an example of the configuration of a container producing apparatus 100. The container producing apparatus 100 is configured to form an image including a plurality of dented portions and non-dented portions on the surface of a container body 1.

As illustrated in FIG. 41, the container producing apparatus 100 includes a laser irradiation unit 2, a rotating mechanism 3, a holding unit 31, a moving mechanism 4, a dust collecting unit 5, and a control unit 6. The container producing apparatus 100 is configured to hold a container body 1, which is a cylindrical container, rotatably about a cylindrical axis 10 of the container body 1 via a holding unit 31. The container producing apparatus 100 is then configured to cause the laser irradiation unit 2 to irradiate the container body 1 with laser light, to modify the surface conditions of the container body 1 and form an image including a plurality of dented portions and non-dented portions on the surface of the container body 1. The surface conditions of the container body mean the characteristic or conditions of the material (resin) constituting the container body.

The laser irradiation unit 2, which is an example of an irradiation unit, is configured to scan laser light emitted from a laser light source in the direction Y indicated in FIG. 41, and irradiate the container body 1, which is set at the positive side in the direction Z, with processing laser light 20, which is an example of laser light. The laser irradiation unit 2 will be described in detail with reference to FIG. 42A.

The rotating mechanism 3, which is an example of a rotating unit, is configured to hold the container body 1 via the holding unit 31. The holding unit 31 is a coupling member coupled to a motor shaft of an unillustrated motor serving as a driving unit of the rotating mechanism 3, and is configured to insert one end thereof into the opening portion of the container body 1 and hold the container body 1. When the holding unit 31 is rotated by rotation of the motor shaft, the container body 1 held by the holding unit 31 is rotated about the cylindrical axis 10.

The moving mechanism 4, which is an example of a moving unit, is a linear motion stage including a table, and the rotating mechanism 3 is placed on the table of the moving mechanism 4. The moving mechanism 4 is configured to advance and retreat the table in the direction Y to advance and retreat the rotating mechanism 3, the holding unit 31, and the container body 1 in an integrated state in the direction Y.

The moving mechanism 4 of the container producing apparatus 100 may be a mechanism configured to constantly move, such as a conveyor. The container body 1 may be held by the own weights of the container body 1 and the content, or may be simply left put.

The dust collecting unit 5 is an air suctioning device disposed near a portion of the container body 1 to be irradiated with the processing laser light 20. The dust collecting unit 5 is configured to collect plume or dust that may occur during image formation by irradiation with the processing laser light 20 by air suctioning, to prevent contamination of the container producing apparatus 100, the container body 1, and their surroundings by plume or dust.

The control unit 6 is electrically coupled to the laser light source 21, a scanning unit 23, the rotating mechanism 3, the moving mechanism 4, and the dust collecting unit 5 through, for example, cables, and configured to control operations of each unit by outputting control signals.

Under control of the control unit 6, the container producing apparatus 100 causes the rotating mechanism 3 to rotate the container body 1 and the laser irradiation unit 2 to irradiate the container body 1 with the processing laser light 20 scanned in the direction Y, to form an image on the surface of the container body 1 two-dimensionally.

There may be a case where the range of the scanning region over which the processing laser light 20 is scanned in the direction Y by the laser irradiation unit 2 is limited. Therefore, when forming an image over a range broader than the scanning region, the container producing apparatus 100 causes the moving mechanism 4 to move the container body 1 in the direction Y, to shift the position of the container body 1 to be irradiated with the processing laser light 20 in the direction Y. Subsequently, the container producing apparatus 100 causes the laser irradiation unit 2 to scan the processing laser light 20 in the direction Y while causing the rotating mechanism 3 to rotate the container body 1, to form an image on the surface of the container body 1. In this way, an image can be formed on a broader region of the container body 1.

Figure 42A:
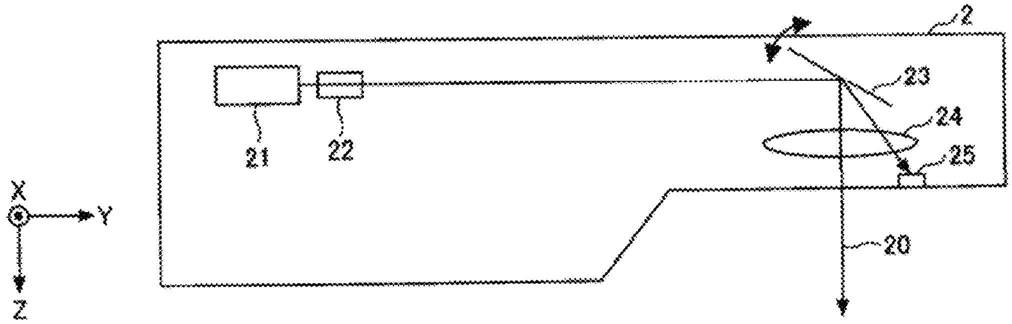
FIG. 42A is a schematic view illustrating an example of a laser irradiation unit according to a first embodiment of a container producing apparatus.

Next, the configuration of the laser irradiation unit 2 will be described. FIG. 42A is a view illustrating an example of the configuration of the laser irradiation unit 2. As illustrated in FIG. 42A, the laser irradiation unit 2 includes a laser light source 21, a beam expander 22, a scanning unit 23, a scanning lens 24, and a synchronization sensing unit 25.

The laser light source 21 is a pulse laser configured to emit laser light. The laser light source 21 is configured to emit laser light having an output power (light intensity) suitable for modifying the surface conditions of the container body 1 to be irradiated with the laser light.

The laser light source 21 can be controlled in, for example, ON or OFF of laser light emission, the emission frequency, and the light intensity. As an example of the laser light source 21, a laser light source having a wavelength of 532 nm, a laser light pulse width of 16 picoseconds, and an average output power of 4.9 W can be used.

The diameter (spot diameter) of the laser light on a region of the surface of the container body 1 to be modified in the surface conditions is preferably 1 micrometer or greater but 200 micrometers or less.

The laser light source 21 may be formed of one laser light source, or a plurality of laser light sources. When a plurality of laser light sources are used, for example, each laser light source may be independently controlled in, for example, ON or OFF, the emission frequency, and the light intensity.

Parallel laser light emitted by the laser light source 21 is expanded in diameter by the beam expander 22 and comes incident into the scanning unit 23.

The scanning unit 23 includes a scanning mirror, of which reflection angle is changed by a driving unit such as a motor. By changing the reflection angle of the scanning mirror, the scanning unit 23 scans the incident laser light in the direction Y. As the scanning mirror, for example, a galvano mirror, a polygon mirror, and a micro electro mechanical system (MEMS) mirror can be used.

The present embodiment has described an example in which the scanning unit 23 scans the laser light one-dimensionally in the direction Y. However, this is non-limiting. The scanning unit 23 may scan the laser light two-dimensionally in the directions X and Y, using a scanning mirror, of which reflection angle is changed in orthogonal two directions.

However, when irradiating the surface of a cylindrical container body 1 with laser light, two-dimensional scanning in the directions X and Y may not be able to help variation of the laser light spot diameter on the surface of the container body 1 along with scanning in the direction X. In such a case, one-dimensional scanning is preferred.

The laser light scanned by the scanning unit 23 serves as the processing laser light 20 with which the surface of the container body 1 is irradiated.

The scanning lens 24 is an fθ lens configured to control the processing laser light 20 scanned by the scanning unit 23 at a constant scanning speed, and condense the processing laser light 20 at a predetermined position on the surface of the container body 1. It is preferable to position the scanning lens 24 and the container body 1 in a manner that the processing laser light 20 has the smallest beam spot diameter in a region of the surface of the container body 1 to be modified in the surface conditions. The scanning lens 24 may be formed of combination of a plurality of lenses.

The synchronization sensing unit 25 is configured to output a synchronization sensing signal used for synchronizing scanning of the processing laser light 20 with the rotation of the container body 1 by the rotating mechanism 3. The synchronization sensing unit 25 includes a photodiode configured to output an electric signal corresponding to the light intensity of the light received, and is configured to output the electric signal of the photodiode to the control unit 6 as a synchronization sensing signal.

Figure 42B:
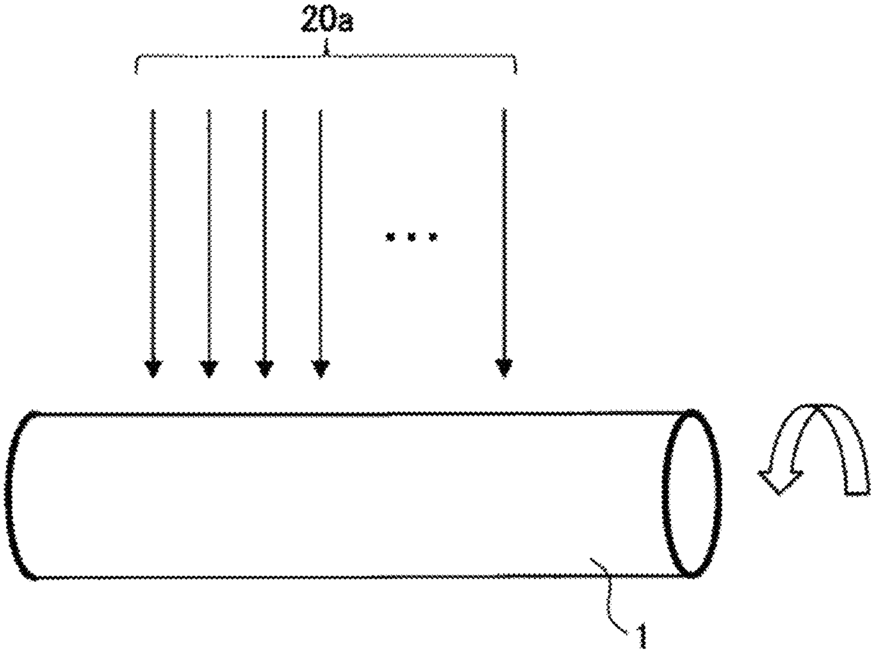
FIG. 42B is a view illustrating laser light irradiation by a processing laser light array.

FIG. 42A illustrates an example in which the processing laser light is scanned. A processing laser light array for a plurality of processing laser light beams may be provided in a range having a printing width and may scan the plurality of laser beams over the container body 1 in one direction by rotating the container body 1. FIG. 42B is a view illustrating this example, and illustrates a processing laser light array formed of a plurality of laser beams parallel with the container body 1.

Figure 43:
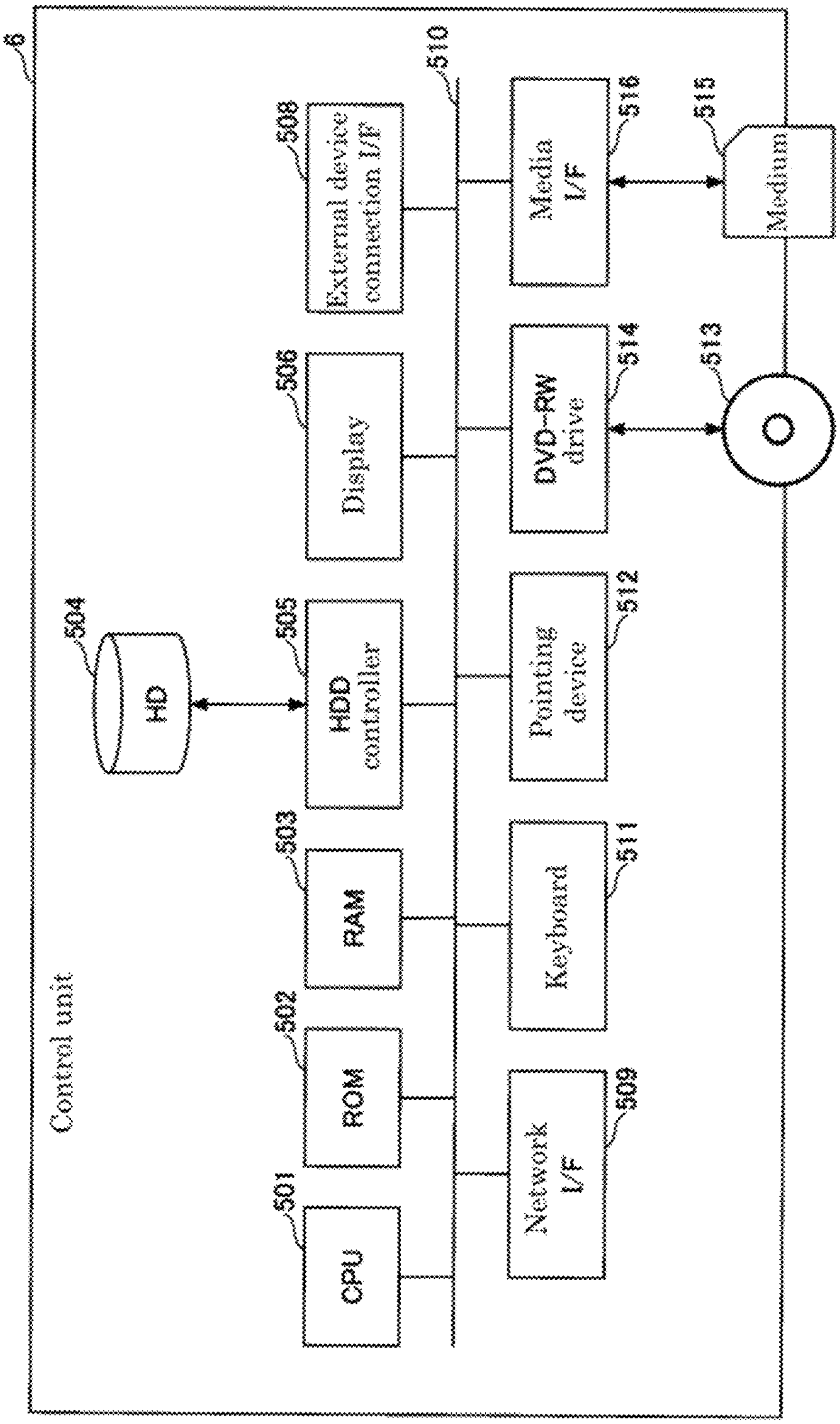
FIG. 43 is a block diagram illustrating an example of a hardware configuration of a control unit according to a first embodiment of a container producing apparatus.

Next, the hardware configuration of the control unit 6 of the container producing apparatus 100 will be described. FIG. 43 is a block diagram illustrating an example of the hardware configuration of the control unit 6. The control unit 6 is built up of a computer.

As illustrated in FIG. 43, the control unit 6 includes a central processing unit (CPU) 501, a read only memory (ROM) 502, a random access memory (RAM) 503, a hard disk (HD) 504, a hard disk drive (HDD) controller 505, and a display 506. The control unit 6 also includes an external device connection interface (I/F) 508, a network I/F 509, a data bus 510, a keyboard 511, a pointing device 512, a digital versatile disk rewritable (DVD-RW) drive 514, and a media I/F 516.

The CPU 501 is a processor, and configured to control the operations of the whole control unit 6. The ROM 502 is a memory r, storing a program, such as an initial program loader (IPL), used for driving the CPU 501.

The RAM 503 is a memory used as a work area of the CPU 501. The HD 504 is a memory storing various data such as a program. The HDD controller 505 is configured to control reading or writing of various data out from or into the HD 504 under control of the CPU 501.

The display 506 is configured to display various information such as a cursor, a menu, a window, letters, or images. The external device connection I/F 508 is an interface configured to couple various external devices. In this case, the external devices are, for example, the laser light source 21, the scanning unit 23, the synchronization sensing unit 25, the rotating mechanism 3, the moving mechanism 4, and the dust collecting unit 5. However, a universal serial bus (USB) memory or a printer may be additionally coupled to the control unit 6.

The network I/F 509 is an interface configured to perform data communication using a communication network. The bus line 510 is, for example, an address bus or a data bus to which various components illustrated in FIG. 43 such as the CPU 501 are electrically coupled.

The keyboard 51 is a kind of an input unit including a plurality of keys for entering letters, numerical values, and various instructions. The pointing device 512 is a kind of an input unit for, for example, selection or execution of various instructions, selection of a processing target, and cursor migration.

The DVD-RW drive 514 is configured to control reading or writing of various data out from or into a DVD-RW 513, which is an example of a detachable recording medium. The medium is not limited to a DVD-RW, and may be, for example, a DVD-R. The media I/F 516 is configured to control reading or writing (storage) of data out from or into a recording medium 515 such as a flash memory.

Figure 44:
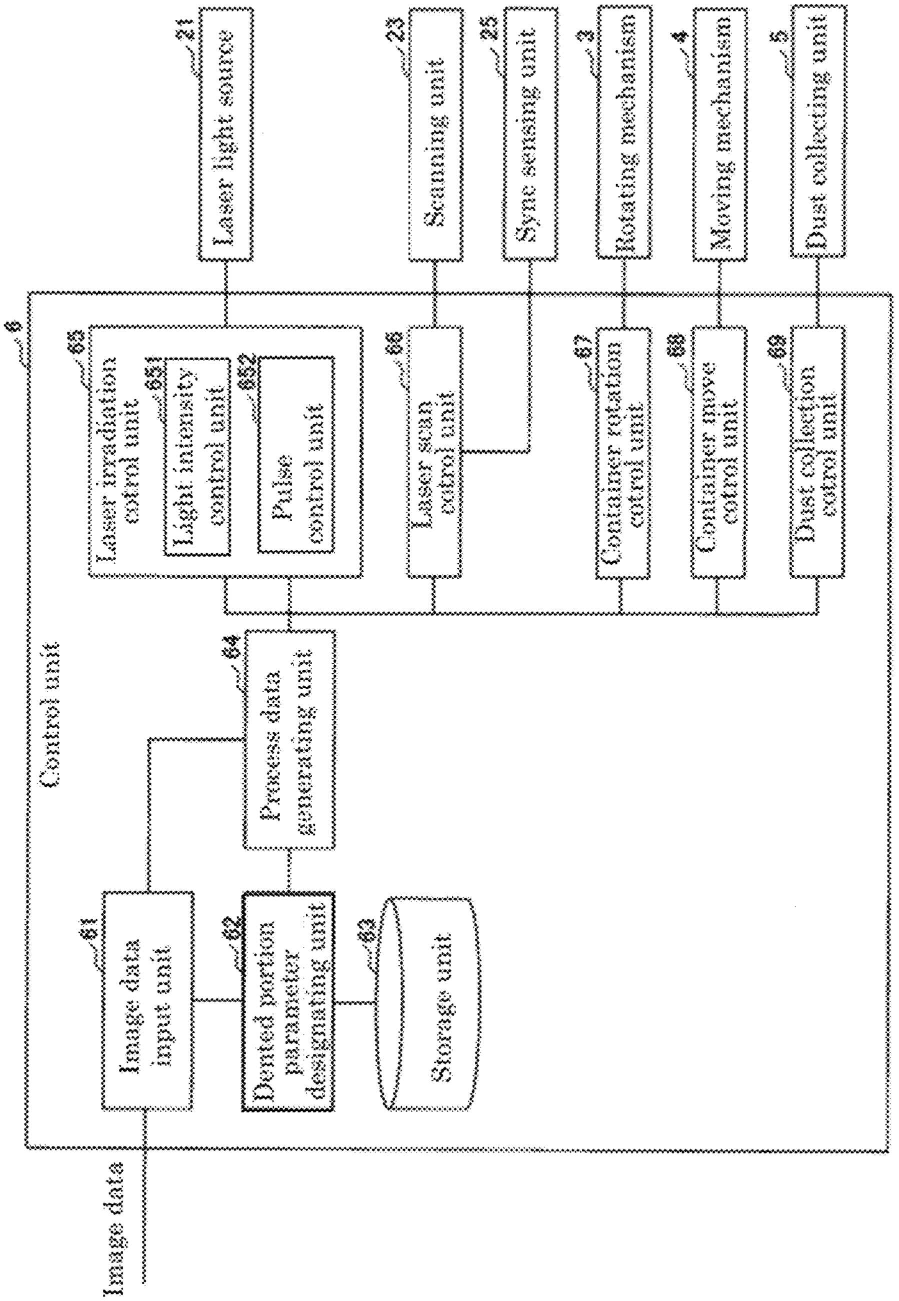
FIG. 44 is a block diagram illustrating an example of a functional configuration of a control unit according to a first embodiment of a container producing apparatus.

Next, the functional configuration of the control unit 6 will be described. FIG. 44 is a block diagram illustrating an example of the functional configuration of the control unit 6.

As illustrated in FIG. 44, the control unit 6 includes an image data input unit 61, a dented portion parameter designating unit 62, a storage unit 63, a process data generating unit 64, a laser irradiation control unit 65, a laser scan control unit 66, a container rotation control unit 67, a container move control unit 68, and a dust collection control unit 69.

The CPU 501 illustrated in FIG. 43 executes a predetermined program and outputs control signals through the external device connection I/F 508 to realize the functions of the image data input unit 61, the dented portion parameter designating unit 62, the process data generating unit 64, a laser irradiation control unit 65, the laser scan control unit 66, the container rotation control unit 67, the container move control unit 68, and the dust collection control unit 69. Alternatively, an electronic circuit or an electric circuit such as an application specific integrated circuit (ASIC) or a field-programmable gate array (FPGA) may be added to the hardware configuration of the control unit 6, and may realize part or the whole of the functions of each unit. The function of the storage unit 63 is realized by, for example, the HD 504.

The image data input unit 61 is configured to receive pattern data of the image to be formed on the surface of the container body 1 from an external device such as a personal computer (PC) or a scanner. The pattern data of the image is electronic data including: information representing a pattern such as a code (e.g., a barcode and a QR code (registered trademark)), letters or characters, a graphic, or a photo; and information indicating the kind of the image.

The pattern data of the image is not limited to data input from an external device. A user of the container producing apparatus 100 may input pattern data of an image generated using the keyboard 511 or the pointing device 512 of the control unit 6.

The image data input unit 61 is configured to output the input pattern data of the image to the process data generating unit 64 and the dented portion pattern designating unit 62.

The dented portion parameter designating unit 62 is configured to designate process parameters for forming dented portions. As described above, dented portions are, for example, lines or dots smaller than an image, and serve to improve the contrast and visibility of the image.

The dented portion process parameters are information designating the kind, boldness, and processed depth of a line serving as a dented portion, or, for example, the interval or deployment of adjoining lines in an aggregate of lines, or information designating the kind, size, and processed depth of a dot serving as a dented portion, or, for example, the interval or deployment of adjoining dots in an aggregate of dots.

The kind of a line is information designating, for example, a straight line or a curve. The kind of a dot is information designating the shape of the dot such as a circle, an ellipse, a rectangle, and a rhomboid. In an aggregate of dented portions, the dented portions may be provided cyclically or noncyclically. It is preferable to provide the dented portions cyclically, because parameter designation can be simplified.

The dented portion process parameters suitable for improving visibility are previously defined by experiments or simulations to suit to the kind of the image such as characters or letters, codes, a graphic, or a photo. The storage unit 63 stores a table indicating the correspondence relationship between the kinds of the image and the process parameters.

The dented portion parameter designating unit 62 can acquire and designate any dented portion process parameters, by consulting the storage unit 63 based on the information indicating the kind of the image, input from the image data input unit 61.

The designation method by the dented portion parameter designating unit 62 is not limited to the method described above. The dented portion parameter designating unit 62 may receive user's designations through the keyboard 511 or the pointing device 512 of the control unit 6, and acquire any dented portion process parameters by consulting the storage unit 63 based on the user's designations.

The dented portion parameter designating unit 62 may acquire dented portion process parameters that the user of the container producing apparatus 100 has generated using the keyboard 511 or the pointing device 512 of the control unit 6.

The process data generating unit 64 is configured to generate process data for forming the image formed of an aggregate of dented portions, based on the pattern data of the image and the dented portion process parameters.

The process data includes rotation condition data based on which the rotating mechanism 3 rotates the container body 1, scan condition data based on which the laser irradiation unit 2 scans the processing laser light 20, and irradiation condition data based on which the laser irradiation unit 2 irradiates the container body 1 with the processing laser light 20 synchronously with the rotation of the container body 1, and also includes moving condition data based on which the moving mechanism 4 moves the container body 1 in the direction Y, and dust collection condition data based on which the dust collecting unit 5 collects dust.

The process data generating unit 64 is configured to output the generated process data to each of the laser irradiation control unit 65, the laser scan control unit 66, the container rotation control unit 67, the container move control unit 68, and the dust collection control unit 69.

The laser irradiation control unit 65 includes a light intensity control unit 651 and a pulse control unit 652, and is configured to control irradiation of the container body 1 with the processing laser light 20 by the laser light source 21 based on the irradiation condition data. The laser irradiation control unit 65 is also configured to control the timing at which the container body 1 is irradiated with the processing laser light 20 in a manner to be synchronous with the rotation of the container body 1 by the rotating mechanism 3 based on a synchronization sensing signal from the synchronization sensing unit 25. A known technique such as Japanese Unexamined Patent Application Publication No. 2008-73894 can be applied to the irradiation timing control using a synchronization sensing signal. Therefore, irradiation timing control using a synchronization sensing signal will not be described in detail here.

When the laser light source 21 is formed of a plurality of laser light sources, the laser irradiation control unit 65 performs the control for each of the plurality of laser light sources independently.

The light intensity control unit 651 is configured to control the light intensity of the processing laser light 20. The pulse control unit 652 is configured to control the pulse width and the irradiation timing of the processing laser light 20.

The laser scan control unit 66 is configured to control scanning of the processing laser light 20 by the scanning unit 23 based on the scan condition data. Specifically, the laser scan control unit 66 is configured to control, for example, ON or OFF of scanning mirror drive and the drive frequency.

The container rotation control unit 67 is configured to control, for example, ON or OFF of rotation drive of the container body 1 by the rotating mechanism 3, the rotation angle, the rotation direction, and the rotation speed based on the rotation condition data. The container rotation control unit 67 may rotate the container body 1 continuously in a predetermined rotation direction, or may rotate (sway) the container body 1 in a reciprocating manner within a predetermined angle range such as ±90 degrees by switching the rotation direction.

The container move control unit 68 is configured to control, for example, ON or OFF of moving drive of the container body 1 by the moving mechanism 4, the moving direction, the moving distance, and the moving speed based on the moving condition data.

The dust collection control unit 69 is configured to control, for example, ON or OFF of dust collection by the dust collecting unit 5, and the suctioning air flow rate or flow speed based on the dust collection condition data. A mechanism configured to move the dust collecting unit 5 may be provided to control move of the dust collecting unit 5 in a manner that the dust collecting unit 5 is deployed near the position to be irradiated with the processing laser unit 20.

Figure 45:
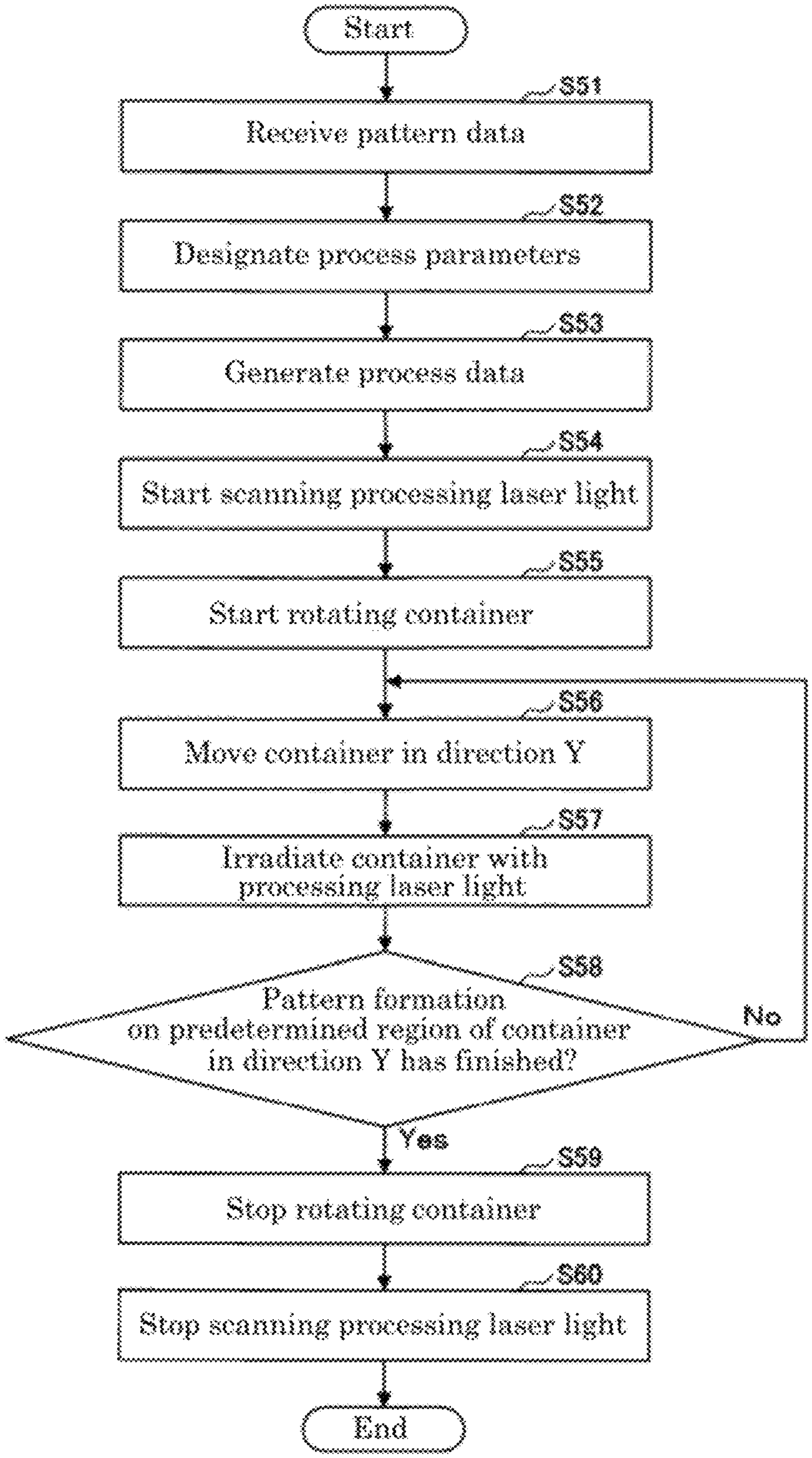
FIG. 45 is a flowchart illustrating an example of a producing method according to a first embodiment of a container producing apparatus.

Next, the producing method by the container producing apparatus 100 will be described. FIG. 45 is a flowchart illustrating an example of a method for producing a container by the container producing apparatus 100.

In the step S51, the image data input unit 61 receives pattern data of an image from an external device such as a PC or a scanner. The image data input unit 61 outputs the received pattern data of the image to the process data generating unit 64 and the dented portion parameter designating unit 62.

Next, in the step S52, the dented portion parameter designating unit 62 designates process parameters for forming dented portions. The dented portion parameter designating unit 62 acquires and designates dented portion process parameters by consulting the storage unit 63 based on the information indicating the kind of the image received by the image data input unit 61.

The order of the operations in the step S51 and the step S52 may be exchanged appropriately, or these steps may be performed in parallel.

Next, in the step S53, the process data generating unit 64 generates process data for forming the image that is formed of an aggregate of dented portions based on the pattern data of the image and the dented portion process parameters. The process data generating unit 64 outputs the generated process data to the laser irradiation control unit 65, the laser scan control unit 66, the container rotation control unit 67, the container move control unit 68, and the dust collection control unit 69.

Next, in the step S54, the laser scan control unit 66 causes the scanning unit 23 to start scanning the processing laser light 20 in the direction Y based on the scan condition data. In the embodiment, in response to the start of scan, the scanning unit 23 continues scanning the processing laser light 20 in the direction Y until a scan stop instruction is issued.

Next, in the step S55, the container rotation control unit 67 causes the rotating mechanism 3 to start rotation drive of the container body 1 based on the rotation condition data. In the embodiment, in response to the start of rotation drive, the rotating mechanism 3 continues rotating the container body 1 until a rotation stop instruction is issued.

Next, in the step S56, the container move control unit 68 causes the moving mechanism 4 to move the container body 1 to the initial position in the direction Y based on the moving condition data in a manner that a predetermined position of the container body 1 may be irradiated with the processing laser light 20. After moving the container body 1 to the initial position is completed, the container move control unit 68 stops the moving mechanism 4.

The order of the operations in the step S54 to the step S56 may be exchanged appropriately, or these steps may be performed in parallel.

Next, in the step S57, the laser irradiation control unit 65 starts control on irradiation of the container body 1 with the processing laser light 20.

Specifically, the laser irradiation unit 2 irradiates the container body 1 with the processing laser light 20 by scanning the processing laser light 20 by one line along the Y direction. Subsequently, the rotating mechanism 3 rotates the container body 1 about the cylindrical axis 10 by a predetermined angle. After the rotation by the predetermined angle, the laser irradiation unit 2 irradiates the container body 1 with the processing laser light 20 by scanning the processing laser light 20 by the next one line. Subsequently, the rotating mechanism 3 rotates the container body 1 about the cylindrical axis 10 by a predetermined angle. Through repetition of these operations, the image is sequentially formed on the surface of the container body 1.

Next, in the step S58, the laser irradiation control unit 65 determines whether image formation on a predetermined region of the container body 1 in the direction Y has finished.

When it is determined in the step S58 that image formation has not finished (step S58, No), the operations from the step S56 are repeated again.

On the other hand, when it is determined in the step S58 that image formation has finished (step S58, Yes), the rotating mechanism 3 stops rotation drive of the container body 1 in response to a stop instruction from the container rotation control unit 67 in the step S59.

Next, in the step S60, the scanning unit 23 stops scanning the processing laser light 20 in response to a stop instruction from the laser scan control unit 66. The laser light source 21 stops emission of the processing laser light 20 in response to a stop instruction from the laser irradiation control unit 65.

The order of the operations in the step S59 and the step S60 may be exchanged appropriately, or these steps may be performed in parallel.

In this way, the container producing apparatus 100 can form an image formed of an aggregate of dented portions on the surface of the container body 1.

Next, examples of various data used in production of the container body 1 will be described.

Figures 46, 47:
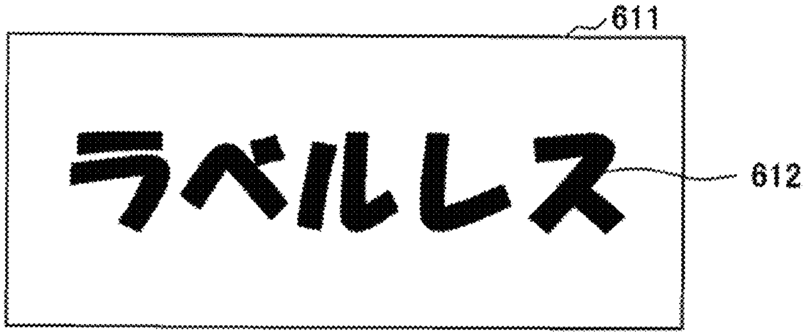
FIG. 46 is a view illustrating an example of pattern data.
FIG. 47 is a diagram illustrating an example of a correspondence table between kinds of images and process parameters.

FIG. 46 is a view illustrating an example of pattern data of an image received by the image data input unit 61.

As illustrated in FIG. 46, the pattern data 611 includes character data 612 representing a Japanese term "ラベルレス". The character data 612 is the target to be formed on the container body 1 as an image. Aggregates of a plurality of lines constituting the five characters included in the Japanese term "ラベルレス" correspond to the data of the image. Other data than the character data 612 in the pattern data 611 is not the target to be formed on the container body 1.

For example, the pattern data 611 is provided in the form of an image file such as bitmap. The header information of the image file providing the pattern data 611 includes information indicating the kind of the image. In this example, the kind of the image is "character".

The image data input unit 61 outputs the pattern data 611 including the information indicating "character" to the dented portion parameter designating unit 62 and the process data generating unit 64.

FIG. 47 illustrates an example of a correspondence table stored in the storage unit 63. The correspondence table 631 illustrated in FIG. 47 indicates correspondence relationship between the kinds of images such as letters or characters, codes, graphics, and photos and the dented portion process parameters suitable for improving the visibility of the image. The correspondence relationship is previously defined by experiments or simulations.

The numerical values presented on the "identification information" column in the correspondence table 631 represent information indicating the kind of the image. The information presented 5 on the "kind" column indicates the kind of the image. The information presented on the "parameter" column indicate the name of the file in which the process parameters corresponding to the kind of the image are recorded.

The dented portion parameter designating unit 62 consults the c correspondence table 631, reads a file corresponding to the information indicating the kind of the image, and acquires process parameters. In the example of FIG. 46, the kind of the image is "character". Therefore, the dented portion parameter designating unit 62 reads a file "para1" corresponding to the identification information "1" indicating "character", acquires process parameters, and outputs the process parameters to the process data generating unit 64.

Figures 48, 49:
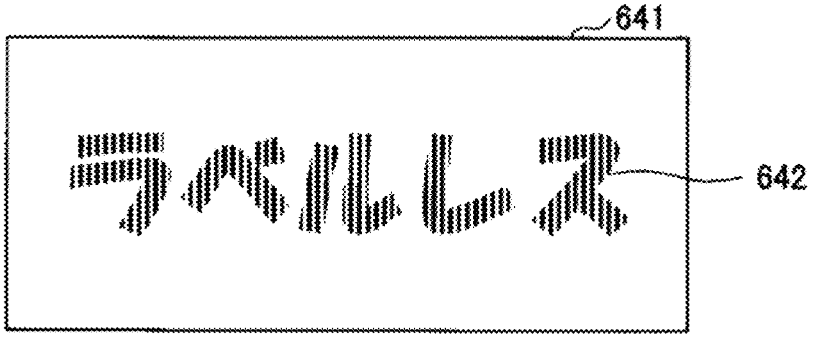
FIG. 48 is a diagram illustrating an example of process parameters.
FIG. 49 is a view illustrating an example of process data.

FIG. 48 is a diagram illustrating an example of process parameters acquired by the dented portion parameter designating unit 62. Parameters matching the items on the "item" column of a process parameter 621 are presented on the "parameter" column.

FIG. 49 is a view illustrating an example of process data generated by the process data generating unit 64. Character data 642 in the process data 641 is formed of a plurality of straight line data corresponding to dented portions. The black regions in the process data 641 correspond to the regions of the container body 1 to be modified in the conditions by irradiation with the processing laser light 20.

Figure 50A:
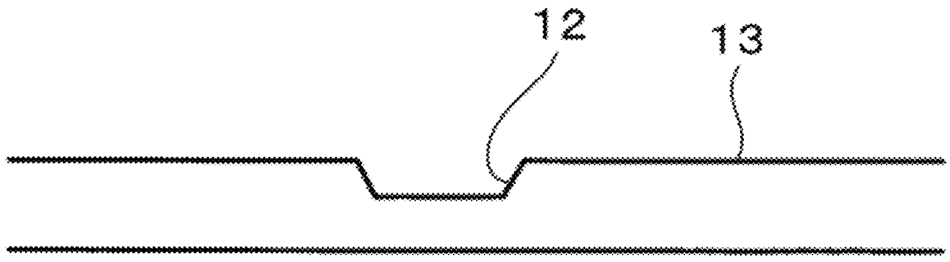
FIG. 50A is a view illustrating modification of surface conditions of a container body, where modification is by evaporation.
Figure 50B:
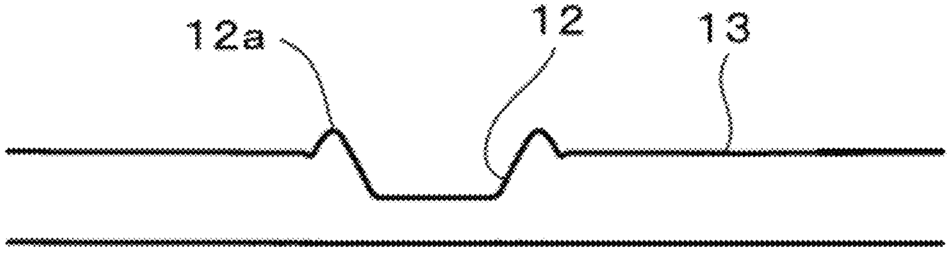
FIG. 50B is a view illustrating modification of surface conditions of a container body, where modification is by melting.

FIG. 50A and FIG. 50B are views illustrating examples of surface condition modification on the container body 1 by irradiation with the processing laser light 20.

FIG. 50A illustrates a dented portion 12 formed by evaporating the surface of the container body 1. FIG. 50B illustrates a dented portion 12 formed by melting the surface of the container body 1. In FIG. 50B, edge portions 12*a* of the dented portion 12 are uplifted, as compared with FIG. 50A.

By modifying the surface shape of the container body 1 in this way, it is possible to form an image including dented portions 12 and non-dented portions 13 on the surface of the container body 1.

The method for forming a shape of a dented portion by evaporating the surface of the container body 1 may, for example, irradiate the surface of the container body 1 with a pulse laser having a wavelength of from 355 nm through 1,064 nm and a pulse width of from 10 fs through 500 nm. As a result, the portion irradiated with the laser beam evaporates, and a minute dented portion is formed in the surface.

The surface of the container body may be melted by irradiation with a continuous wave (CW) laser having a wavelength of from 355 nm through 1,064 nm. A dented portion can also be formed in this way. By continuing laser irradiation even after the surface of the container body is melted, it is possible to foam the interior and the surface of the container body, and make the container body be seen whitely opaque.

Modification of the surface conditions of the container body 1 is not limited to the modifications illustrated in FIG. 60A and FIG. 50B. The surface conditions of the container body may be modified by, for example, yellowing, oxidation reaction, and surface reformation of the surface of the container body formed of a resin material.

As the laser light source 21 used in the container producing apparatus 100, pulse lasers having wavelengths of, for example, 355 nm, 532 nm, and 1,064 nm are used. The pulse width is from some tens of femtoseconds through some hundreds of nanoseconds. In other words, a short pulse laser in the ultraviolet region or the visible region, or an ultrashort pulse laser is used. However, the laser light source 21 is not limited to these lasers, but a CW laser or a modulated CW laser may be used.

As a laser light source having a shorter wavelength is used as the laser light source 21, the spot diameter of the laser light can be smaller. This is preferable for forming an image formed of an aggregate of dented portions.

<Second Embodiment of Container Producing Apparatus>

Figure 51:
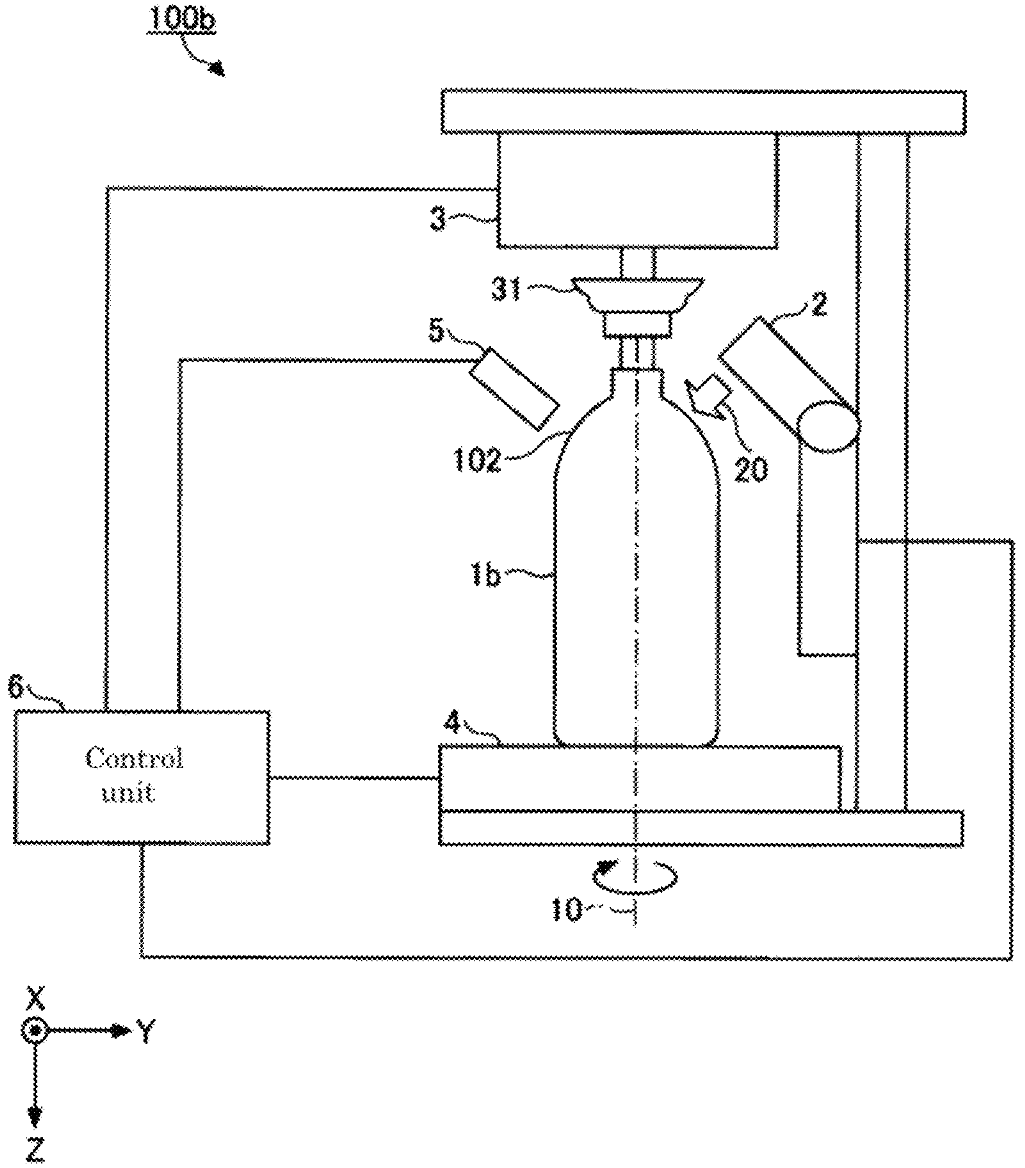
FIG. 51 is a schematic view illustrating an example of a second embodiment of a container producing apparatus.

FIG. 51 is a view illustrating an example of a configuration of a container producing apparatus 100*b* according to a second embodiment of a container producing apparatus configured to produce a container body 1*b* according to the third embodiment of the container. The container producing apparatus 100*b* is configured to hold the container body 1*b* in a manner that a cylindrical axis 10 of the container body 1*b* is along the direction Z. A laser irradiation unit 2 is disposed counter to a shoulder portion 102 of the container body 1*b* for irradiation of the shoulder portion 102 with processing laser light 20.

The configuration of the container producing apparatus 100*b* enables the processing laser light 20 to be scanned over the shoulder portion 102, and makes it easy to form an image formed of an aggregate of dented portions.

<Modified Example 1 of the Second Embodiment of the Container Producing Apparatus>

Figure 52:
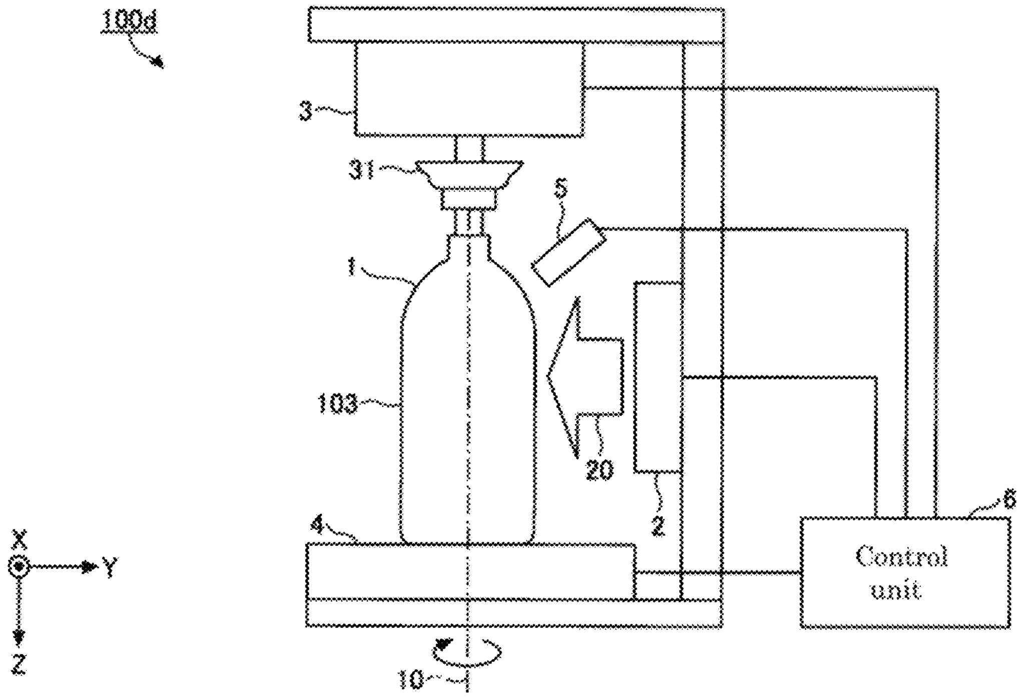
FIG. 52 is a view illustrating an example of a configuration of an apparatus according to a modified example 1 of a second embodiment of a container producing apparatus.

FIG. 52 is a view illustrating an example of a configuration of a container producing apparatus 100*d* according to a modified example 1 of the second embodiment of the container producing apparatus. The container producing apparatus 100*d* is configured to hold a container body 1 in a manner that a cylindrical axis 10 of the container body 1 is along the direction Z. A laser irradiation unit 2 is disposed counter to a trunk portion 103 of the container body 1 for irradiation of the trunk portion 103 with processing laser light 20.

<Modified Example 2 of the Second Embodiment of the Container Producing Apparatus>

Figure 53:
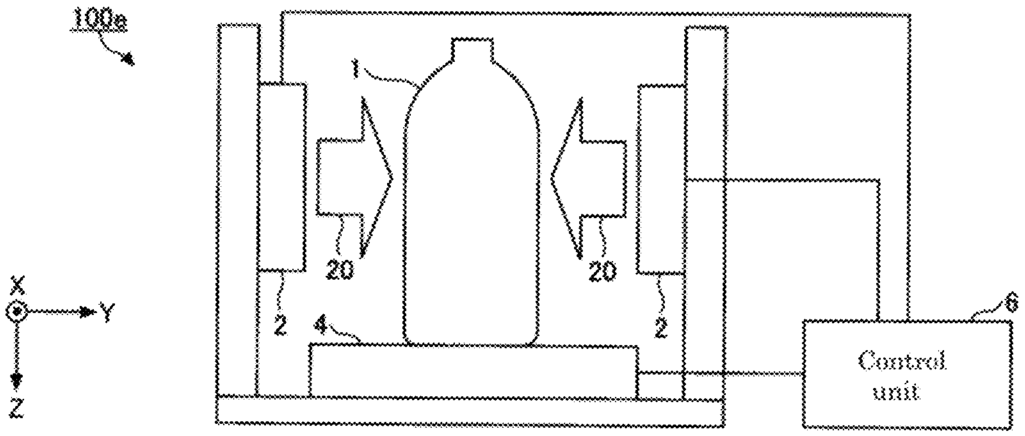
FIG. 53 is a view illustrating an example of a configuration of an apparatus according to a modified example 2 of a second embodiment of a container producing apparatus.

FIG. 53 is a view illustrating an example of a configuration of a container producing apparatus 100*e* according to a modified example 2 of the second embodiment of the container producing apparatus. The container producing apparatus 100*e* is configured to hold a container body 1 in a manner that a cylindrical axis 10 of the container body 1 is along the direction Z. Laser irradiation units 2 are disposed counter to a trunk portion 103 of the container body 1 from both of the positive side and the negative side in the direction Y in a manner that the container body 1 is sandwiched between the laser irradiation units 2. The two laser irradiation unit 2 are configured to irradiate the trunk portion 103 of the container body 1 with processing laser light 20 from both of the positive side and the negative side in the direction Y.

The container producing apparatus 100*e* can form images formed of aggregates of dented portions on both sides of the trunk portion 103 of the container body 1 on the positive side and the negative side in the direction Y. Hence, a rotating mechanism configured to rotate the container body 1 about the cylindrical axis is omitted from the configuration. However, a rotating mechanism may be added to the configuration.

A moving mechanism 4 may be a mechanism configured to constantly move, such as a conveyor. The container body 1 may be held by the own weights of the container body 1 and the content, or may be simply left put. The configuration may include not only two, but also three or more laser irradiation units.

<Third Embodiment of a Container Producing Apparatus>

Figure 54:
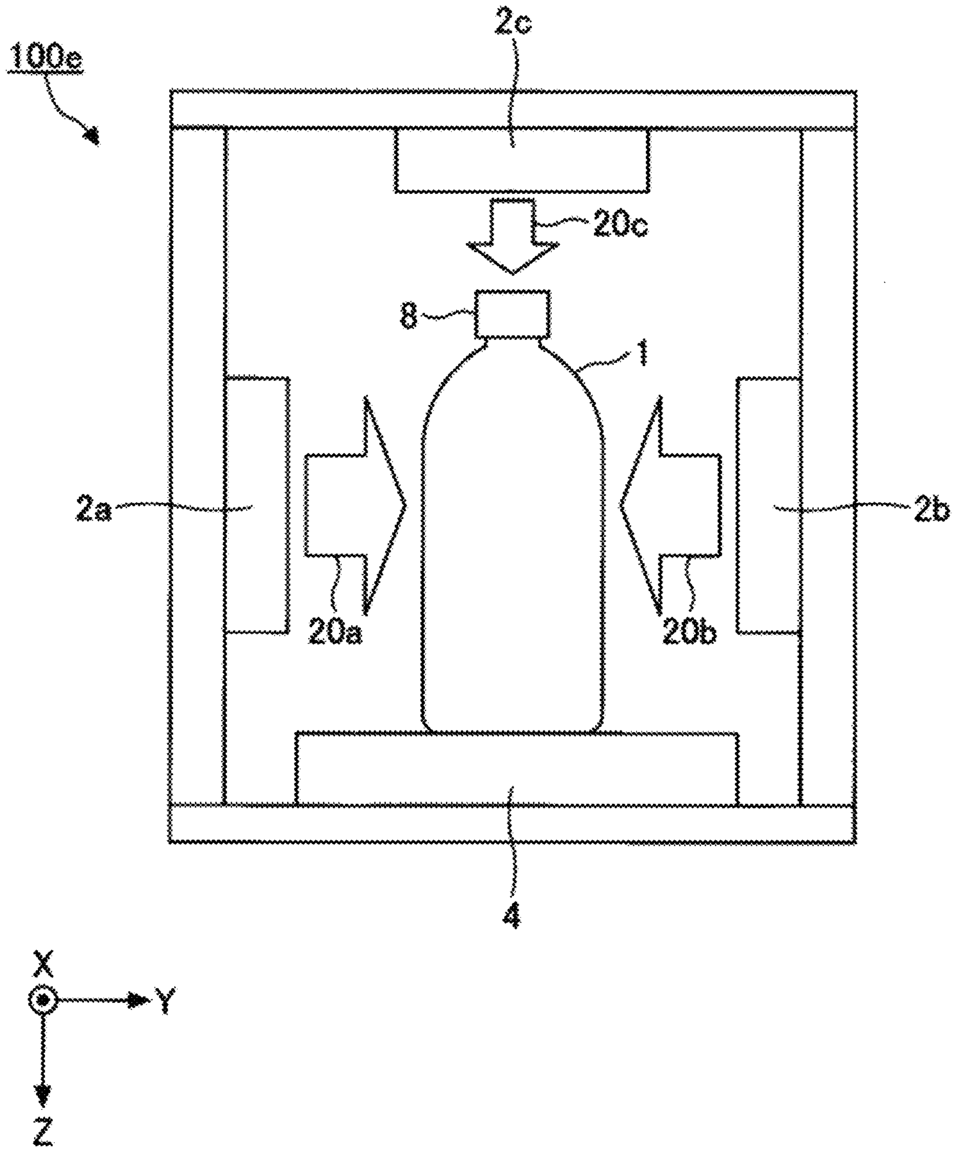
FIG. 54 is a view illustrating an example of a configuration for irradiating different positions with laser light of different wavelengths according to a third embodiment of a container producing apparatus.

FIG. 54 is a view illustrating an example of a container producing apparatus 100*e* according to a third embodiment of a container producing apparatus configured to irradiate different positions of a container body 1 with laser light of different wavelengths. The container producing apparatus 100*e* includes laser irradiation units 2*a*, 2*b*, and 2*c*. The laser irradiation unit 2*a* is configured to irradiate a first surface (e.g., the surface on the negative side in the direction Y in FIG. 54) of the container body 1 with processing laser light 20*a* having a first wavelength. The laser irradiation unit 2*b* is configured to irradiate a second surface (e.g., the surface on the positive side in the direction Y in FIG. 54) of the container body 1 with processing laser light 20*b* having a second wavelength. The laser irradiation unit 2*c* is configured to irradiate a surface of a cap 8 of a container of the container body 1 with processing laser light 20*c* having a third wavelength.

Laser light sources of the laser irradiation units 2*a*. 2*b*, and 2*c* can emit the processing laser light 20*a*, 20*b*, and 20*c*. The first wavelength, the second wavelength, and the third wavelength are wavelengths different from one another. However, the wavelengths of all of the light sources need not be different, but some light sources may have the same wavelength. The laser irradiation units 2*a*, 2*b*, and 2*c* can emit the processing laser light in parallel.

For example, when the material of the cap 8 of a container is different from the material of the container body 1 and the absorptivity of the first wavelength into the cap 8 is lower than the absorptivity of the 2*c* first wavelength into the container body 1, the cap 8 is irradiated with the processing laser light 20*b* having the second wavelength of which absorptivity into the material of the cap 8 of a container is equal or similar to the absorptivity of the first wavelength into the container body 1. This makes it possible to match the speed at which a pattern is formed on the container body 1 by the processing laser light 20*a* with the speed at which a pattern is formed on the cap 8 of a container by the processing laser light 20*b*.

By variation of the first wavelength and the third wavelength from each other, for example, a pattern having a different density from a pattern to be formed on the first surface of the container body 1 by the laser irradiation unit 2*a* can be formed on the second surface of the container body 1 by the laser irradiation unit 2*c*.

<Fourth Embodiment of a Container Producing Apparatus>

Figure 55:
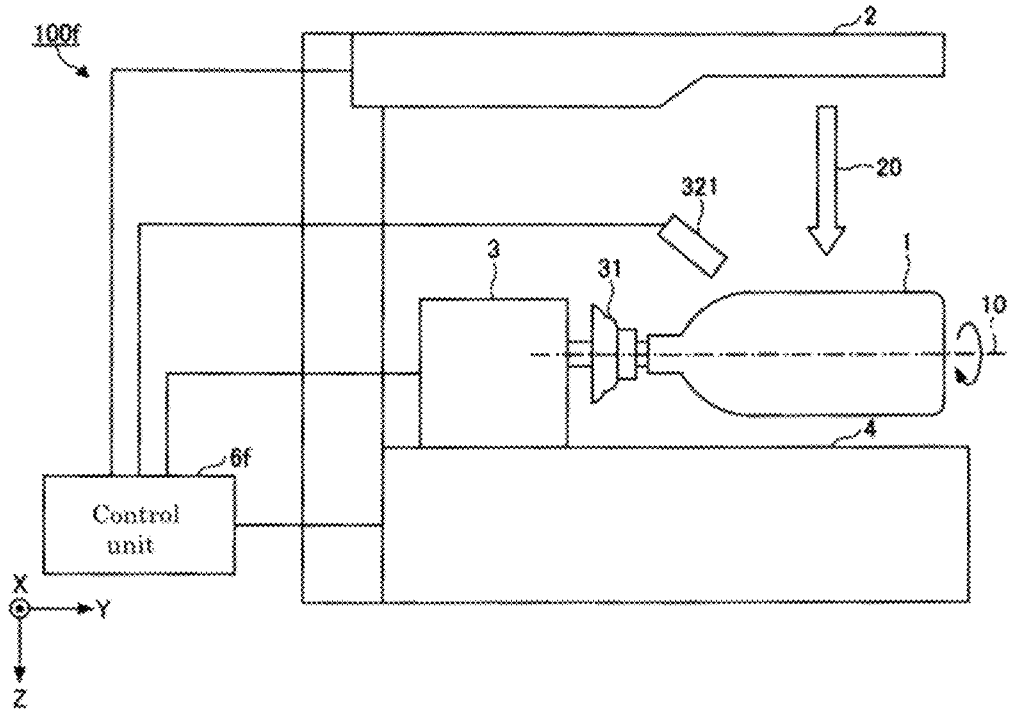
FIG. 55 is a view illustrating an example of temperature control by a producing apparatus according to a fourth embodiment of a container producing apparatus.

FIG. 55 is a view illustrating an example of temperature control by a container producing apparatus 100*f* according to a fourth embodiment of a container producing apparatus. As illustrated in FIG. 55, the container producing apparatus 100*f* includes an air blow 321 and a control unit 6*f*.

The air blow 321 is an air jetting device disposed near a portion of a container body 1 to be irradiated with processing laser light 20. The air blow 321 is configured to blow a portion of the container body 1 irradiated with the processing laser light 20 and having undergone a temperature rise, with air to cool the portion.

Under control of the control unit 6*f*, the air blow 321 can switch ON or OFF air jetting and change the amount of air to be jetted. Moreover, the air blow 321 may be held on a holding unit such as a robot hand and the holding unit may be driven. This makes it possible to change the position to which air is jetted, in accordance with the position to be irradiated with the processing laser light 20.

Here, the air blow 321 is described as an example of the configuration for cooling a portion of the container body 1 irradiated with the processing laser light 20 and having undergone a temperature rise. This is non-limiting. Any configuration having a cooling function may be employed.

Figure 56:
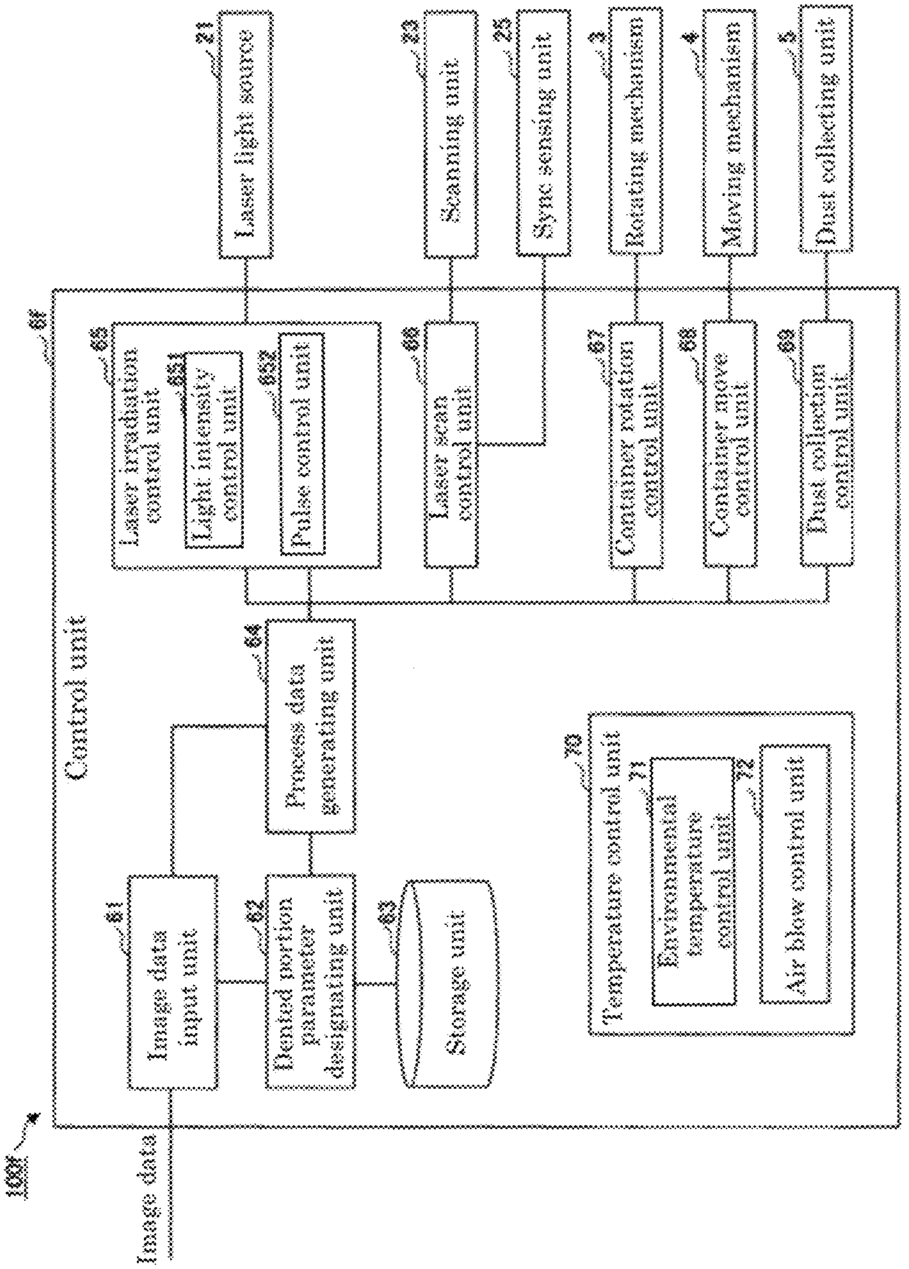
FIG. 56 is a block diagram illustrating an example of a functional configuration of a control unit according to a fourth embodiment of a container producing apparatus.

FIG. 56 is a blow diagram illustrating an example of the functional configuration of the control unit 6*f*. The control unit 6*f* includes a temperature control unit 70. The temperature control unit 70 includes an environmental temperature control unit 71 and an air blow control unit 72.

The environmental temperature control unit 71 is configured to control a heating unit such as a heater and a cooling unit such as a heat exchanger to control the environmental temperature in the whole interior of the producing apparatus 100*f*.

The air blow control unit 72 can control, for example, switch ON and OFF of air jetting by the air blow 321, and the amount of air to be jetted.

<Fifth Embodiment of a Container Producing Apparatus>

Figure 57:
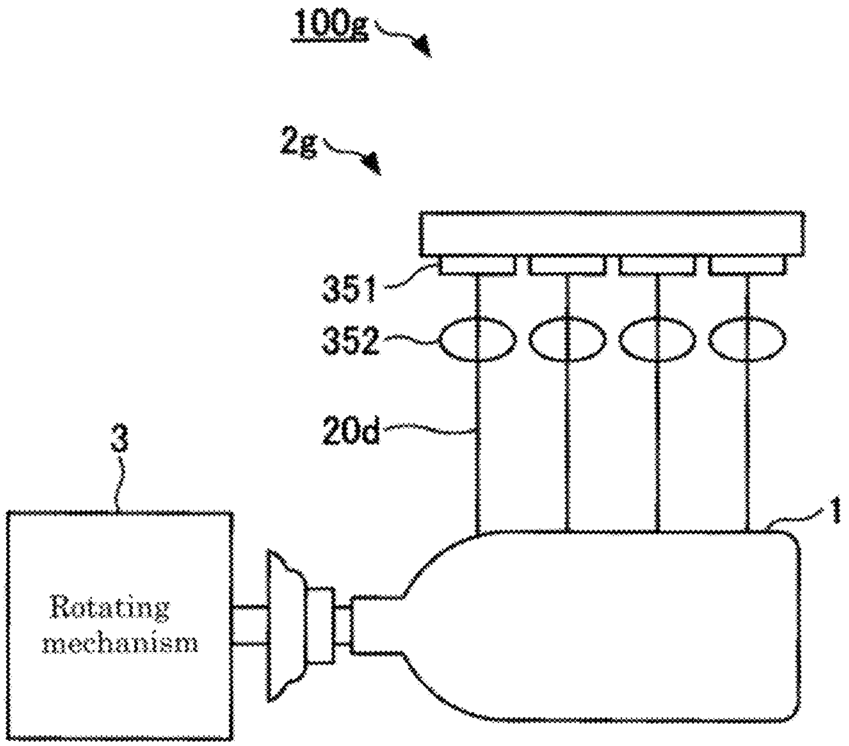
FIG. 57 is a view illustrating an example of an apparatus configured to emit multi-laser beams according to a fifth embodiment of a container producing apparatus.

FIG. 57 is a view illustrating an example of a configuration for irradiation of multi-laser beams emitted by an array laser according to a fifth embodiment of a container producing apparatus. The multi-laser beams represent two or more laser beams.

As illustrated in FIG. 57, a container producing apparatus 100*g* includes a laser irradiation unit 2*g* and a rotating mechanism 3. The lase irradiation unit 2*g* includes a plurality of semiconductor lasers 351 disposed in an array formation, and a plurality of condenser lenses 352 provided in one-to-one correspondence with the semiconductor lasers 351.

The laser irradiation unit 2*g* is configured to irradiate a container body 1 with laser beams emitted by the plurality of semiconductor lasers 351 through the condenser lenses 352. The producing apparatus 100*g* can form a pattern on the surface of the container body 1 by irradiating the container body 1 in parallel with the laser beams emitted by the semiconductor lasers 351 while causing the rotating mechanism 3 to rotate the container body 1.

The laser irradiation unit 2*g* may include a plurality of optical fibers in one-to-one correspondence with the plurality of semiconductor lasers 351, and may be configured to irradiate the container body 1 with laser beams guided through the optical fibers.

Figure 58A:
FIG. 58A is a view illustrating an example of multi-laser beams emitted by an array laser according to a fifth embodiment of a container producing apparatus, illustrating an array in one line.
Figure 58B:
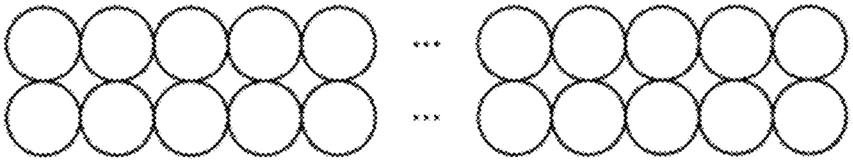
FIG. 58B is a view illustrating an example of multi-laser beams emitted by an array laser according to a fifth embodiment of a container producing apparatus, illustrating an array in two lines.
Figure 58C:
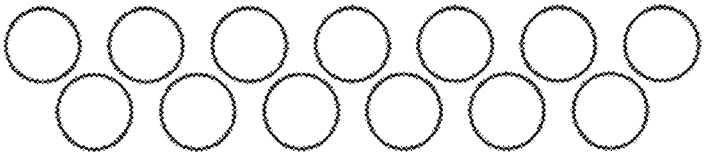
FIG. 58C is a view illustrating an example of multi-laser beams emitted by an array laser according to a fifth embodiment of a container producing apparatus, illustrating a staggered two-dimensional array.
Figure 58D:
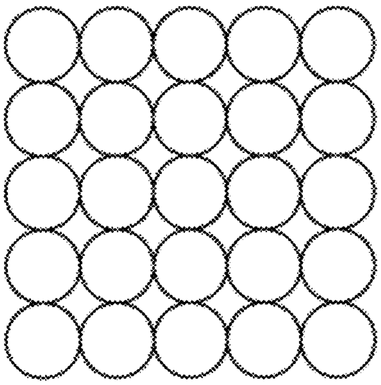
FIG. 58D is a view illustrating an example of multi-laser beams emitted by an array laser according to a fifth embodiment of a container producing apparatus, illustrating a rectangular grid-like two-dimensional array.

FIG. 58A to FIG. 58D are views illustrating various multi-laser beams emitted by an array laser according to the fifth embodiment of a container producing apparatus. FIG. 58A is a view of an array in one line, FIG. 58B is a view of an array in two lines, FIG. 58C is a view of a staggered two-dimensional array, and FIG. 58D is a view of a rectangular grid-like two-dimensional array. The producing apparatus 100*g* according to the fifth embodiment can irradiate the container body 1 with the multi-laser beams illustrated in FIG. 58A to FIG. 68D.

FIG. 58A illustrates an array of, for example, 254 laser beams. This enables a 1-inch width region of the surface of the container body 1 to be irradiated with laser beams in parallel at a pixel size of 100 micrometers.

For example, the multi-beams of FIG. 58A can form a pattern at a high speed with a low-cost configuration. The multi-beams of FIG. 58B can form a pattern at an even higher speed than the multi-beams of FIG. 58A.

The multi-beams of FIG. 58C can increase the density (dot density) of the beams on the container body. The multi-beams of FIG. 58D can form a pattern at an even higher speed than the multi-beams of FIG. 58A and FIG. 58B. The multi-beams of FIG. 58D can also form a two-dimensional pattern without rotating or moving the container body 1.

The embodiments of the container producing apparatus have been described in detail. The present disclosure should not be construed as being limited to the embodiments described above, but various modifications may be made thereunto without departing from the spirit of the present disclosure. For example, the embodiments described above have described an example in which an image including a plurality of dented portions and non-dented portions is formed with processing laser light. Other processing methods such as cutting may also be employed.

Aspects of the present disclosure are, for example, as follows.

<1> A container, including:

a container body; and image on the container body, wherein the image includes a plurality of dented portions and non-dented portions, and a visibility value of the image represented by Mathematical formula (1) below is greater than or equal to a predetermined value, $$\text{Visibility value} = b_0 \cdot L^*_0 \cdot (1-\exp(b_1 \cdot \Delta L^*)) \quad \text{Mathematical formula (1)}$$

where in Mathematical formula (1). $L^*_0$ represents a luminosity of the image, $\Delta L^*$ represents a difference between the luminosity of the image and a luminosity of any other portion than the image, $b_0$ represents a positive real number, and $b_1$ represents a negative real number.

<2> The container according to <1>, wherein the visibility value is 2 or greater.

<3> The container according to <1> or <2>, wherein a ratio of an area of the plurality of dented portions to an area of the image [(the area of the plurality of dented portions/the area of the image)×100] is 40% or greater but 95% or less.

<4> The container according to any one of <1> to <3>, wherein each of the dented portions is formed of a plurality of processed portions, and the plurality of processed portions are disposed linearly along a first scanning direction.

<5> The container according to <4>, wherein a width of each of the dented portions in a second scanning direction orthogonal to the first scanning direction is less than or equal to a one-dot width of a predetermined resolution.

<6> A container, including:

a container body; and an image on the container body, wherein the image includes a plurality of dented portions, and a visibility value of the image represented by Mathematical formula (1) below is greater than or equal to a predetermined value, $$\text{Visibility value} = b_0 \cdot L^*_0 \cdot (1-\exp(b_1 \cdot \Delta L^*)) \quad \text{Mathematical formula (1)}$$

where in Mathematical formula (1), $L^*_0$ represents a luminosity of the image, $\Delta L^*$ represents a difference between the luminosity of the image and a luminosity of any other portion than the image, $b_0$ represents a positive real number, and $b_1$ represents a negative real number.

<7> The container according to <6>,
wherein the visibility value is 2 or greater.

<8> A method for producing the container according to any one of <1> to <7>, the method including
irradiating the container body with laser light to form the image.

<9> The method for producing the container according to <8>, further including
either or both of rotating the container body about an axis and moving the container body.

<10> The method for producing the container according to <8> or <9>,
wherein a spot diameter of the laser light is 1 micrometer or greater but 200 micrometers or less.

<11> The method for producing the container according to any one of <8> to <10>,
wherein the image is formed under control of an intensity of the laser light.

<12> The method for producing the container according to any one of <8> to <10>,
wherein the image is formed under scanning of the laser light.

<13> The method for producing the container according to any one of <8> to <11>,
wherein the image is formed under independent control of intensities of a plurality of rays of laser light emitted from a plurality of laser light sources.

<14> An apparatus configured to produce the container according to any one of <1> to <7>, the apparatus including
an irradiation unit configured to irradiate the container body with laser light to form the image.

<15> The apparatus configured to produce the container according to <14>, further including
either or both of a rotating unit configured to rotate the container body about an axis and a moving unit configured to move the container body.

<16> A content containing body, including:
the container according to any one of <1> to <7>; and
a content contained in the container.

<17> A container filled with a liquid and having a transmittance a of 50 or higher but 100 or lower, the container including:
a container body; and
images on the container body,
wherein the images each include a plurality of dented portions and non-dented portions,
the images are formed on two regions, which are a region (front side) including an external surface of the container that can be directly seen when the container is viewed from a predetermined viewing position relative to the container, and a region (back side) including an external surface of the container that can only be seen through an interior of the container,
there is at least one viewing position from which the external surfaces of the container in the two regions can be directly seen and can only be seen through the interior of the container, respectively, and
V1, which represents a visibility value on the front side represented by Mathematical formula (1) below, and V2, which represents a visibility value on the back side represented by Mathematical formula (1) below, satisfy the following formula: V2/V1<0.55, $$\text{Visibility value}=b_0\cdot L^*_0\cdot(1-\exp(b_1\cdot\Delta L^*)) \quad \text{Mathematical formula (1)}$$

where in Mathematical formula (1), $L^*_0$ represents a luminosity of the images, $\Delta L^*$ represents a difference between the luminosity of the images and the luminosity of a portion other than the images, $b_0$ represents a positive real number, and $b_1$ represents a negative real number.

<18> The container according to <17>,
wherein the following formula: V1>5 and the following formula: 0<V2<4 are satisfied.

<19> The container according to <17> or <18>,
wherein a ratio of an area of the plurality of dented portions to an area of each image [(the area of the plurality of dented portions/the area of each image)×100] is 40% or greater but 95% or less.

<20> The container according to any one of <17> to <19>,
wherein the following formula: S2/S1<0.2, or S3/S4>8 is satisfied, where S1 represents a total area of the image on the front side when seen from the front side, S2 represents an area of a superimposed portion between the images on the front side and the back side when seen from the front side, S3 represents a total area of the image on the back side when seen from the back side, and S4 represents an area of a superimposed portion between the images on the back side and the front side when seen from the back side.

<21> The container according to any one of <17> to <20>,
wherein a color difference ΔE (CIE76) between a color gamut of the images and a color gamut of surrounding portions of the images is 2.3 or lower.

<22> The container according to any one of <17> to <21>,
wherein the images are formed in a vertical direction of the container.

<23> The container according to any one of <17> to <22>,
wherein each of the dented portions is formed of a plurality of processed portions, and
the plurality of processed portions are disposed linearly along a first scanning direction.

<24> The container according to <23>,
wherein a width of each of the dented portions in a second scanning direction orthogonal to the first scanning direction is less than or equal to a one-dot width of a predetermined resolution.

<25> A method for producing the container according to any one of <17> to <24>, the method including
irradiating the container body with laser light to form the images.

<26> The method for producing the container according to <25>, further including
either or both of rotating the container body about an axis and moving the container body.

<27> The method for producing the container according to <25> or <26>,
wherein a spot diameter of the laser light is 1 micrometer or greater but 200 micrometers or less.

<28> The method for producing the container according to any one of <25> to <27>,
wherein the images are formed under control of an intensity of the laser light.

<29> The method for producing the container according to any one of <25> to <28>, wherein the images are formed under scanning of the laser light.

<30> The method for producing the container according to any one of <25> to <29>, wherein the images are formed under independent control of intensities of a plurality of rays of laser light emitted from a plurality of laser light sources.

<31> An apparatus configured to produce the container according to any one of <17> to <24>, the apparatus including an irradiation unit configured to irradiate the container body with laser light to form the images.

<32> The apparatus configured to produce the container according to <31>, further including either or both of a rotating unit configured to rotate the container body about an axis and a moving unit configured to move the container body.

<33> A content containing body, including:

the container according to any one of <17> to <24>; and a content contained in the container.

The container according to any one of <1> to <7>, the method for producing the container according to any one of <8> to <13>, the apparatus configured to produce the container according to <14> or <15>, and the content containing body according to <16> can solve the various problems in the related art and achieve the object of the present disclosure.

The container according to any one of <17> to <24>, the method for producing the container according to any one of <25> to <30>, the apparatus configured to produce the container according to <31> or <32>, and the content containing body according to <33> can solve the various problems in the related art and achieve the object of the present disclosure.

What is claimed is:

1. A container, comprising:

a container body having an image on the container body; and a content contained in the container, wherein the image includes a plurality of dented portions and non-dented portions, and a visibility value of the image represented by Mathematical formula (1) below is 2 or greater, $$\text{Visibility value}=b_0 \cdot L^*_0 \cdot (1-\exp(b_1 \cdot \Delta L^*)) \quad \text{Mathematical formula (1)}$$

where $L^*_0$ represents a luminosity of the image determined by:

a G signal of a photo of the container body taken in a darkroom in a state where a pair of white diffusion surfaces are respectively set on both sides of the container body, and a polynomial representing a relationship between G signals and luminosity obtained by taking a photo of a color chart having known luminosity values and approximating output values of the photo of the color chart with an n-th order polynomial, and $\Delta L^*$ represents a difference between the luminosity of the image, determined by the G signal of the photo of the container body and the polynomial, and a luminosity of any portion of the container body other than the image, $b_0$ is 0.195, and $b_1$ is −0.193.

2. The container according to claim 1, wherein a ratio of an area of the plurality of dented portions to an area of the image [(the area of the plurality of dented portions/the area of the image)×100] is 40% or greater but 95% or less.

3. The container according to claim 1, wherein each of the dented portions is formed of a plurality of processed portions, and the plurality of processed portions are disposed linearly along a first scanning direction.

4. The container according to claim 3, wherein a width of each of the dented portions in a second scanning direction orthogonal to the first scanning direction is less than or equal to a one-dot width of a predetermined resolution.

5. A method for producing the container according to claim 1, the method comprising irradiating the container body with laser light to form the image.

6. The method for producing the container according to claim 5, further comprising either or both of rotating the container body about an axis and moving the container body.

7. The method for producing the container according to claim 5, wherein a spot diameter of the laser light is 1 micrometer or greater but 200 micrometers or less.

8. The method for producing the container according to claim 5, wherein the image is formed under control of an intensity of the laser light.

9. The method for producing the container according to claim 5, wherein the image is formed under scanning of the laser light.

10. The method for producing the container according to claim 5, wherein the image is formed under independent control of intensities of a plurality of rays of laser light emitted from a plurality of laser light sources.

11. An apparatus configured to produce the container according to claim 1, the apparatus comprising an irradiation unit configured to irradiate the container body with laser light to form the image.

12. The apparatus configured to produce the container according to claim 11, further comprising either or both of a rotating unit configured to rotate the container body about an axis and a moving unit configured to move the container body.

13. A container, comprising:

a container body having an image on the container body; and a content contained in the container, wherein the image includes a plurality of dented portions, and a visibility value of the image represented by Mathematical formula (1) below is 2 or greater, $$\text{Visibility value}=b_0 \cdot L^*_0 \cdot (1-\exp(b_1 \cdot \Delta L^*)) \quad \text{Mathematical formula (1)}$$

where $L^*_0$ represents a luminosity of the image determined by:

a G signal of a photo of the container body taken in a darkroom in a state where a pair of white diffusion surfaces are respectively set on both sides of the container body, and a polynomial representing a relationship between G signals and luminosity obtained by taking a photo of a color chart having known luminosity values and approximating output values of the photo of the color chart with an n-th order polynomial, and $\Delta L^*$ represents a difference between the luminosity of the image, determined by the G signal of the photo of the container body and the polynomial, and a luminosity of any portion of the container body other than the image, $b_0$ is 0.195, and $b_1$ is −0.193.

* * * * *